(12) United States Patent
Kitazato et al.

(10) Patent No.: US 6,966,065 B1
(45) Date of Patent: Nov. 15, 2005

(54) DATA TRANSMISSION CONTROL METHOD, DATA TRANSMITTING METHOD, DATA TRANSMITTING APPARATUS, AND RECEIVING APPARATUS

(75) Inventors: Naohisa Kitazato, Tokyo (JP); Junya Saito, Saitama (JP); Kenichi Murata, Tokyo (JP); Yasushi Katayama, Tokyo (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 09/521,098

(22) Filed: Mar. 7, 2000

Related U.S. Application Data

(63) Continuation of application No. PCT/JP99/03787, filed on Jul. 14, 1999.

(30) Foreign Application Priority Data

| Jul. 14, 1998 | (JP) | P10-198641 |
| Jul. 14, 1998 | (JP) | P10-198737 |
| Jul. 16, 1998 | (JP) | P10-201729 |
| Jul. 17, 1998 | (JP) | P10-203857 |

(51) Int. Cl.$^7$ .......................................... H04N 7/173
(52) U.S. Cl. ........................... 725/116; 725/93; 348/705
(58) Field of Search .............................. 725/50, 91, 93, 725/94, 115, 116, 144, 146; 348/563, 564, 348/588, 705

(56) References Cited

U.S. PATENT DOCUMENTS

| 5,068,849 A | * | 11/1991 | Tanaka .......................... 370/509 |
| 5,142,576 A | * | 8/1992 | Nadan .......................... 380/234 |
| 5,517,669 A | * | 5/1996 | Ohkura et al. ............... 709/226 |
| 5,710,815 A | * | 1/1998 | Ming et al. ................... 380/241 |
| 5,748,923 A | * | 5/1998 | Eitrich ......................... 710/305 |
| 5,929,849 A | * | 7/1999 | Kikinis ........................ 725/113 |
| 6,157,809 A | * | 12/2000 | Kambayashi ................. 725/91 |

FOREIGN PATENT DOCUMENTS

| JP | 08-251119 | 9/1996 |
| JP | 09-322129 | 12/1997 |
| JP | 11-41584 | 2/1999 |

(Continued)

OTHER PUBLICATIONS

U. Ladebusch, "Einfuehrung In Den DVB-Datenrundfunk", Fernseh Und Kinotechnik, VDE Verlag GMBH, Berlin, DE, Jul. 1998—vol. 52, No. 7, pp. 425-432.

(Continued)

*Primary Examiner*—Vivek Srivastava
(74) *Attorney, Agent, or Firm*—Lerner, David, Littenberg, Krumholz & Mentlik, LLP

(57) ABSTRACT

A client transmits an event of Event::Subscribe ("DSI_CHANGED") to a server. The server returns an event number set for a "DSI_CHANGED" event to the client. After the event number is obtained, the client transmits Event::notify to the server and requests some event generation notice including "DSI_CHANGED". When there is a change in DSI of a karrusel which was received, namely, when the "DSI CHANGED" event is generated at a certain timing after Event::notify is received, the server transmits the event number corresponding to the "DSI_CHANGED" event to the client as a response to Event::notify. The contents of the karrusel before the event number is generated is continuously used for a period of time during which the client transmits Session::detach to the server after the server notified the client of the generation of the event number.

13 Claims, 36 Drawing Sheets

FOREIGN PATENT DOCUMENTS

| WO | WO 98/26528 A2 | 6/1998 |
|----|----------------|--------|
| WO | WO 98/57273 A1 | 12/1998 |

OTHER PUBLICATIONS

L. Atzori, et al., "Multimedia Information Broadcasting Using Digital TV Channels", IEEE Transactions on Broadcasting, Sep. 1997, vol. 43. No. 3, pp. 242-251.

J-P Evain, "The Multimedia Home Platform", EBU Technical Review, 1998, pp. 4-10.

T. Meyer-Boudnik et al.—"MHEG Explained", IEEE Multimedia, IEEE Computer Society, 1995, vol. 2, No. 1, pp. 26-38.

* cited by examiner

INTERACTIVE CHANGE-OVER KEY OPERATION

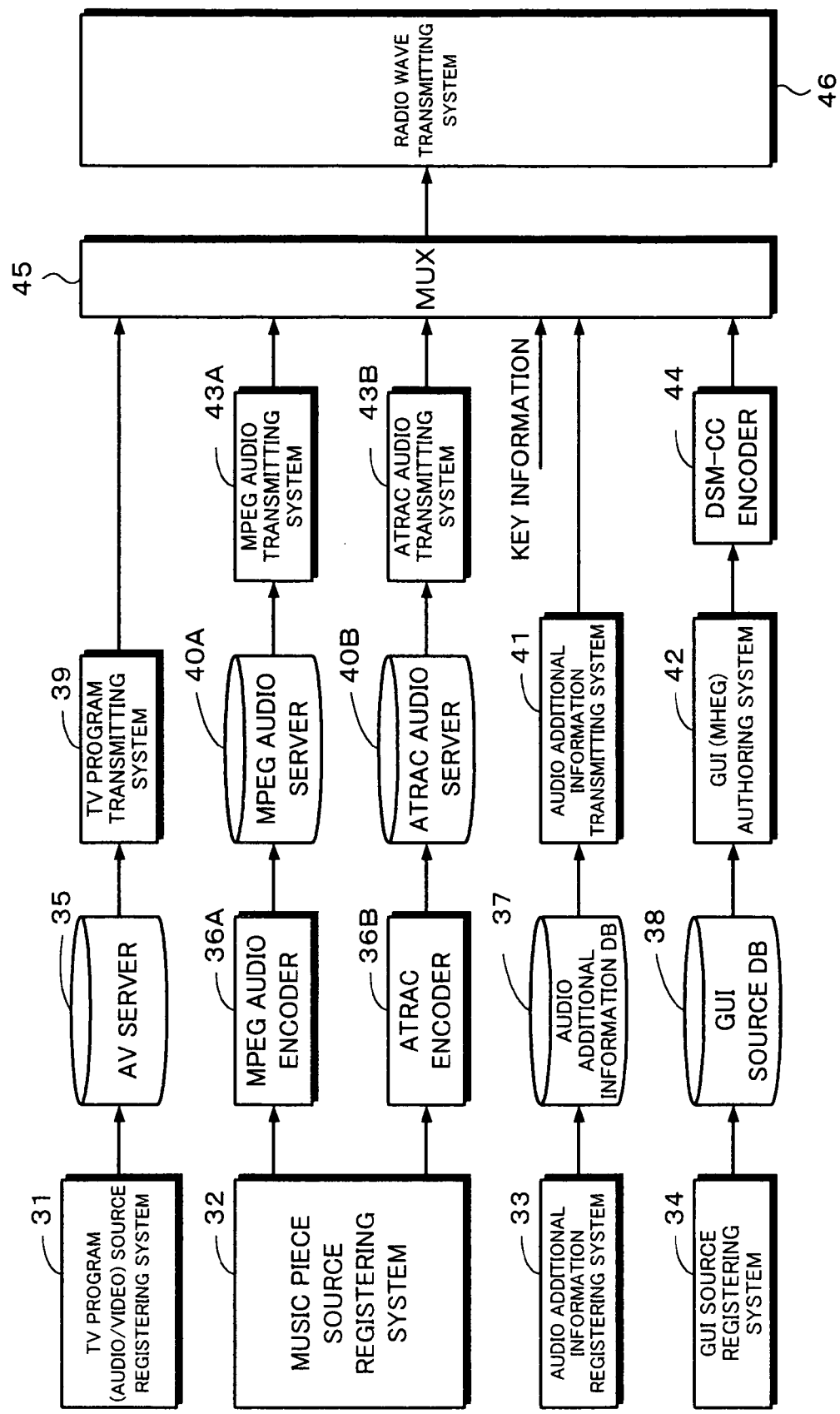

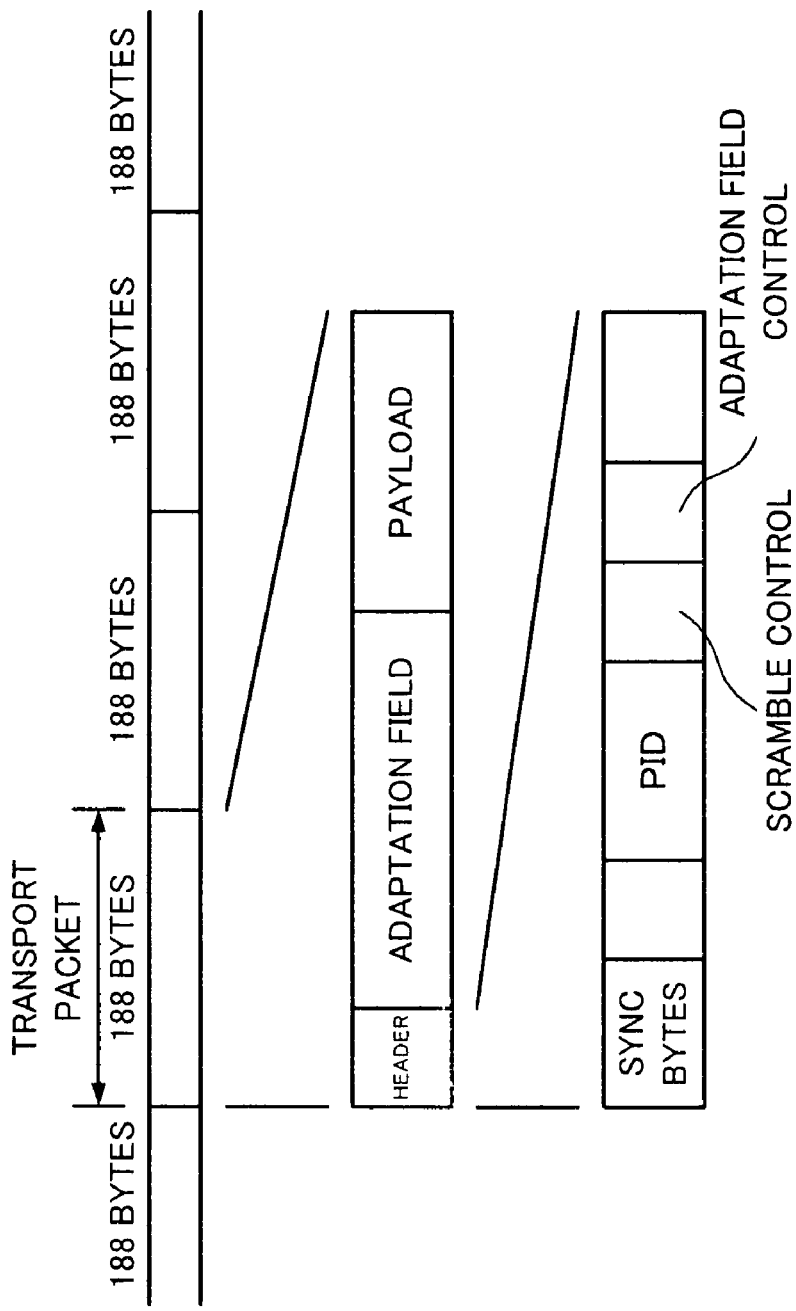

Fig. 18

| object Id | module Id |
|-----------|-----------|
|           |           |
|           |           |
|           |           |
|           |           |
|           |           |

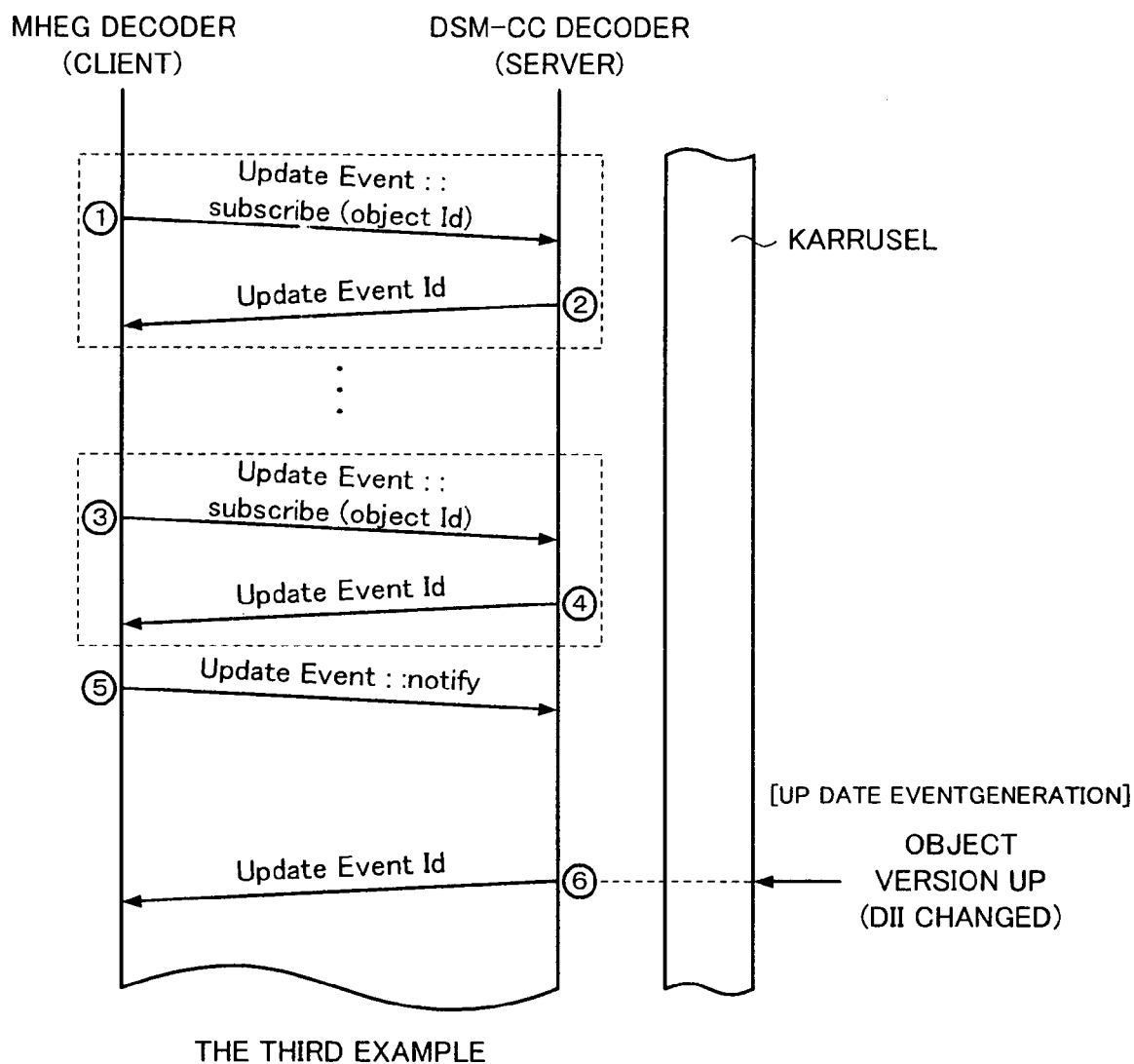

Fig. 20A

MHEG DECODER TABLE

| object Id | Update Event Id |
|---|---|
| | |
| | |
| | |
| | |

Fig. 20B

DSM-CC DECODER TABLE

| Update Event Id | module Id | module Ver. No |
|---|---|---|
| | | |
| | | |
| | | |
| | | |

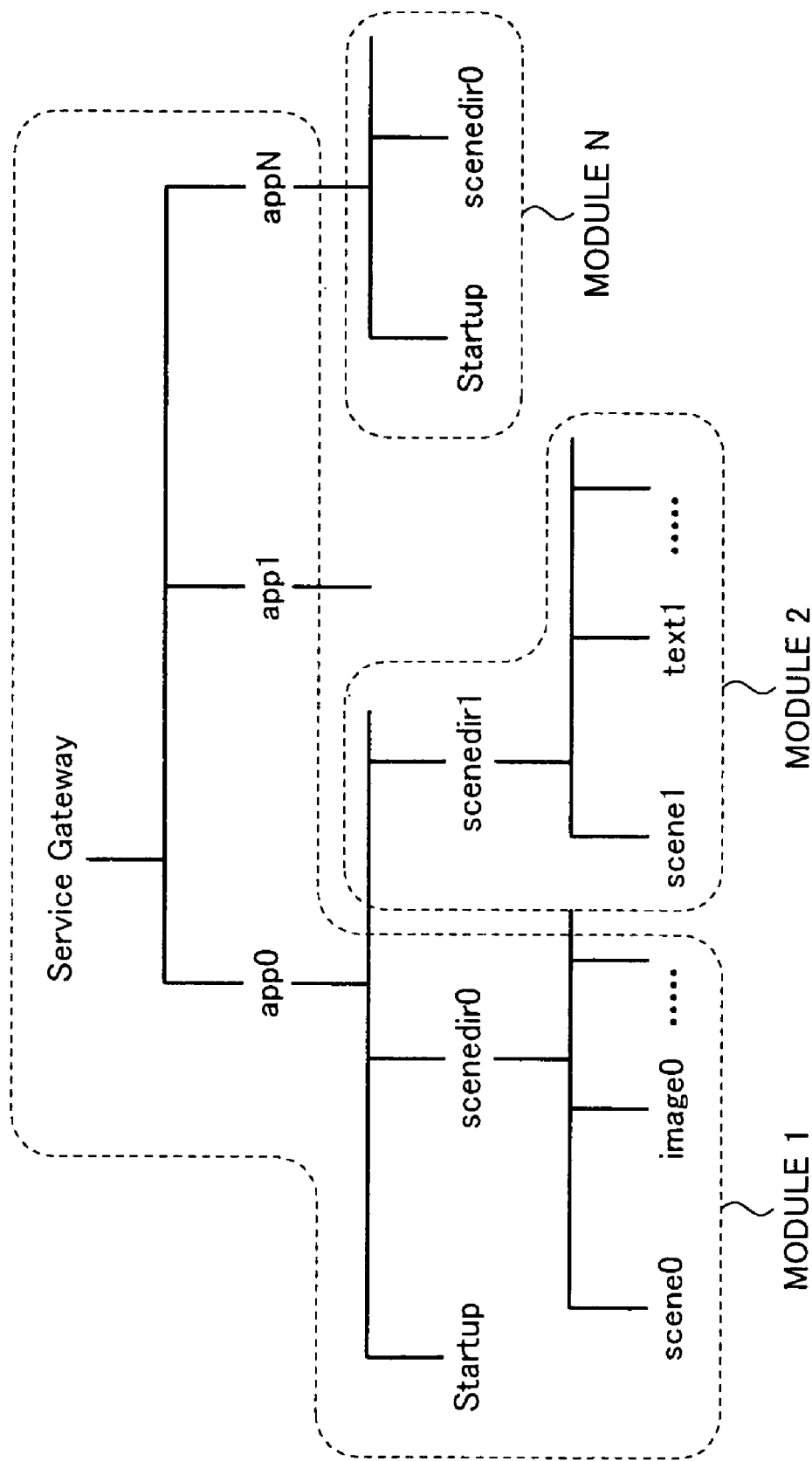

TRANSITION EXAMPLE

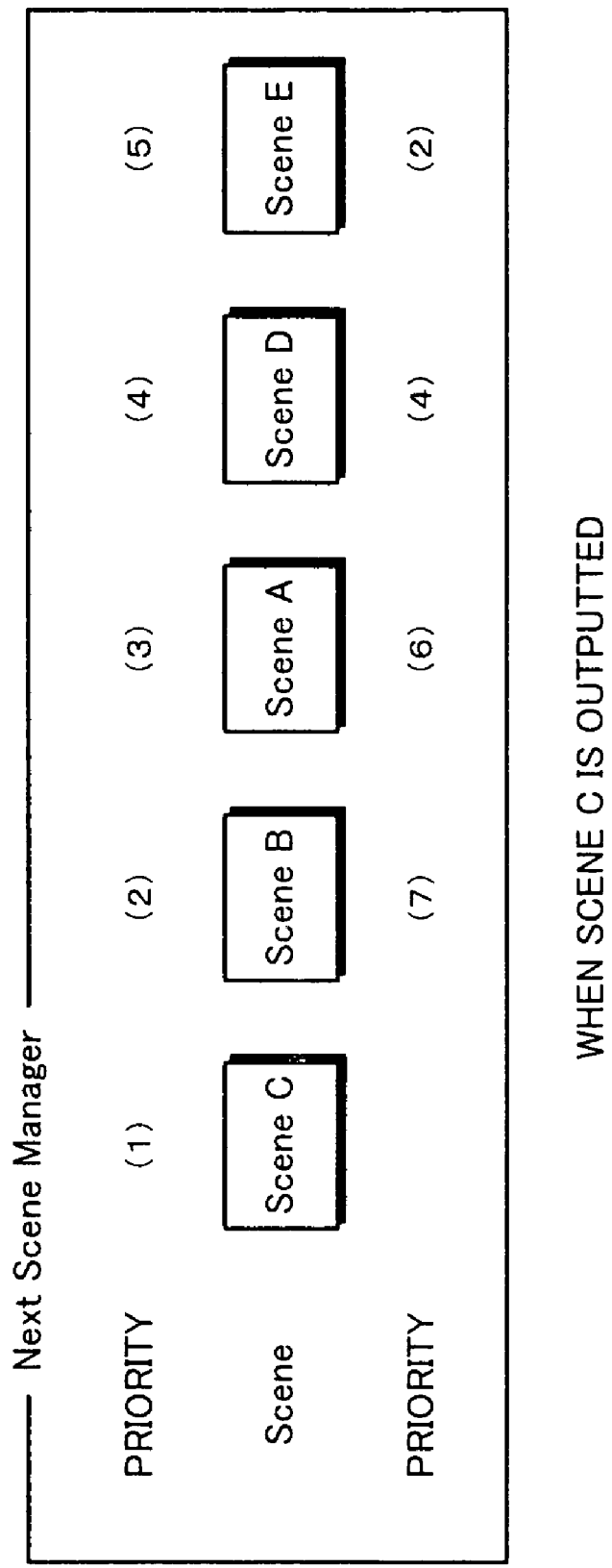

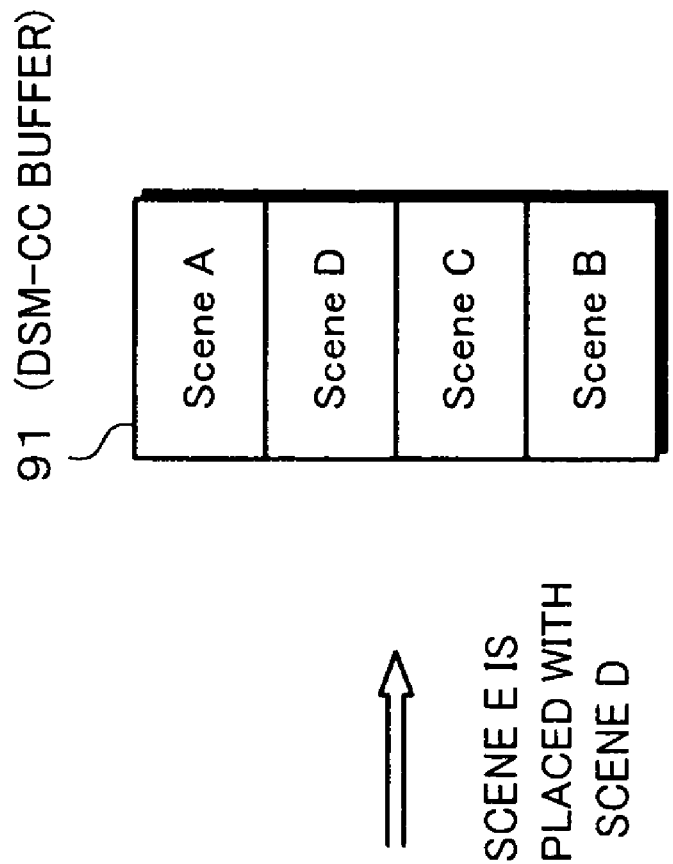
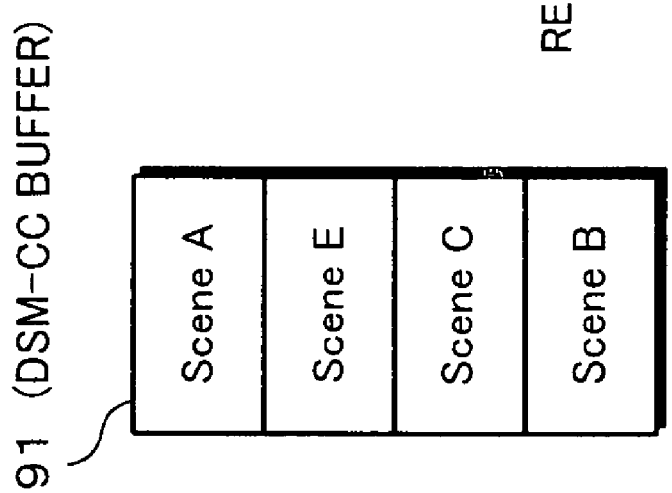

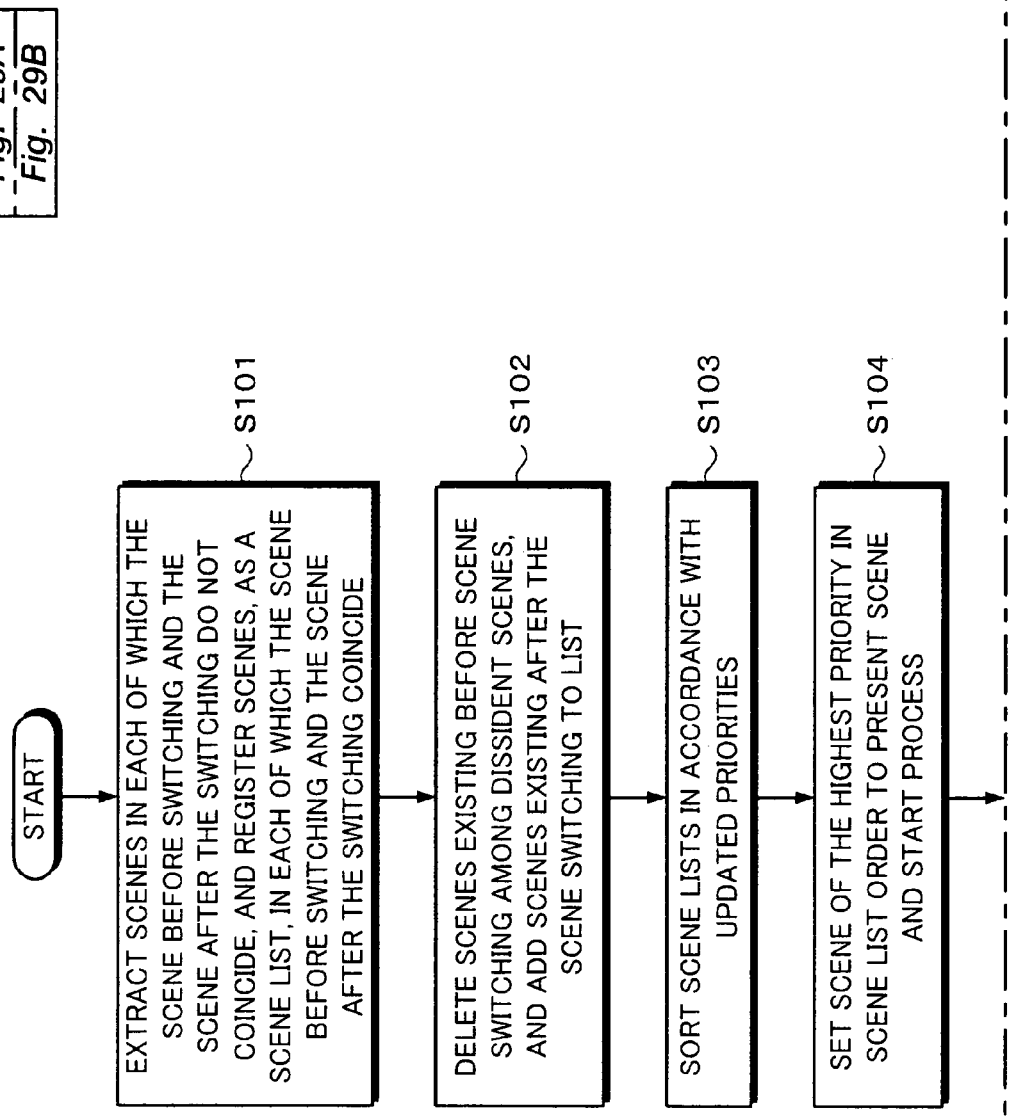

*Fig. 31*

```
DISPLAY DATA DESCRIPTION

INITIAL STATE:MOTION IMAGE DISPLAY ON
INITIAL STATE:STILL IMAGE A DISPLAY OFF
MOTION IMAGE:COORDINATES (10,10)
             SIZE (300,225)
STILL IMAGE:COORDINATES (450,250)
            SIZE (200,150)
........................................
IF EVENT 1 IS GENERATEED, STILL IMAGE DISPLAY ON
........................................
........................................
IF EVENT 2 IS GENERATED, STILL IMAGE DISPLAY OFF
........................................
```

```
DISPLAY MADIA DATA
STILL IMAGE A
```

*Fig. 32*

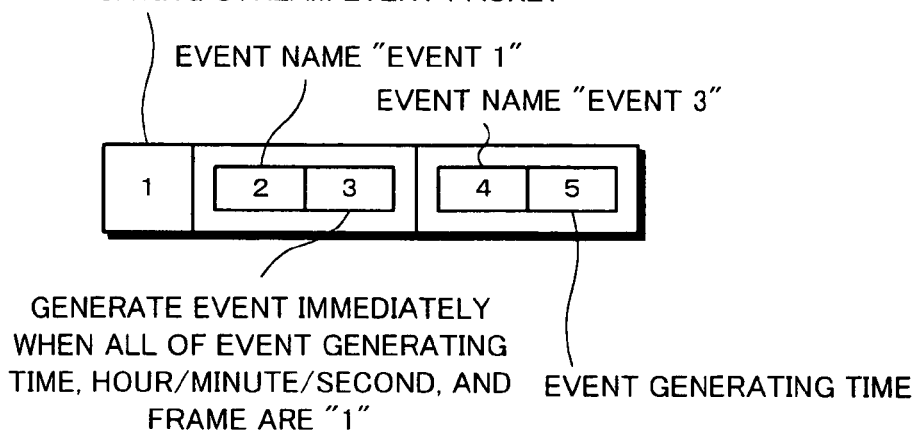

HEADER INDICATING STREAM EVENT PACKET
EVENT NAME "EVENT 1"
EVENT NAME "EVENT 3"
GENERATE EVENT IMMEDIATELY WHEN ALL OF EVENT GENERATING TIME, HOUR/MINUTE/SECOND, AND FRAME ARE "1"
EVENT GENERATING TIME

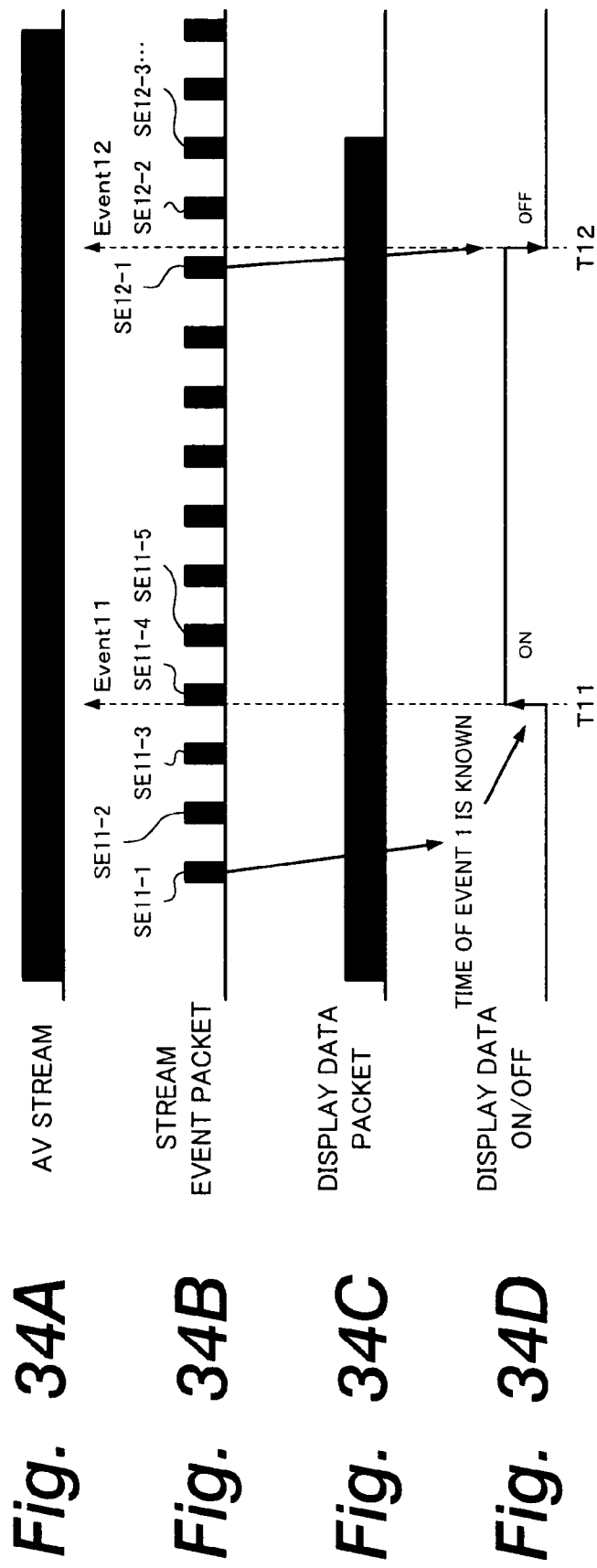

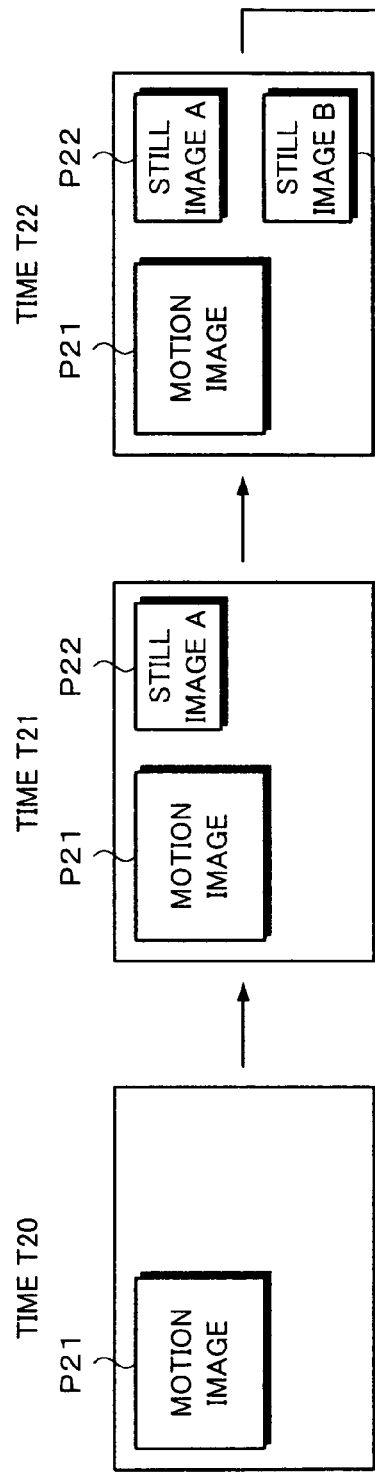
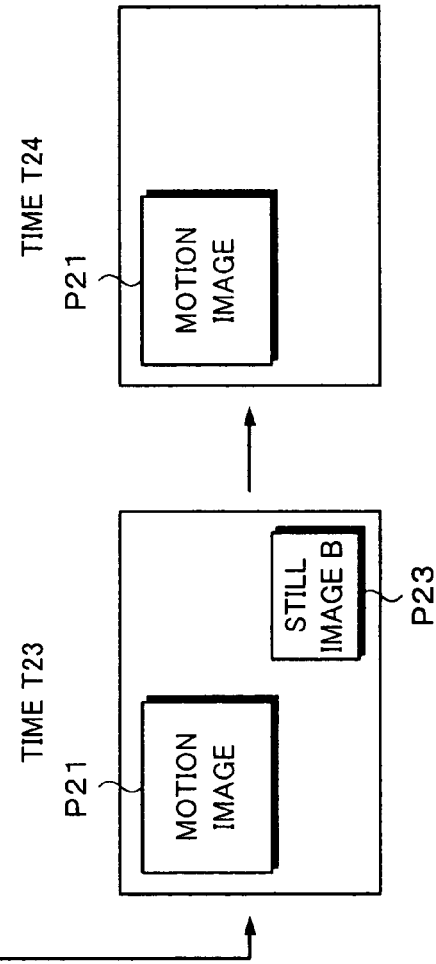

DATA TRANSMISSION CONTROL METHOD, DATA TRANSMITTING METHOD, DATA TRANSMITTING APPARATUS, AND RECEIVING APPARATUS

This application is a continuation of international application number PCT/JP99/03787, filed Jul. 14, 1999.

TECHNICAL FIELD

The invention relates to a data transmission control method, a data transmitting method, a data transmitting apparatus, and a receiving apparatus which can receive data services associated with a main TV program broadcasting in, for example, a digital satellite broadcasting or the like.

BACKGROUND ART

In recent years, the digital satellite broadcasting has been spread. The digital satellite broadcasting is strong against noises and fading as compared with, for example, an existing analog broadcasting and can transmit a signal of a high quality. A frequency using efficiency is improved and multi-channels can be also realized. Specifically speaking, in a digital satellite broadcasting, hundreds of channels can be assured by one satellite. In such a digital satellite broadcasting, a number of dedicated channels such as sports, movies, music, news, and the like are prepared. In those dedicated channels, a program according to each dedicated contents is broadcasted.

A method of enabling the user to download audio data such as music pieces or the like or enabling, for example, the user to make a purchase contract for some product while watching a broadcasting screen as what is called a television shopping by using the digital satellite broadcasting system as mentioned above has been proposed. That is, a data service broadcasting is executed as a digital satellite broadcasting system in parallel with the ordinary broadcasting contents.

For example, in case of downloading music piece data, the music piece data is multiplexed and broadcasted in parallel with a broadcasting program on the broadcasting side. When the music piece data is downloaded, the user is enabled to perform an interactive operation by displaying a GUI (Graphical User Interface) picture plane (namely, an operation picture plane for downloading). However, data to output the GUI picture plane is also multiplexed and broadcasted.

On the user side who possesses a receiving apparatus, the GUI picture plane to download the music piece data is displayed and outputted by a predetermined operation for the receiving apparatus in a state where a desired channel is selected. By performing the operation by the user to the displayed operation picture plane, data is supplied to a digital audio apparatus connected to, for example, the receiving apparatus and enabled to be recorded.

As a GUI picture plane to download the music piece data as mentioned above, for example, there is considered a construction such that in addition to information such as parts-like image data, text data, or the like to form the GUI picture plane, unit data (file) such as audio data for audio output according to a predetermined operation is handled as an object, and an output format of the object is specified by a scenario description by a predetermined system, thereby realizing a desired display format and a desired output format of audio or the like with respect to the operation picture plane.

A display picture plane (also including an output of audio or the like here) to realize a function for some purpose by being specified by description information like a GUI picture plane mentioned above is called a "scene" here. The "object" denotes unit information of an image, audio sound, a text, or the like whose output format is specified on the basis of the description information. Upon transmission, a data file of the description information itself is also handled as one of the "objects".

The object to realize the scene display and an audio output or the like on the scene display is encoded by, for example, a predetermined transmitting system and transmitted.

On the receiving apparatus side, data is received in accordance with the transmitting system, a decoding process is performed to the reception data, data as a set of each object that is necessary for, for example, a scene to be displayed is obtained, and the data is outputted as a scene.

Considering a using environment of the user who possesses the receiving apparatus, it is desirable that data for data services received by the receiving apparatus is enabled to be performed as efficiently as possible in accordance with the predetermined transmitting system, and processes such as updating of the contents of the scene to be displayed and outputted, transition of the scene, and synchronous display of the main TV broadcasting program and additional information such as a still image or the like are enabled by small processes as promptly as possible.

It is an object of the invention to provide a data transmission control method, a data transmitting method, a data transmitting apparatus, and a receiving apparatus, in which processes of data for data services received by the receiving apparatus can be performed as efficiently as possible.

Further, it is an object of the invention to provide a data transmission control method, a data transmitting method, a data transmitting apparatus, and a receiving apparatus, in which data of a necessary scene can be obtained as promptly as possible on the receiving apparatus side and, for example, a switching or the like of a scene output can be also promptly performed.

To realize the above objects, it is an object of the invention to provide a data transmission control method, a data transmitting method, a data transmitting apparatus, and a receiving apparatus which can be realized by a circuit of a scale as small as possible without having, for example, a buffer of a large capacity or the like.

DISCLOSURE OF INVENTION

According to the invention, in consideration of the foregoing problems, in correspondence to a data transfer system in which a cyclic data unit is formed by desired data to be transferred and the cyclic data unit is repetitively transferred for a desired period of time, a data transmission control is performed so as to execute a cyclic data unit switching process so that a fact that the contents of the cyclic data unit has been switched can be notified to a client who uses the cyclic data unit from a server side which receives the cyclic data unit.

According to the above construction, at least the client can know the fact that the contents of the cyclic data unit has been switched, and the client can execute a desired corresponding process based on it.

According to the invention, as a data transmission control method corresponding to a data transfer system such that a data transmission unit is formed so as to include an object that is associated by a scenario description of a predetermined system, a cyclic data unit is further formed so as to include one or more data transmission units to be transferred for a certain predetermined period of time, and the cyclic data unit is repetitively transferred, there is executed an object updating and notifying process in which a fact that the object included in the cyclic data unit has been updated can be notified to the client who uses the cyclic data unit from the server side which receives the cyclic data unit.

According to the above construction, the client can know at least the fact that some object has been updated with respect to the data forming the cyclic data unit, and the client can execute a desired corresponding process based on it.

Further, according to the invention, in a data transmitting method of transmitting multimedia data, an event notice is constructed by time information and an event name, a code showing that an event is immediately generated is defined at a position of the time information, and when the client wants to immediately generate an event, the code showing that the event is immediately generated is arranged at the position of the time information of the event information of the event notice and sent.

One of the codes (for example, ALL"1") which cannot exist as time information for the time information of a stream event comprising the event name and the time information is defined as a meaning of "event is immediately generated". Therefore, if a position of the time information is set to, for example, ALL"1" and the stream event is transmitted, the event is immediately generated on the reception side. Therefore, when the client wants to synchronize display data with a video image or audio sound, by sending the stream event by setting the position of the time information to, for example, ALL"1" at a timing that is slightly before the timing to generate the event, the display data can be synchronized with the video image or audio sound. The time management is unnecessary on the reception side.

Further, according to the invention, the data of a necessary scene is enabled to be obtained as promptly as possible on the receiving apparatus side, thereby considering an object for enabling, for example, a switching or the like of a scene output to be also promptly performed. To realize the above object, for example, the invention considers an object for enabling the above construction to be realized by a circuit of a small scale as possible without having a buffer of a large capacity or the like.

For this purpose, scene data forming one scene is made to correspond to one or a plurality of information transmission units, and a receiving apparatus for receiving transmission information in which transmission data comprising one or more information transmission units is cyclically transmitted comprises: receiving means for receiving the transmission information and fetching it as reception data; memory means which can temporarily store the data on an information transmission unit basis; scene data fetching means for extracting the data on an information transmission unit basis from the reception data, allowing the extracted data to be held in the memory means, transmitting the information transmission unit as scene data stored in the memory means to scene data storing means for storing the scene data, and enabling the information transmission unit to be stored in the scene data storing means; scene output means for enabling a scene output to be performed by using desired scene data from the scene data stored in the scene data storing means; information obtaining means for obtaining scene priority information showing a priority of the scene from the transmission information received by the receiving means; and control means for controlling the scene data fetching means so as to select the information transmission unit as scene data to be extracted from the reception data and stored in the memory means on the basis of the scene priority information obtained by the information obtaining means.

According to the above construction, as a receiving apparatus for receiving in correspondence to a transmitting system (karrusel system) in which the transmission data comprising, for example, one or more information transmission units (modules) is cyclically transmitted, first, the information transmission unit (namely, scene data) is fetched in accordance with the priority of the scene by using a condition that the scene data forming one scene corresponds to the information transmission unit as a prerequisite, and the fetched information transmission unit is stored in the scene data fetching means. That is, it is specified so as to determine the module to be extracted and fetched from the reception data in accordance with the priority of the scene. Thus, the scenes are sequentially stored in the scene data fetching means in accordance with the priorities of the scenes from the upper priority.

BRIEF DESCRIPTION OF DRAWINGS

FIG. 5 is a block diagram showing a constructional example of a ground station;

FIGS. 10A to 10C are data structure diagrams of a transport stream;

FIG. 18 is an explanatory diagram showing a table structure which is prepared on the client side in the second example;

FIG. 19 is an explanatory diagram showing an object updating notice control as a third example;

FIGS. 20A and 20B are explanatory diagrams showing a table structure which is prepared on the client side in the third example;

FIG. 23 is an explanatory diagram showing another example of mapping for the directory structure of the data services as an embodiment;

FIG. 27 is an explanatory diagram showing an example of scene priorities which are managed in the next scene manager according to the transition example of the scenes shown in FIG. 17;

FIGS. 28A and 28B are explanatory diagrams showing the fetching operation of modules of the scene data according to a change in scene priority shown as a transition from FIG. 18 to FIG. 19;

FIGS. 29A and 29B are flowcharts for realizing a module allocation according to the switching of the scenes in the embodiment;

FIG. 31 is a schematic diagram for use in explanation of a script;

FIG. 32 is a schematic diagram showing a construction of a stream event packet;

FIGS. 34A to 34D are timing charts for use in explanation of another example of a stream event sequence;

FIGS. 35A to 35E are schematic diagrams for use in explanation of another example of events.

BEST MODE FOR CARRYING OUT THE INVENTION

An embodiment of the invention will now be described. As a system to which the invention is applied, a system such that a program is broadcasted by using a digital satellite broadcasting and, on a receiving apparatus side, information such as music piece data (audio data) concerning this program and the like can be downloaded is mentioned as an example.

The following explanation will be made in the following order.

Figure 1:
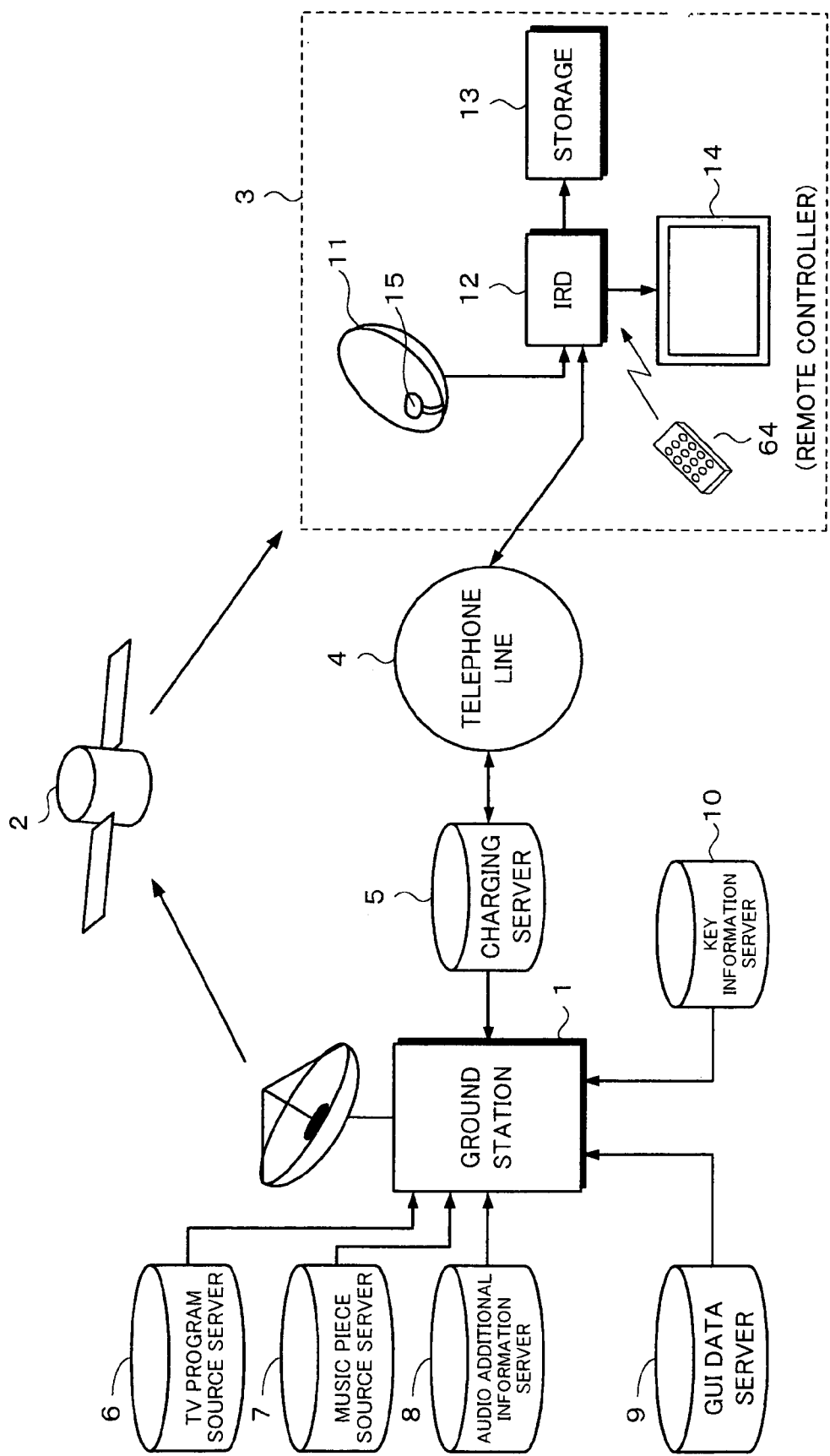
FIG. 1 is a block diagram showing a constructional example of a digital satellite broadcasting receiving system of an embodiment of the invention.

1. Digital satellite broadcasting system
   1-1. Whole construction
   1-2. Operation for GUI picture plane
   1-3. Ground station
   1-4. Transmitting format
   1-5. IRD
2. Processes upon karrusel switching
   2-1. First example
   2-2. Second example
3. Processes upon object updating
   3-1. First example
   3-2. Second example
   3-3. Third example
4. Allocation of modules to queue
5. Synchronization between reproduction of main video image o audio data and reproduction of additional data 1. Digital Satellite Broadcasting System 1-1. Whole Construction FIG. 1 shows a whole construction of a digital satellite broadcasting system according to an embodiment. As shown in the diagram, a source for a television program broadcasting from a television (TV) program source server 6, a source of music piece data from a music piece source server 7, audio additional information from an audio additional information server 8, and GUI data from a GUI data server are sent to a ground station 1 of a digital satellite broadcasting.

The TV program source server 6 is a server to provide a source of an ordinary broadcasting program. The source of a music broadcasting which is sent from the television program source server comprises a motion image and an audio sound. For example, in case of a music broadcasting program, a motion image and an audio sound for promotion of a new music piece are broadcasted by using the source of the motion image and audio sound of the TV program source server 6.

The music piece source server 7 is a server to provide an audio program by using audio channels. A source of the audio program comprises only an audio sound. The music piece source server 7 transmits sources of audio programs of a plurality of audio channels to the ground station 1.

In the program broadcasting of each audio channel, the same music piece is repetitively broadcasted for a predetermined unit time. Each audio channel is independent and various using methods of the audio channels are considered. For example, in one audio channel, a few music pieces of the latest Japanese popular songs are repetitively broadcasted for a certain predetermined period of time and, in another audio channel, a few music pieces of the latest popular songs of foreign countries are repetitively broadcasted for a certain predetermined period of time.

The audio additional information server 8 is a server to provide time information or the like of the music piece which is outputted from the music piece source server 7.

A GUI data server 9 provides "GUI data" to form the GUI picture plane which is used by the user for operation. For example, in case of a GUI picture plane regarding the download of a music piece as will be explained hereinlater, image data to form a list page of music pieces to be distributed and an information page of each music piece, text data, data to form a still image of an album jacket, and the like are provided. Further, EPG data which is used to display a program table which is a so-called EPG (Electrical Program Guide) on a receiving facilities 3 side is also provided from the GUI data server 9.

As "GUI data", for example, an MHEG (Multimedia Hypermedia Information Coding Experts Group) system is used. According to MHEG, each of multimedia information, a procedure, an operation, and the like and a combination thereof are regarded as objects, those objects are encoded, and after that, they are set to an international standard of a scenario description to form it as a title (for example, GUI picture plane). It is assumed that MHEG-5 is used in the embodiment.

A ground station 1 multiplexes information transmitted from the TV program source server 6, music piece source server 7, audio additional information server 8, and GUI data server 9 and transmits them.

In the embodiment, video data transmitted from the TV program source server 6 is compression encoded by an MPEG (Moving Picture Experts Group) 2 system and audio data is compression encoded by an MPEG audio system. The audio data transmitted from the music piece source server 7 is compression encoded by, for example, either the MPEG audio system or an ATRAC (Adaptive Transform Acoustic Coding) system in correspondence to each audio channel.

Upon multiplexing, those data is enciphered by using key information from a key information server 10. An example of an internal construction of the ground station 1 will be described hereinlater.

A signal from the ground station 1 is received by the receiving facilities 3 of each home through a satellite 2. A plurality of transponders are mounted in the satellite 2. One transponder has a transmitting ability of, for example, 30 Mbps. As receiving facilities 3 of each home, a parabolic antenna 11, an IRD (Integrated Receiver Decoder) 12, a storage device 13, and a monitoring apparatus 14 are prepared. A remote controller 64 to perform the operation for the IRD 12 is prepared.

The signal broadcasted through the satellite 2 is received by the parabolic antenna 11. The reception signal is converted to a predetermined frequency by an LNB (Low Noise Block Down Converter) 15 attached to the parabolic antenna 11 and supplied to the IRD 12.

As a schematic operation in the IRD 12, a signal of a predetermined channel is selected from the reception signal, and video data and audio data as a program are demodulated from the selected signal and outputted as a video signal and an audio signal. The IRD 12 also outputs a GUI picture plane on the basis of GUI data that is multiplexed and transmitted together with the data as a program. Such an output of the IRD 12 is supplied to, for example, the monitoring apparatus 14. Thus, in the monitoring apparatus 14, an image display and an audio output of the program received and selected by the IRD 12 are performed, and the GUI picture plane can be displayed in accordance with the operation of the user as will be explained hereinlater.

The storage device 13 is used to store the audio data (music piece data) downloaded by the IRD 12. A kind of storage device 13 is not particularly limited. An MD (Mini Disc) recorder/player, a DAT recorder/player, a DVD recorder/player, or the like can be used. As a storage device 13, the audio data can be also stored in not only a hard disk but also a recordable media including a CD-R or the like by using a personal computer apparatus.

Figure 2:
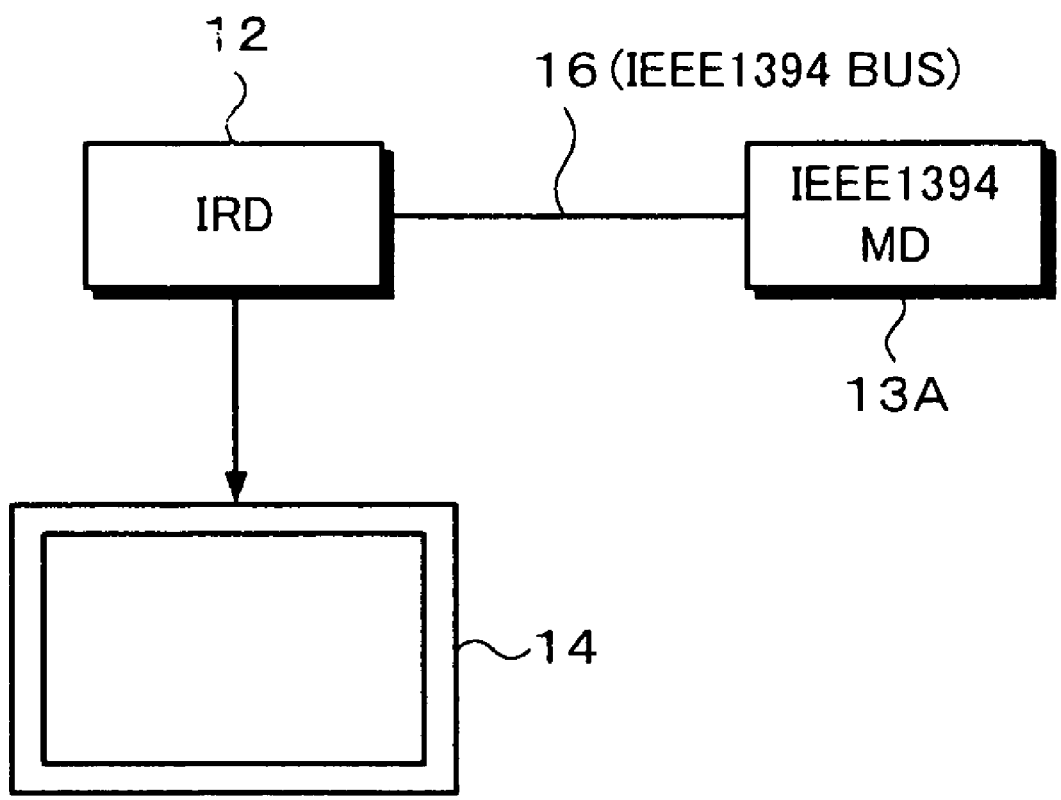
FIG. 2 is a block diagram showing a constructional example of receiving facilities in the embodiment.

As receiving facilities 3 of the embodiment, as shown in FIG. 2, an MD recorder/player 13A having a data interface corresponding to IEEE1394 as a data transmission standard can be used as a storage device 13 shown in FIG. 1.

The MD recorder/player 13A corresponding to IEEE1394 shown in the diagram is connected to the IRD 12 by an IEEE1394 bus 16. In the embodiment, consequently, the audio data (download data) as a music piece received by the IRD 12 can be directly fetched and recorded in a state where it was subjected to the compressing process by the ATRAC system. When the MD recorder/player 13A and IRD 12 are connected by the IEEE1394 bus 16, in addition to the audio data, jacket data (still image data) of the album and text data such as words or the like can be recorded.

The IRD 12 can communicate with a charging server 5 via, for example, a telephone line 4. An IC card in which various information is stored as will be explained hereinlater is inserted in the IRD 12. For example, now assuming that the audio data of a music piece is downloaded, history information regarding it is stored in the IC card. The information in the IC card is sent to the charging server 5 at a predetermined timing through the telephone line 4. The charging server 5 sets a money amount in accordance with the sent history information and charges the user.

As will be understood from the above description, in the system to which the invention is applied, the ground station 1 multiplexes the video data and audio data serving as a source of the music program broadcasting from the TV program source server 6, the audio data serving as a source of the audio channel from the music piece source server 7, the audio additional information from the audio additional information server 8, and the GUI data from the GUI data server 9 and transmits the multiplexed data.

When this broadcasting is received by the receiving facilities 3 at each home, the program of the selected channel can be monitored by, for example, the monitoring apparatus 14. An EPG (Electrical Program Guide) picture plane is first displayed as a GUI picture plane using the GUI data which is transmitted together with the data of the program and a search or the like of a program can be performed. Second, by performing a desired operation by using, for example, a GUI picture plane for a specific service other than the ordinary program broadcasting, in case of the embodiment, services other than the monitoring of the ordinary programs provided by the broadcasting system can be received.

For example, if a GUI picture plane for a download service of the audio (music piece) data is displayed and the operation is performed by using the GUI picture plane, the user can download audio data of a desired music piece and record and store it into the storage device 13.

In the embodiment, the data service broadcasting to provide the specific services other than the ordinary program broadcasting which is accompanied with the operation for the GUI picture plane as mentioned above is also referred to as an "interactive broadcasting" because there is also a case where it has interactive performance.

1-2. Operation for GUI Picture Plane

A use example of the foregoing interactive broadcasting, namely, an example of the operation for the GUI picture plane will now be schematically explained with reference to FIGS. 3 and 4. A case of downloading the music piece data (audio data) will now be described.

First, particularly, principal operation keys among operation keys of the remote controller 64 which is used for allowing the user to perform the operation for the IRD 12 will be described with reference to FIG. 3.

Figure 3:
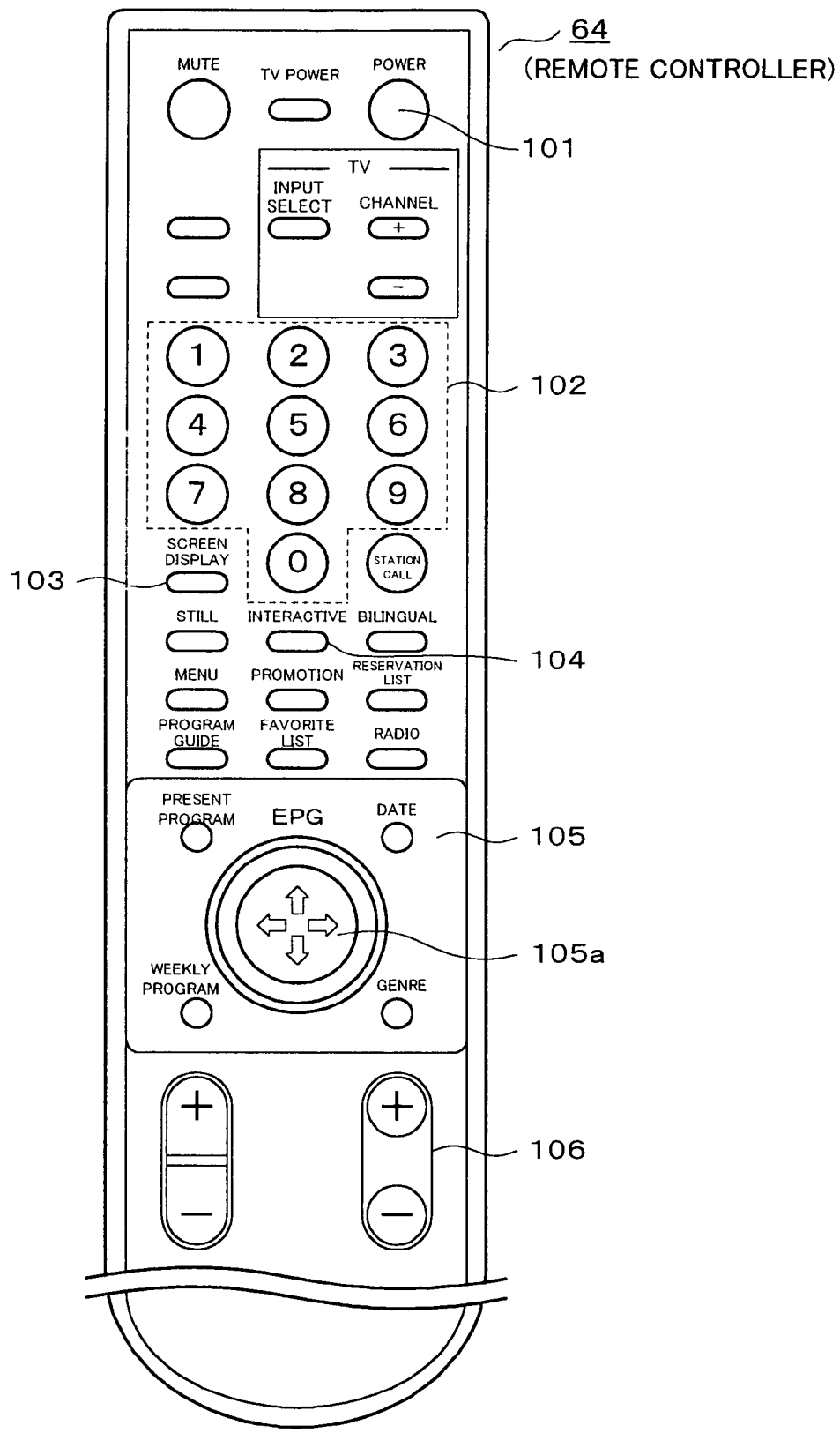
FIG. 3 is a front view showing an appearance of a remote controller for an IRD.

In FIG. 3, an operation panel surface on which various keys are arranged in the remote controller 64 is shown. Among the various keys, a power key 101, a numeral key 102, a screen display change-over key 103, an interactive change-over key 104, an EPG key panel unit 105, and a channel key 106 will now be described.

The power key 101 is a key to turn on/off a power source of the IRD 12. The numeral key 102 is a key which is operated when a channel is switched by designating a numeral or, for example, when a numerical value inputting operation is necessary on the GUI picture plane.

The screen display change-over key 103 is a key to switch, for example, between the ordinary broadcasting picture plane and an EPG picture plane. For example, if the keys arranged in the EPG key panel unit 105 are operated in a state where the EPG picture plane has been called by the screen display change-over key 103, a program search using the display picture plane of the electrical program guide can be performed. An arrow key 105a in the EPG key panel unit 105 can be also used for cursor movement or the like on the GUI picture plane for services, which will be explained hereinlater.

The interactive change-over key 104 is provided to switch between the ordinary broadcasting picture plane and the GUI picture plane for services associated in the broadcasting program. The channel key 106 is a key provided to sequentially switch station selecting channels in the IRD 12 in accordance with the ascending or descending order of the channel number.

Although the remote controller 64 in the embodiment is constructed so that various operations for, for example, the monitoring apparatus 14 can be also performed and various keys corresponding to them are also provided, an explanation of keys or the like corresponding to the monitoring apparatus 14 is omitted here.

A specific example of the operation for the GUI picture plane will now be described with reference to FIG. 4.

Figure 4A:
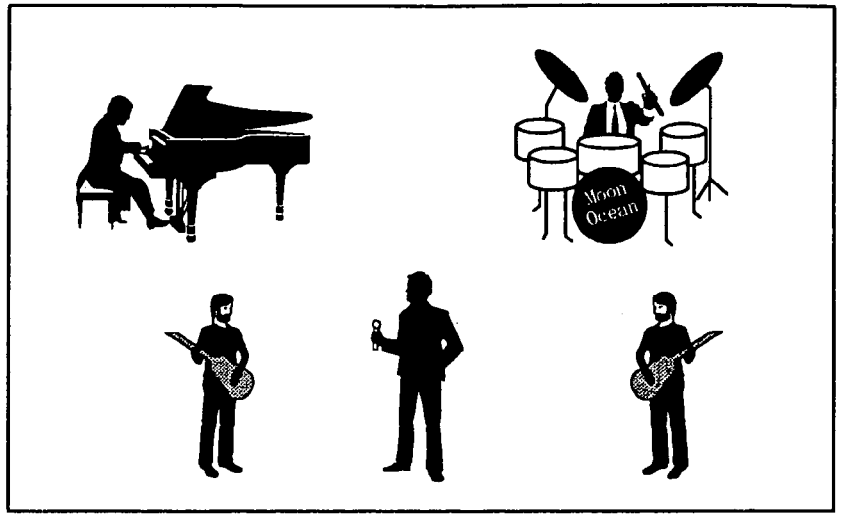
FIGS. 4A and 4B are explanatory diagrams showing a switching between a broadcasting picture plane and a GUI picture plane.

When the broadcasting is received by the receiving facilities 3 and a desired channel is selected, the motion image based on the program source provided from the TV program source server 6 is displayed on the display screen of the monitoring apparatus 14 as shown in FIG. 4A. That is, the contents of the ordinary program are displayed. It is now assumed that, for instance, a music program is displayed. It is also assumed that the music program is accompanied with a download service (interactive broadcasting) of audio data of a music piece.

Figure 4B:
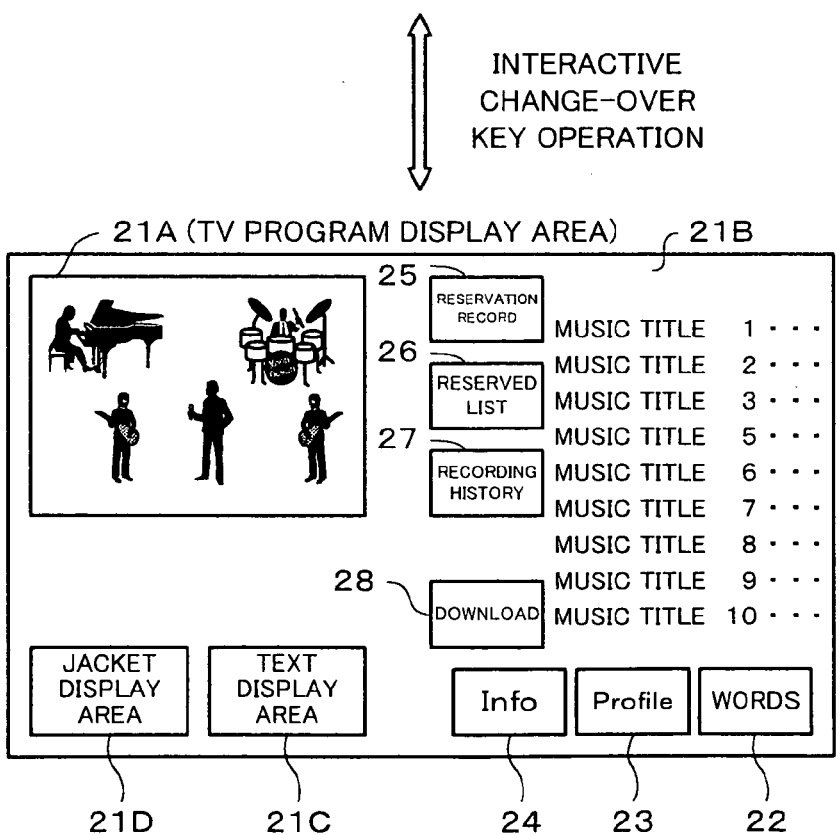

Now, assuming that the user operates, for example, the interactive change-over key 104 of the remote controller 64 in a state where the music program is displayed, the display screen is switched to the GUI picture plane for downloading the audio data as shown in FIG. 4B.

In this GUI picture plane, first, an image by the video data from the TV program source server 6 displayed in FIG. 4A is reduced and displayed in a TV program display area 21A in the upper left portion of the screen.

A list 21B of music pieces of each channel broadcasted by the audio channel is displayed in the upper right portion of the screen. A text display area 21C and a jacket display area 21D are displayed in the lower left portion of the screen. Further, a words display button 22, a profile display button 23, an information display button 24, a reservation record button 25, a reserved list display button 26, a recording history display button 27, and a download button 28 are displayed on the right side of the screen.

The user searches an interesting music piece while watching music piece titles displayed in the list 21B. If an interesting music piece is found, the user operates the arrow key 105a (in the EPG key panel unit 105) of the remote controller 64, moves a cursor to the position where the music piece is displayed, and thereafter, performs an entering operation (for example, the center position of the arrow key 105a is pressed).

Thus, the music piece to which the cursor is set can be monitored. That is, since the same music piece is repetitively broadcasted in each audio channel for a predetermined unit time, the channel is switched to the audio channel of the music piece selected by the above operation by the IRD 12 and the audio sound is generated while the picture plane in the TV program display area 21A is held as it is, so that the music piece can be listened to. In this instance, the still image of the MD jacket of such a music piece is displayed in the jacket display area 21D.

For example, if the cursor is set to the words display button 22 in the above state and an entering operation is performed (hereinbelow, the operation to set the cursor to the displayed button and perform the entering operation is referred to as "button is pressed"), the words of the music piece are displayed in the text display area 21C at a timing synchronized with the audio data. Similarly, by pressing the profile display button 23 or information display button 24, a profile, concert information, or the like of the artist corresponding to the music piece is displayed in the text display area 21C. As mentioned above, the user can know which music piece is distributed at present and, further, know detailed information about each music piece.

When the user wants to purchase the monitored music piece, he presses the download button 28. When the download button 28 is pressed, the audio data of the selected music piece is downloaded and stored into the storage device 13. Together with the audio data of the music piece, its words data, profile information of the artist, still image data of the jacket, and the like can be also downloaded.

Each time the audio data of the music piece is downloaded as mentioned above, its history information is stored in the IC card in the IRD 12. The information stored in the IC card is fetched to the charging server 5, for example, once a month and the user is charged in accordance with a use history of the data service. Thus, the copyright of the music piece to be downloaded can be also protected.

When the user wants to previously reserve the download, he presses the reservation record button 25. By pressing this button, the display of the GUI picture plane is switched and a list of music pieces which can be reserved is displayed on the whole screen. For example, this list can display the searched music pieces on a unit basis of one hour, one week, one channel, or the like. When the user selects the music pieces which he wants to reserve the download from the list, their information is registered in the IRD 12. When he wants to confirm the music pieces whose download has already been reserved, a list of reserved music pieces can be displayed on the whole screen by pressing the reserved list display button 26. The music pieces reserved in this manner are downloaded by the IRD 12 at a reserved time and stored in the storage device 13.

When the user wants to confirm the downloaded music pieces, a list of music pieces which have already been downloaded can be displayed on the whole screen by pressing the recording history button 27.

As mentioned above, in the receiving facilities 3 of the system to which the invention is applied, the list of music pieces is displayed on the GUI picture plane of the monitoring apparatus 14. By selecting the music piece in accordance with the display on the GUI picture plane, the music piece can be monitored. The words of the music piece, the profile of the artist, and the like can be known. Further, the download of the music pieces and their reservation, the display of the history of the download and the list of reserved music pieces, and the like can be performed.

Although the details will be explained hereinlater, the display of the GUI picture plane as shown in FIG. 4B, the display change on the GUI picture plane responded to the operation of the user for the GUI picture plane, and the audio output are realized by specifying the relations among the objects by the scenario description based on the MHEG system mentioned above. The objects mentioned here are image data serving as a part corresponding to each button shown in FIG. 4B and source data which is displayed in each display area.

In the present specification, it is assumed that an environment such that an output format (image display, audio output, etc.) of information according to a certain object is realized by specifying the relations among the objects by the scenario description like a GUI picture plane is referred to as a "scene". It is also assumed that a file itself of the scenario description is also included as an object forming one scene.

As described above, in the digital satellite broadcasting system to which the invention is applied, the broadcasting program is distributed and the audio data of the music piece is distributed by using a plurality of audio channels. A desired music piece can be searched by using the list of distributed music pieces or the like and the audio data can be easily stored in the storage device 13.

Various services besides the download of the music piece data mentioned above are also considered as services other than the service to provide the program in the digital satellite broadcasting system. For example, a method of preparing a picture plane to enable a purchase contact to be made as a GUI picture plane can be also considered on the assumption that a goods introducing program called a television shopping is broadcasted as a prerequisite.

1-3. Ground Station

Although the outline of the digital satellite broadcasting system as an embodiment has been described above, this system will now be described further in detail hereinbelow. A construction of the ground station 1 will be first described with reference to FIG. 5.

The following description is made in the following conditions as a prerequisite.

In the embodiment, upon transmission from the ground station 1 to the receiving facilities 3 through the satellite 2, a DSM-CC (Digital Storage Media-Command and Control) protocol is used.

As already known, according to the DSM-CC (MPEG-part6) system, commands and control systems for searching an MPEG encoding bit stream stored in the digital storage media (DSM), for example, through some network or storing the stream into the DSM are specified. In the embodiment, the DSM-CC system is used as a transmission standard in the digital satellite broadcasting system.

To transmit contents (a set of objects) of a data broadcasting service (for example, GUI picture plane or the like) by the DSM-CC system, it is necessary to define a description format of the contents. In the embodiment, the foregoing MHEG is used as a definition of the description format.

In the construction of the ground station 1 shown in FIG. 5, a TV program source registering system 31 registers the source data obtained from the TV program source server 6 into an AV server 35. The source data is sent to a TV program transmitting system 39. Video data is compressed by, for example, the MPEG2 system and audio data is packetized by, for example, the MPEG audio system. An output of the TV program transmitting system 39 is sent to a multiplexer 45.

In a music piece source registering system 32, the source data from the music piece source server 7, namely, the audio data is supplied to an MPEG audio encoder 36A and an ATRAC encoder 36B. In the MPEG audio encoder 36A and ATRAC encoder 36B, an encoding process (compression encoding) is performed to the supplied audio data and, after that, it is registered into an MPEG audio server 40A and an ATRAC audio server 40B.

The MPEG audio data registered in the MPEG audio server 40A is transmitted to an MPEG audio transmitting system 43A and packetized here and, thereafter, transmitted to the multiplexer 45. The ATRAC data registered in the ATRAC audio server 40B is sent as 4-times speed ATRAC data to an ATRAC audio transmitting system 43B and packetized here and sent to the multiplexer 45.

In an audio additional information registering system 33, the audio additional information serving as source data from the audio additional information server 8 is registered in an audio additional information database 37. The audio additional information registered in the audio additional information database 37 is transferred to an audio additional information transmitting system 41, similarly packetized here, and transmitted to the multiplexer 45.

In a GUI source registering system 34, the GUI data serving as source data from the GUI data server 9 is registered in a GUI source database 38.

The GUI source data registered in the GUI source database 38 is transmitted to a GUI authoring system 42, by which a process is performed so as to have a data format in which it can be outputted as a GUI picture plane, namely, a "scene" mentioned in FIG. 4.

That is, as data that is transmitted to the GUI authoring system 42, for example, so long as a GUI picture plane to download the music piece, there is still image data of the album jacket, text data such as words or the like, further, audio data to be outputted in accordance with the operation, or the like.

Although each of the foregoing data is called a monomedia, in the GUI authoring system 42, those monomedia data is encoded by using an MHEG authoring tool and enabled to be handled as objects.

For example, contents of MHEG-5 is formed together with a scenario description file (script) specifying the relations among the objects so as to obtain the display format of the scene (GUI picture plane) as described in FIG. 4B and the output format of the image and audio data according to the operation.

In the GUI picture plane as shown in FIG. 4B, image ○ audio data (MPEG video data, MPEG audio data) based on the source data of the TV program source server 6 is displayed on the GUI picture plane and audio outputted, and an output format according to the operation is given.

Therefore, as a scenario description file mentioned above, in the GUI authoring system 42, the image ○ audio data based on the source data of the TV program source server 6, the MPEG audio data based on the music piece source data of the music piece source server 7, and further, the audio additional information based on the audio additional information server 8 are also handled as objects as necessary and specified by the script of MHEG.

As data of the MHEG contents which is transmitted from the GUI authoring system 42, there are a script file, various still image data files as objects, a text data file, and the like. However, the still image data is data of 640×480 pixels compressed by, for example, a JPEG (Joint Photograph Experts Group) system, and the text data is a file within, for example, 800 characters.

The data of the MHEG contents obtained by the GUI authoring system 42 is transmitted to a DSM-CC encoder 44.

In the DSM-CC encoder 44, the transmitted data is converted to a transport stream (hereinafter, also abbreviated to a TS (Transport Stream)) of a format such that it can be multiplexed to the data stream of the video and audio data according to the MPEG2 format, packetized, and outputted to the multiplexer 45.

In the multiplexer 45, the video packet and audio packet from the TV program transmitting system 39, the audio packet from the MPEG audio transmitting system 43A, the 4-times speed audio packet from the ATRAC audio transmitting system 43B, the audio additional information packet from the audio additional information transmitting system 41, and the GUI data packet from the GUI authoring system 42 are time base multiplexed and enciphered on the basis of the key information outputted from the key information server 10 (FIG. 1).

An output of the multiplexer 45 is transmitted to a radio wave transmitting system 46, by which processes such as addition of, for example, an error correction code, modulation, frequency conversion, and the like are performed and, after that, the processed signal is transmitted and outputted from the antenna toward the satellite 2.

1-4. Transmitting Format

A transmitting format of the embodiment specified on the basis of the DSM-CC system will now be described.

Figure 6:
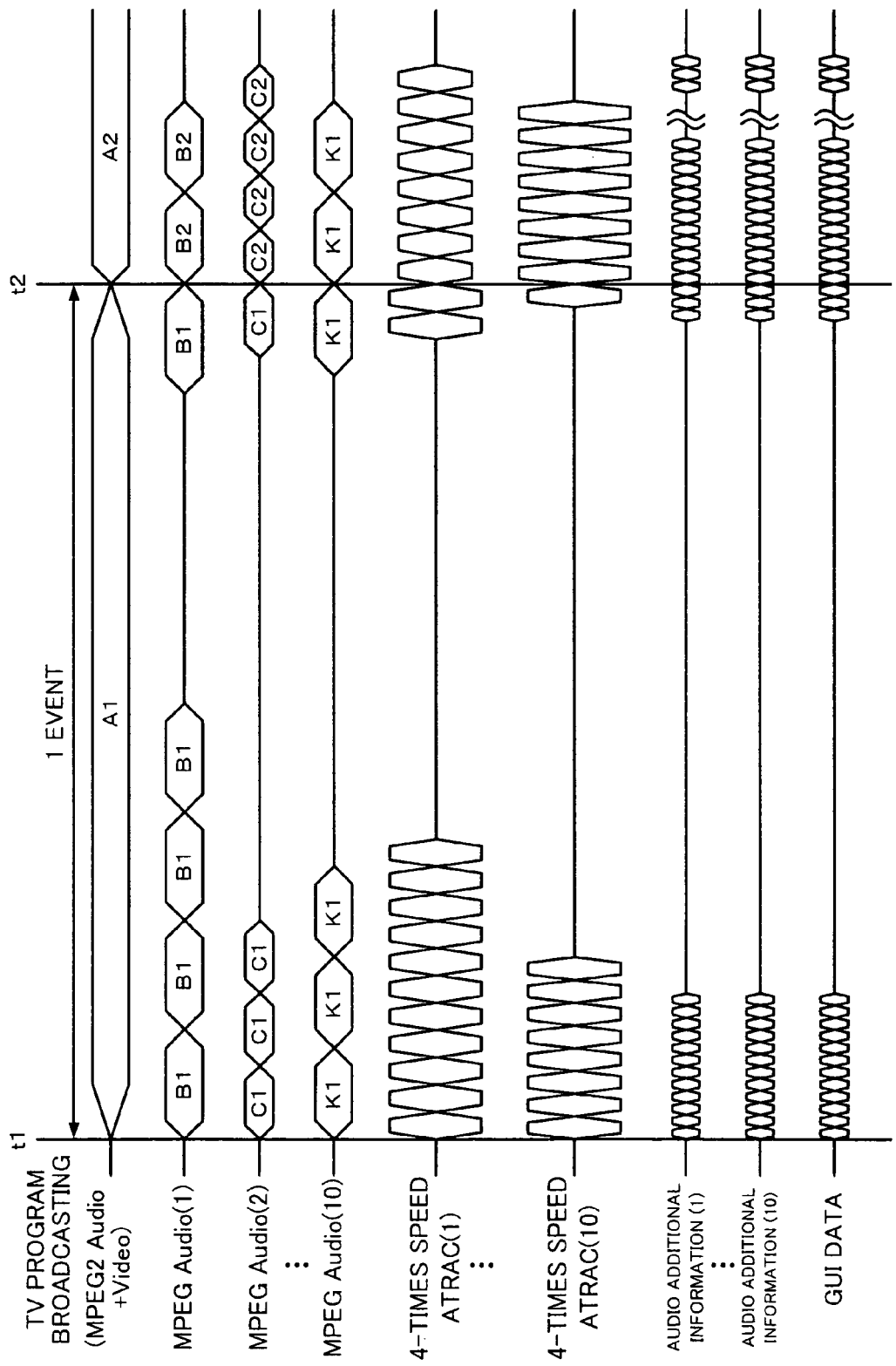
FIG. 6 is a diagram showing data which is transmitted from the ground station.

FIG. 6 shows an example of data when it is transmitted and outputted from the ground station 1 to the satellite 2. As mentioned above, the respective data shown in the diagram has actually been time base multiplexed. In the diagram, as shown in FIG. 6, an interval between time t1 and time t2 is set to one event and an interval from time t2 is set to a next event. For example, in case of a channel of a music program, "Event" used here denotes a unit to change a set of line-up of a plurality of music pieces and is set to about 30 minutes or one hour in case of time.

As shown in FIG. 6, in the event for the interval between time t1 and time t2, a program having predetermined contents A1 is broadcasted by an ordinary program broadcasting of a motion image. In the event starting from time t2, a program as contents A2 is broadcasted. A motion image and an audio sound are broadcasted by the ordinary program.

As MPEG audio channels (1) to (10), for example, ten channels CH1 to CH10 are prepared. In this instance, in each of the audio channels CH1, CH2, CH3, . . . , and CH10, the same music piece is repetitively transmitted for a period of time during which one event is broadcasted. That is, in the period of time of the event in the interval between time t1 and time t2, a music piece B1 is repetitively transmitted in the audio channel CH1, a music piece C1 is repetitively transmitted in the audio channel CH2, and in a manner similar to the above, a music piece K1 is repetitively transmitted in the audio channel CH2. This point is also applied in common to 4-times speed ATRAC audio channels (1) to (10) shown under those audio channels.

That is, in FIG. 6, the MPEG audio channel and 4-times speed ATRAC audio channel in both of which the numerals shown in ( ) as channel numbers are equal indicate the same music piece. The numeral shown in ( ) serving as a channel number of the audio additional information denotes the audio additional information added to the audio data having the same channel number. Further, the still image data and text data which are transmitted as GUI data are also formed every channel. Those data is time-divisional multiplexed in the transport packet of MPEG2 as shown in FIGS. 7A to 7D and transmitted and reconstructed by using header information of each data packet in the IRD 12 as shown in FIGS. 7E to 7H.

Figure 7:
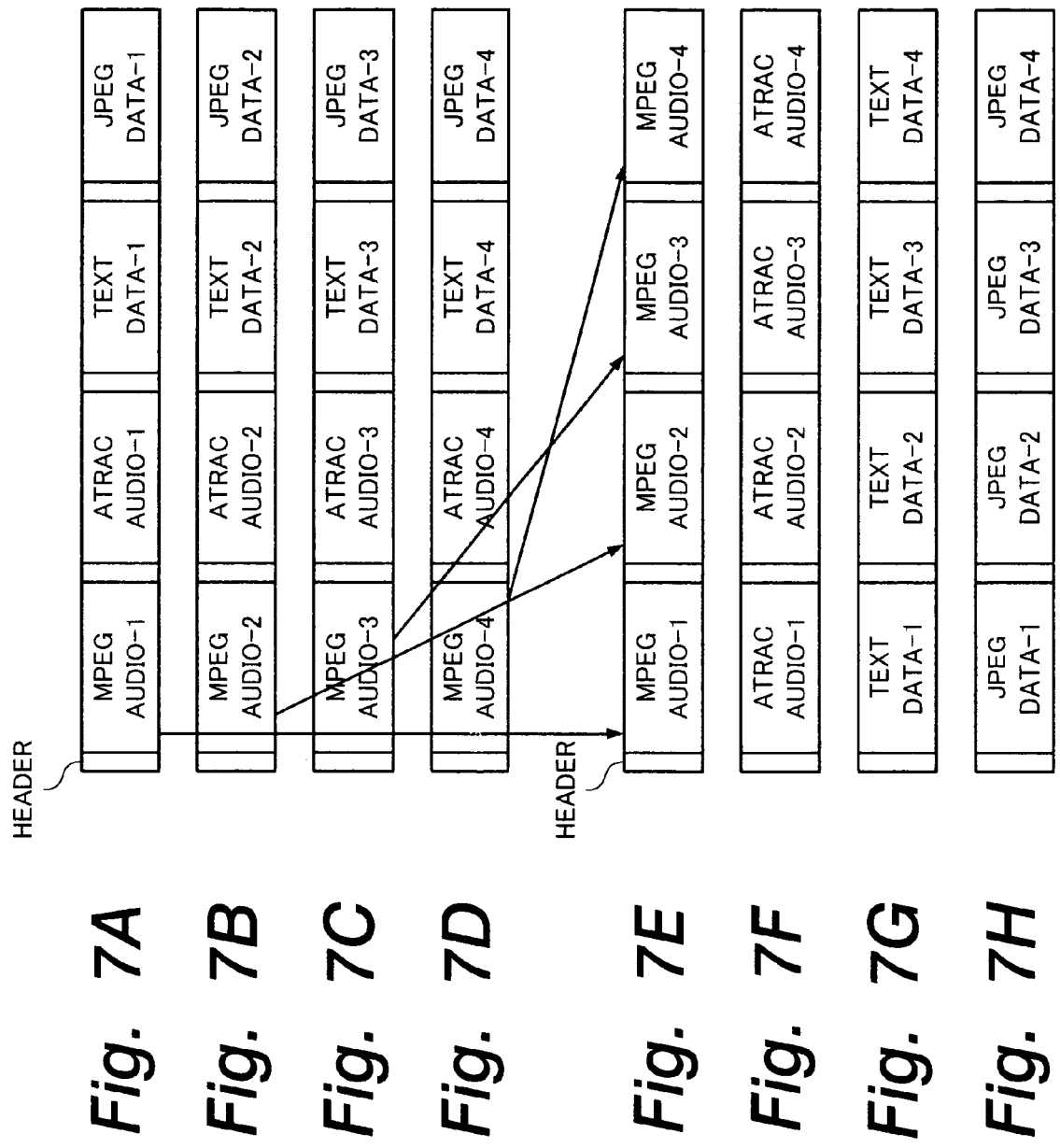
FIGS. 7A to 7H are explanatory diagrams showing a time-division multiplexing structure of transmission data.

In the transmission data shown in FIGS. 6 and 7 mentioned above, at least the GUI data which is used for data services (interactive broadcasting) is formed as follows logically in accordance with the DSM-CC system. Explanation will now be made by limiting to the data of the transport stream that is outputted from the DSM-CC encoder 44.

As shown in FIG. 8A, all of the data broadcasting services of the embodiment which is transmitted by the DSM-CC system are included in a route directory having a name of "Service Gateway". As objects included in the Service Gateway, kinds of directory, file, stream, stream event, and the like exist.

Among them, the files are set to individual data files such as still image, audio sound, text, and further, script described by MHEG, and the like.

For example, information that is linked to the other data services and AV steam (the MPEG video data and MPEG audio data serving as a TV program source, the MPEG audio data and ATRAC audio data serving as a music piece source, and the like) are included in the stream. The information of the link and the time information are likewise included in the stream event. The directory is a folder to combine the data that is concerned with each other.

In the DSM-CC system, as shown in FIG. 8B, those unit information and Service Gateway are respectively handled as units of objects and converted to a format of a BIOP message.

In the description regarding the invention, since the distinction among the three objects of the file, stream, and stream event is not essential, those files are represented by the objects as files and explained hereinbelow.

In the DSM-CC system, a data unit called a module shown in FIG. 8C is formed. This module denotes a data unit of a variable length which is formed by converting the data so as to include one or more objects transformed as BIOP messages shown in FIG. 8B and adding a BIOP header. The module becomes a buffering unit of the reception data on the receiving side, which will be explained hereinlater.

As a DSM-CC system, the relations among the objects in case of forming one module by a plurality of objects are not particularly specified or limited. That is, extremely speaking, even if one module is formed by two or more objects between the scenes having no relation, it never violates the provision under the DSM-CC system.

To transmit by a format called a section which is specified by the MPEG2 format, as shown in FIG. 8D, the module is mechanically divided on a data unit basis of a fixed length in principle called a "block". However, the last block in the module does not need to be set to a specified fixed length. The reason why the block is divided is based on a fact that there is a provision such that one section must not exceed 4 kbytes in the MPEG2 format.

In this case, the data unit as a block mentioned above and the section are similar.

The block obtained by dividing the module as mentioned above is converted to a format of the message called a DDB (Download Data Block) by adding a header as shown in FIG. 8E.

Control messages of DSI (Download Server Initiate) and DII (Download Indication Information) are formed in parallel with the conversion to the DDB.

The DSI and DII are information necessary when the module is obtained from the reception data on the receiving side (IRD 12). The DSI mainly has an identifier of a karrusel (module), which will be explained hereinlater, and information such as information (time during which the karrusel rotates once, a time-out value of the karrusel rotation) or the like concerned with the whole karrusel. The DSI also has information to know the location of the route directory (Service Gateway) of the data service (in case of the object karrusel system).

The DII denotes information which corresponds to each module included in the karrusel and has information such as size and version of each module, time-out value of the module, and the like.

As shown in FIG. 8F, the three kinds of messages of the DDB, DSI, and DII mentioned above are periodically and repetitively transmitted so as to correspond to the data unit of the section. Thus, on the receiver side, the module including the object that is necessary to obtain, for example, a target GUI picture plane (scene) can be received any time.

In the specification, such a transmitting system is called a "karrusel system" like a merry-go-round and it is assumed that the data transmitting format which is diagrammatically shown in FIG. 8F is called a karrusel.

As the number of modules included in one karrusel, a plurality of modules can be included. For example, a plurality of modules which are necessary for one data service can be also transmitted by one karrusel.

The "karrusel system" is divided into a level of "data karrusel system" and a level of "object karrusel system". Particularly, the object karrusel system is a system for transferring the objects having attributes such as file, directory, stream, service gateway, and the like as data by using the karrusel and largely differs from the data karrusel system with respect to a point that a directory structure can be handled. The object karrusel system is used in the system of the embodiment.

Figure 9:
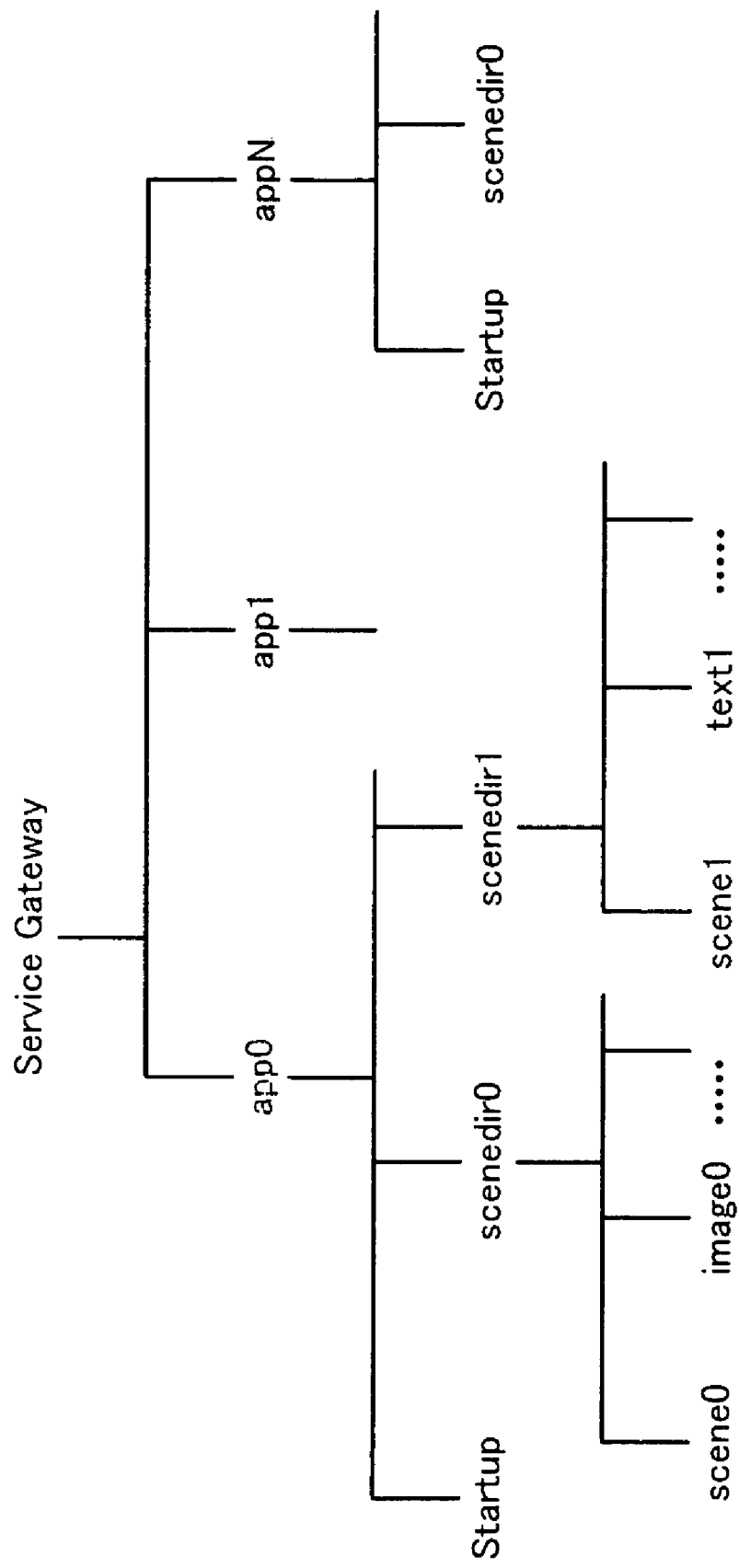
FIG. 9 is an explanatory diagram showing an example of a directory structure of data services.

FIG. 9 shows an example of a directory structure of a file (MHEGapplicationfile) as a data service according to the MHEG system. As mentioned above, the object karrusel system has a feature such that this directory structure can be handled.

Ordinarily, (MHEGapplicationfile) serving as an entrance of Service Domain certainly becomes a file of app0/startup existing just under Service Gateway.

Fundamentally, an application directory (app0, app1, . . . , appN) exists under the Service Domain (Service Gateway), and an application file called startup and a directory (scene0, scene1, . . . ) of each scene constructing the application exist under the application directory. Further, an MHEG scene file and each content file constructing the scene exist under the scene directory.

The GUI data which is transmitted by the karrusel as mentioned above, namely, the data which is outputted from the DSM-CC encoder 44 in FIG. 5 is outputted by a format of the transport stream. The transport stream has a structure shown in, for example, FIG. 10.

The transport stream is shown in FIG. 10A. The transport stream is a bit train defined in the MPEG system and is formed by coupling packets (transport packets) of a fixed length of 188 bytes as shown in the diagram.

As shown in FIG. 10B, each transport packet comprises: a header; an adaptation field for allowing the additional information to be included in a specific individual packet; and a payload (data area) indicative of the contents (video/audio data, etc.) of the packet.

The header actually consists of, for example, 4 bytes. As shown in FIG. 10C, sync bytes are certainly arranged in the head of the header. A PID (Packet_ID) as identification information of the packet, scramble control information showing the presence or absence of scramble, and adaptation field control information showing the presence or absence or the like of the subsequent adaptation field and payload are stored at a subsequent predetermined position.

On the basis of those control information, on the receiving apparatus side, a descramble is performed on a packet unit basis and necessary packets such as video/audio/data and the like can be separated and extracted by a demultiplexer. The time information serving as a reference for synchronous reproduction of the video/audio data can be also reproduced here.

As will be understood from the above description, the packets of video/audio/data of a plurality of channels have been multiplexed to one transport stream. However, besides them, a signal to select the station called a PSI (Program Specific Information), information (EMM/ECM) that is necessary for limitative reception (receiving function to decide the permission or inhibition of the reception of a toll channel in accordance with a personal contract situation), and an SI (Service Information) to realize a service such as an EPG or the like have also been multiplexed. The PSI will now be described.

The PSI comprises four tables as shown in FIG. 11. Each table is transmitted in a format according to MPEG System called a section format.

Figures 11A, 11B, 11C, 11D:
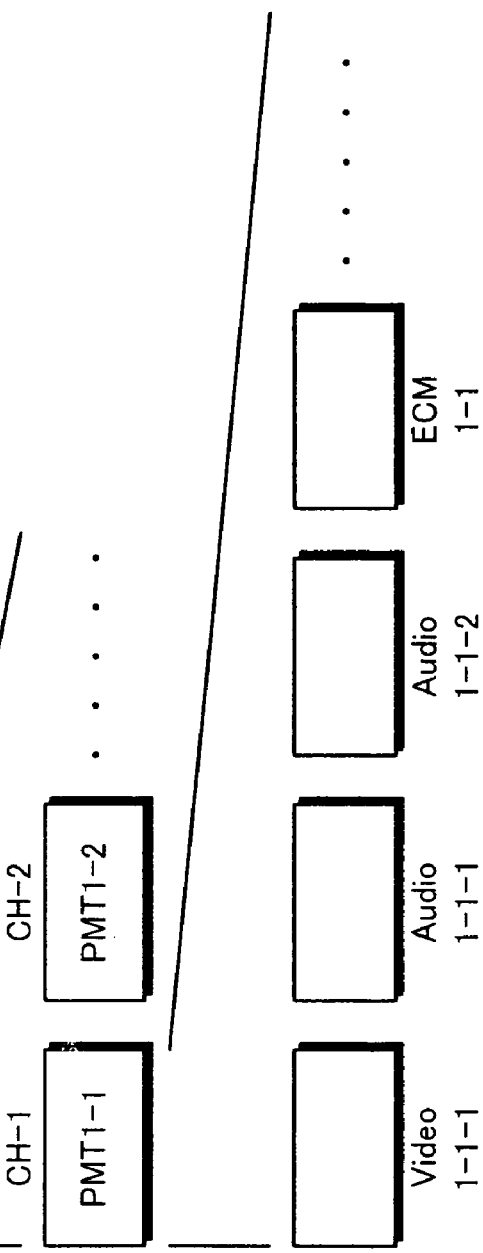
FIGS. 11A to 11D are explanatory diagrams showing a table structure of PSI.

FIG. 11A shows the table of an NIT (Network Information Table) and a CAT (Conditional Access Table).

In the NIT, the same contents have been multiplexed in all carriers. Transmission standards (plane of polarization, carrier frequency, convolution rate, etc.) of each carrier and a list of channels multiplexed there are described in the NIT. As a PID of the NIT, it is set to PID=0x0010.

In the CAT as well, the same contents have been multiplexed in all carriers. The PID of an EMM (Entitlement Management Message) packet that includes individual information such as identification of the limitative receiving and contract information or the like are described in the CAT. As a PID, it is shown by PID=0x0001.

In FIG. 11B, a PAT is shown as information having the contents peculiar to each carrier. Channel information in the carrier and the PID of the PMT showing the contents of each channel are described in the PAT. As a PID, it is shown by PID=0x0000.

As information of each channel in the carrier, a table of a PMT (Program Map Table) shown in FIG. 11C is provided.

In the PMT, the contents per channel have been multiplexed. For example, as shown in FIG. 11D, components (video/audio, etc.) constructing each channel and the PID of the PMT in which the PID of an ECM (Encryption Control Message) packet necessary to descramble has been described are designated by the PAT.

1-5. IRD

Figure 12:
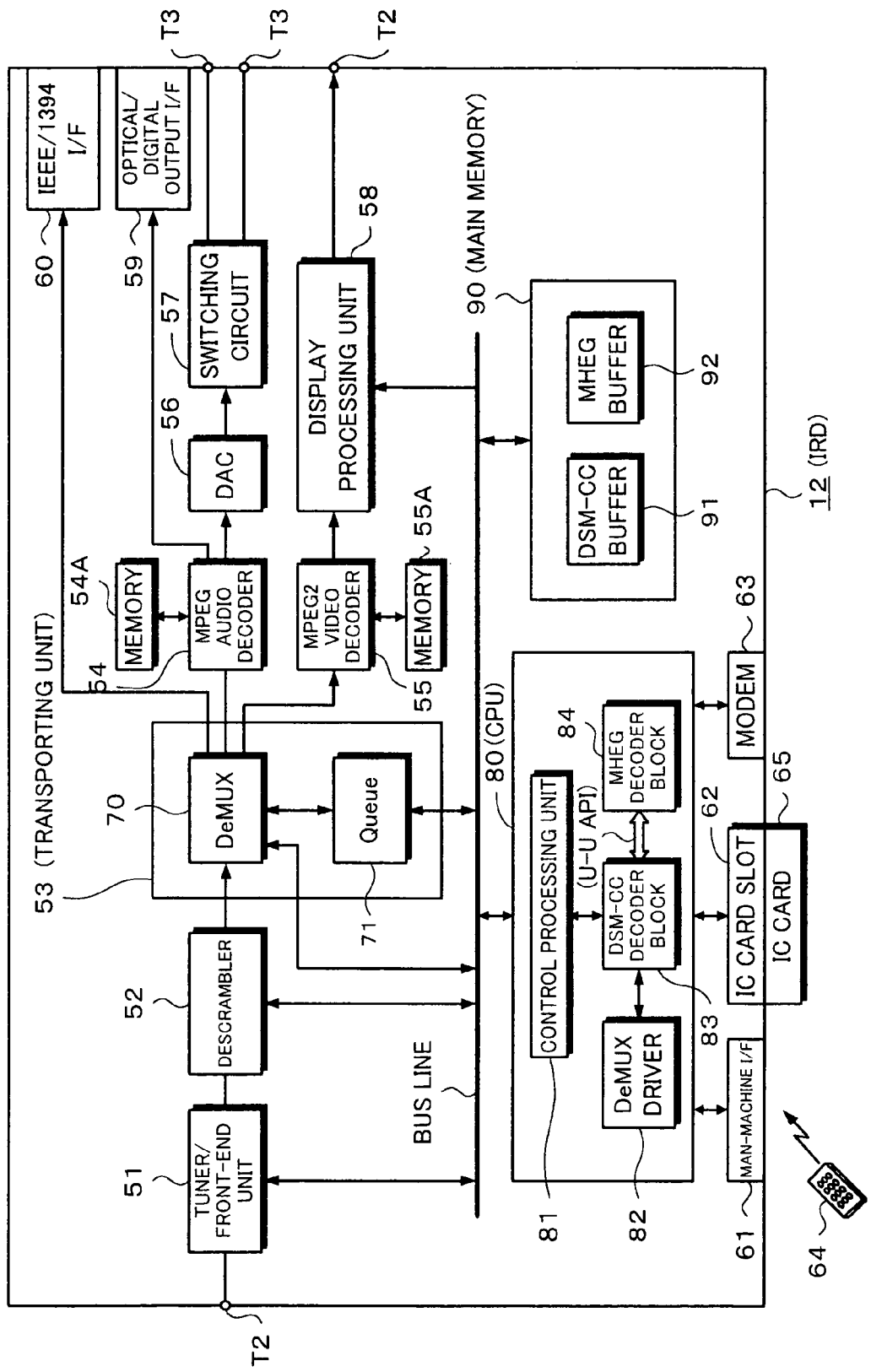
FIG. 12 is an explanatory diagram showing a construction of the IRD.

Subsequently, a constructional example of the IRD 12 provided for the receiving facilities 3 will now be described with reference to FIG. 12.

In the IRD 12 shown in the diagram, the reception signal converted to a predetermined frequency by the LNB 15 of the parabolic antenna 11 is inputted to an input terminal T1 and supplied to a tuner/front-end unit 51.

In the tuner/front-end unit 51, on the basis of a set signal which is supplied from a CPU (Central Processing Unit) 80 and in which the transmission standards or the like have been set, a carrier (receiving frequency) which is determined by the set signal is received and subjected to, for example, a Viterbi decoding process, an error correcting process, and the like, thereby obtaining a transport stream.

The transport stream obtained by the tuner/front-end unit 51 is supplied to a descrambler 52. In the tuner/front-end unit 51, the packet of the PSI is obtained from the transport stream and its station selection information is updated and the component PID of each channel in the transport stream is obtained and transmitted to, for example, the CPU 80. In the CPU 80, the obtained PID is used for a reception signal process.

In the descrambler 52, descramble key data stored in an IC card 65 is received through the CPU 80 and the PID is set by the CPU 80. A descrambling process is executed on the basis of the descramble key data and the PID and the resultant data is transmitted to a transporting unit 53.

The transporting unit 53 comprises a demultiplexer 70 and a queue 71 constructed by, for example, a DRAM or the like. The queue 71 is formed so that a plurality of memory areas corresponding to the module units are arranged like columns. For example, in the embodiment, the memory areas of 32 columns are provided. That is, information of up to 32 modules can be simultaneously stored.

As a schematic operation of the demultiplexer 70, in accordance with filter conditions set by a DeMUX driver 82 of the CPU 80, the necessary transport packet is separated from the transport stream supplied from the descrambler 52. If necessary, the queue 71 is used as a work area and the data in the formats as already shown in FIGS. 7E to 7H is obtained and supplied to each necessary function circuit portion.

The MPEG video data separated by the demultiplexer 70 is inputted to an MPEG2 video decoder 55 and the MPEG audio data is inputted to the MPEG audio decoder 54. Each packet of the MPEG video/audio data separated by the demultiplexer 70 is inputted to each decoder by a format called a PES (Packetized Elementary Stream).

The data of the MHEG contents in the transport stream is written into a corresponding memory area in the queue 71 by the demultiplexer 70 while being separated and extracted on a transport packet unit basis from the transport stream, so that it is formed so as to be collected on a module unit basis. The data of the MHEG contents collected to the module unit is written and held in a DSM-CC buffer 91 in the main memory 90 through a data bus by the control of the CPU 80.

As for the 4-times speed ATRAC data (compressed audio data) in the transport stream as well, for example, the necessary data is separated and extracted by the demultiplexer 70 on a transport packet unit basis and outputted to an IEEE1394 interface 60. In the case where the data is transmitted via the IEEE1394 interface 60, the video data, various command signals, and the like can be also transmitted in addition to the audio data.

In the MPEG2 video decoder 55 to which the MPEG video data according to the format as a PES has been inputted, a decoding process is performed in accordance with the MPEG2 format while using a memory 55A as a work area. The decoded video data is supplied to a display processing unit 58.

The video data inputted from the MPEG2 video decoder 55 and the video data of the GUI picture plane for data services or the like which is obtained from an MHEG buffer 92 in a main memory 90 as will be explained hereinlater are inputted to the display processing unit 58. The display processing unit 58 performs a desired signal process to the video data inputted as mentioned above, converts it to an analog audio signal by a predetermined television system, and outputs it to an analog video output terminal T2.

Thus, by connecting the analog video output terminal T2 and a video input terminal of the monitoring apparatus 14, for example, a display as shown in FIG. 4 mentioned above is performed.

An MPEG audio decoder 54 to which the MPEG audio data by the PES is inputted performs a decoding process in accordance with an MPEG audio format while using a memory 54A as a work area. The decoded audio data is supplied to a D/A converter 56 and an optical/digital output interface 59.

The D/A converter 56 converts the inputted audio data to an analog audio signal and outputs it to a switching circuit 57. The switching circuit 57 switches a signal path so as to output the analog audio signal to either the analog audio output terminal T3 or T4.

It is now assumed that the analog audio output terminal T3 is provided so as to be connected to an audio input terminal of the monitoring apparatus 14. The analog audio output terminal T4 is provided to output the downloaded music piece by an analog signal.

The optical/digital output interface 59 converts the inputted digital audio data to an optical digital signal and outputs it. In this case, the optical/digital output interface 59 conforms with, for example, IEC958.

The main memory 90 is used as a work area when the CPU 80 executes various control processes. In the embodiment, areas as a foregoing DSM-CC buffer 91 and the MHEG buffer 92 are allocated in the main memory 90.

A work area to generate image data (for example, image data of the GUI picture plane) in accordance with the description of the script by the MHEG system is provided in the MHEG buffer 92. The image data formed in this work area is supplied to the display processing unit 58 through the bus line.

The CPU 80 executes a whole control in the IRD 12. This control also incorporates a control about the data separation and extraction in the demultiplexer 70.

A process to construct the GUI picture plane (scene) in accordance with the description contents of the script by performing the decoding process to the data of the obtained MHEG contents and outputting it is also executed.

Therefore, as a CPU 80 of the embodiment, for example, at least the DeMUX driver 82, a DSM-CC decoder block 83, and an MHEG decoder block 84 are provided in addition to a control processing unit 81 to execute the main control process. In the embodiment, at least the DSM-CC decoder block 83 and MHEG decoder block 84 are constructed by software.

The DeMUX driver 82 sets the filter conditions in the demultiplexer 70 on the basis of the PID of the inputted transport stream.

The DSM-CC decoder block 83 has a function as a DSM-Manager. The data of the module units stored in the DSM-CC buffer 91 is reconstructed to data of the MHEG contents. A process regarding a desired DSM-CC decoding or the like is executed in accordance with the access from the MHEG decoder block 84.

The MHEG decoder block 84 accesses to the data of the MHEG contents obtained by the DSM-CC decoder block 83, namely, the data of the MHEG contents obtained by the DSM-CC buffer 91 and performs the decoding process to output the scene. That is, the scene is formed by realizing the relations among the objects specified by the script file of the MHEG contents. In this instance, when the GUI picture plane as a scene is formed, the MHEG buffer 92 is used and the image data of the GUI picture plane is formed in accordance with the contents of the script file.

A U—U API (DSM-CC U—U API (Application Portability Interface)) is used as an interface between the DSM-CC decoder block 83 and MHEG decoder block 84.

The U—U API is an interface which is used when, for example, the client (MHEG decoder block 84) side accesses to a DSM Manager object (server object to realize the function of the DSM: DSM-CC decoder block 83) and is an API such that the object having the attributes such as Service Gateway, Directory, File, Stream, Stream Event, and the like included in the karrusel can be accessed like a file system in a structural manner.

By accessing to the object included in the karrusel through the API, the program (client) using the karrusel can access to the object by using the bus name without concerning with the karrusel receiving operation.

Since the U—U API is a set of interfaces specified so that they can be used irrespective of the data transfer system of the lower layer, the U—U API has an advantage such that the program which uses this API can be used in any data transfer system which provides the U—U API.

An operation example to extract the target object that is necessary to form one scene from the transport stream by the control of the CPU 80 will now be described.

In the DSM-CC, an IOR (Interoperable Object Reference) is used to show the location of the object in the transport stream. Tag (association_tag) information to identify a DII which the information of the module including the object has is also included in the IOR besides an identifier corresponding to the karrusel to find the object, an identifier of the module including the object (this identifier is expressed as module_id hereinbelow), and an identifier to specify the object in one module (this identifier is expressed as object_key hereinbelow).

The DII having the module information includes: information such as module_id about each of one or more modules, a size of module, and version; and tag (association_tag) information to identify the modules.

When the IOR extracted from the transport stream is identified by the CPU 80, processes for obtaining the objects shown by the IOR by receiving and separating them are, for example, as shown below.

(Pr1) In the DeMUX driver 82 of the CPU 80 obtains the PID by searching an elementary stream (hereinafter, abbreviated to ES) having the same value as that of association_tag of the IOR from an ES loop of the PMT in the karrusel. The DII is included in the ES having the PID.

(Pr2) The PID and table_id_extension are set as filter conditions into the demultiplexer 70. Thus, the demultiplexer 70 separates the DII and outputs it to the CPU 80.

(Pr3) In the DII, association_tag of the module corresponding to module_id included in the IOR mentioned above is obtained.

(Pr4) The ES having the same value as that of association_tag is searched from the ES loop (karrusel) of the PMT, thereby obtaining the PID. The target module is included in the ES having this PID.

(Pr5) The PID and module_id are set as filter conditions and the filtering by the demultiplexer 70 is performed. The transport packet separated and extracted in accordance with the filter conditions is stored in a desired memory area (column) in the queue 71, so that the target module is finally formed.

(Pr6) The object corresponding to object_key included in the foregoing IOR is extracted from this module and it becomes the target object. The object extracted from the module is written in a predetermined area in, for example, the DSM-CC buffer 91.

For example, by repeating the above operations, collecting the target objects, and storing them into the DSM-CC buffer 91, the MHEG contents forming the necessary scene is obtained.

In a man-machine interface 61, a command signal transmitted from the remote controller 64 is received and transmitted to the CPU 80. The CPU 80 executes a desired control process so as to obtain the operation of the apparatus according to the received command signal.

The IC card 65 is inserted into an IC card slot 62. Information is written and read out to/from the inserted IC card 65 by the CPU 80.

A modem 63 is connected to the charging server 5 through the telephone line 4 and controlled so that a communication between the IRD 12 and charging server 5 is performed by the control of the CPU 80.

A flow of the signal of the video/audio source in the IRD 12 with the above construction will now be complementarily explained with reference to the display format described in FIG. 4.

In case of outputting an ordinary program as shown in FIG. 4A, the MPEG video data and MPEG audio data of the necessary program are extracted from the inputted transport stream and subjected to a decoding process, respectively. The video data and MPEG audio data are outputted to the analog video output terminal T2 and analog audio output terminal T3, so that an image display and an audio output of the broadcasting program are performed in the monitoring apparatus 14.

In case of outputting the GUI picture plane shown in FIG. 4B, the data of the MHEG contents necessary for the GUI picture plane (scene) is separated and extracted from the inputted transport stream by the transporting unit 53 and stored in the DSM-CC buffer 91. The DSM-CC decoder block 83 and MHEG decoder block 84 function as mentioned above by using this data, so that the image data of the scene (GUI picture plane) is formed by the MHEG buffer 92. The image data is supplied to the analog video output terminal T2 through the display processing unit 58, so that the GUI picture plane is displayed in the monitoring apparatus 14.

When the music piece is selected from the list 21B of the music pieces on the GUI picture plane shown in FIG. 4B and the audio data of the music piece is monitored, the MPEG audio data of this music piece is derived by the demultiplexer 70. The MPEG audio data is converted to an analog audio signal through the MPEG audio decoder 54, D/A converter 56, switching circuit 57, and analog audio output terminal T3 and outputted to the monitoring apparatus 14.

When the download button 28 is pressed on the GUI picture plane shown in FIG. 4B and the audio data is downloaded, the audio data of the music piece to be downloaded is extracted by the demultiplexer 70 and outputted to the analog audio output terminal T4, optical/digital output interface 59, or IEEE1394 interface 60.

Particularly, when the MD recorder/player 13A corresponding to IEEE1394 shown in FIG. 2 is connected to the IEEE1394 interface 60, in the demultiplexer 70, the 4-times speed ATRAC data of the downloaded music piece is extracted and recorded to the disc loaded in the MD recorder/player 13A via the IEEE1394 interface 60. In this instance, for example, the still image data of the album jacket compressed by, for example, the JPEG system and the text data such as words and profile of the artist and the like are also extracted from the transport stream by the demultiplexer 70 and transferred to the MD recorder/player 13A via the IEEE1394 interface 60. The MD recorder/player 13A can record the still image data and the text data into predetermined areas on the loaded disc.

Figure 13:
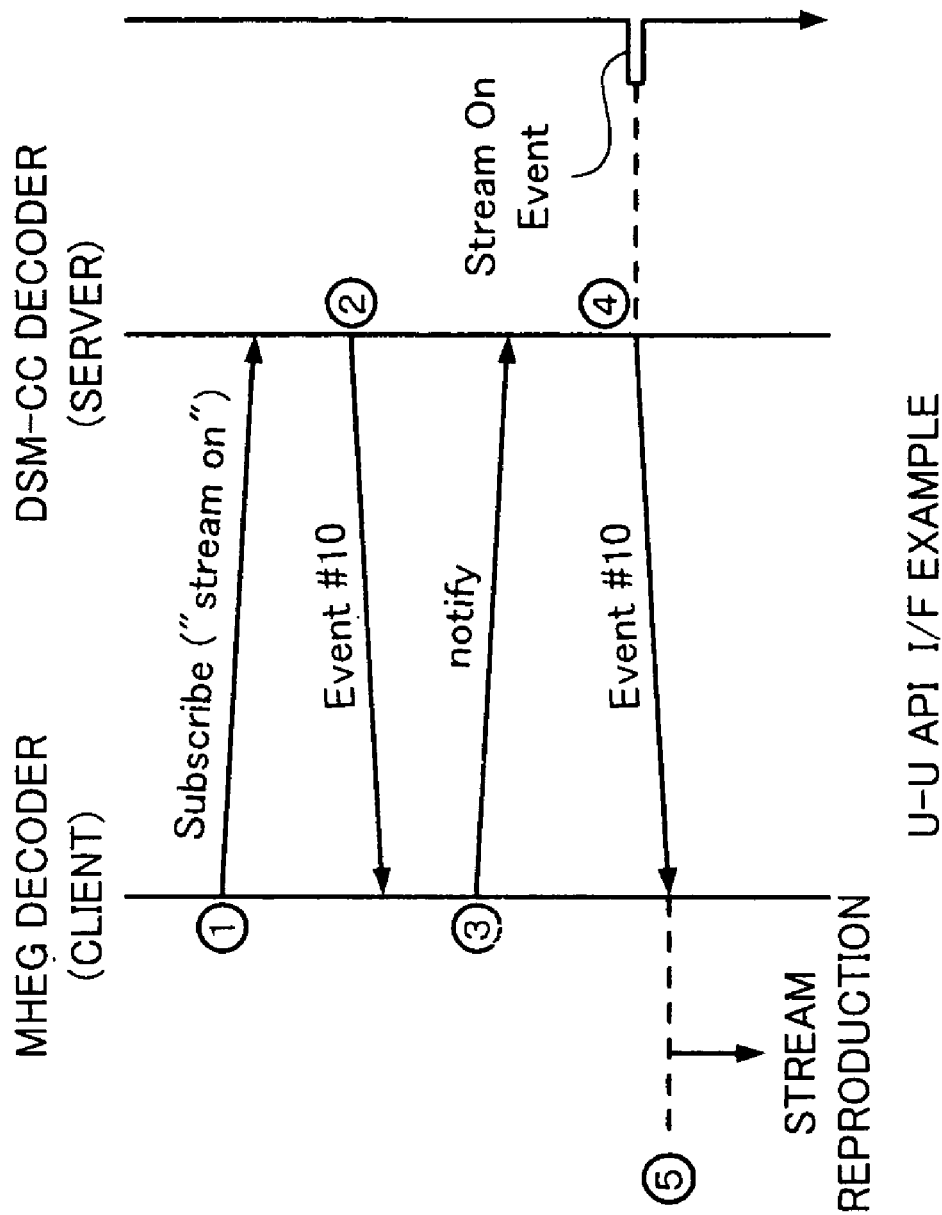
FIG. 13 is an explanatory diagram showing an example of a general control operation of a U—UAPI interface.

A general example of the U—U API interface will now be described with reference to FIG. 13.

A case where the MHEG decoder block 84 as a client reproduces the stream will now be explained as an example. In the diagram, a numeral shown in ○ indicates a processing procedure of the MHEG decoder block 84 and DSM-CC decoder block 83. Explanation will now be made in accordance with the processing procedure.

(Process 1) The client transmits Event::Subscribe ("stream on") to the server at a desired timing.

Event::Subscribe ("stream on") is an interface to subscribe a message that a "stream on" event is received later to the server.

(Process 2) When Event::Subscribe ("stream on") is received, the server returns the event number corresponding to the "stream on" event. In this case, Event#10 is set and transmitted to the client.

(Process 3) When the event number is obtained, the client outputs Event::notify to the server.

Event::notify is an interface such that if some event is generated on the server side, its notification is requested from the client side to the server side.

Figure 15:
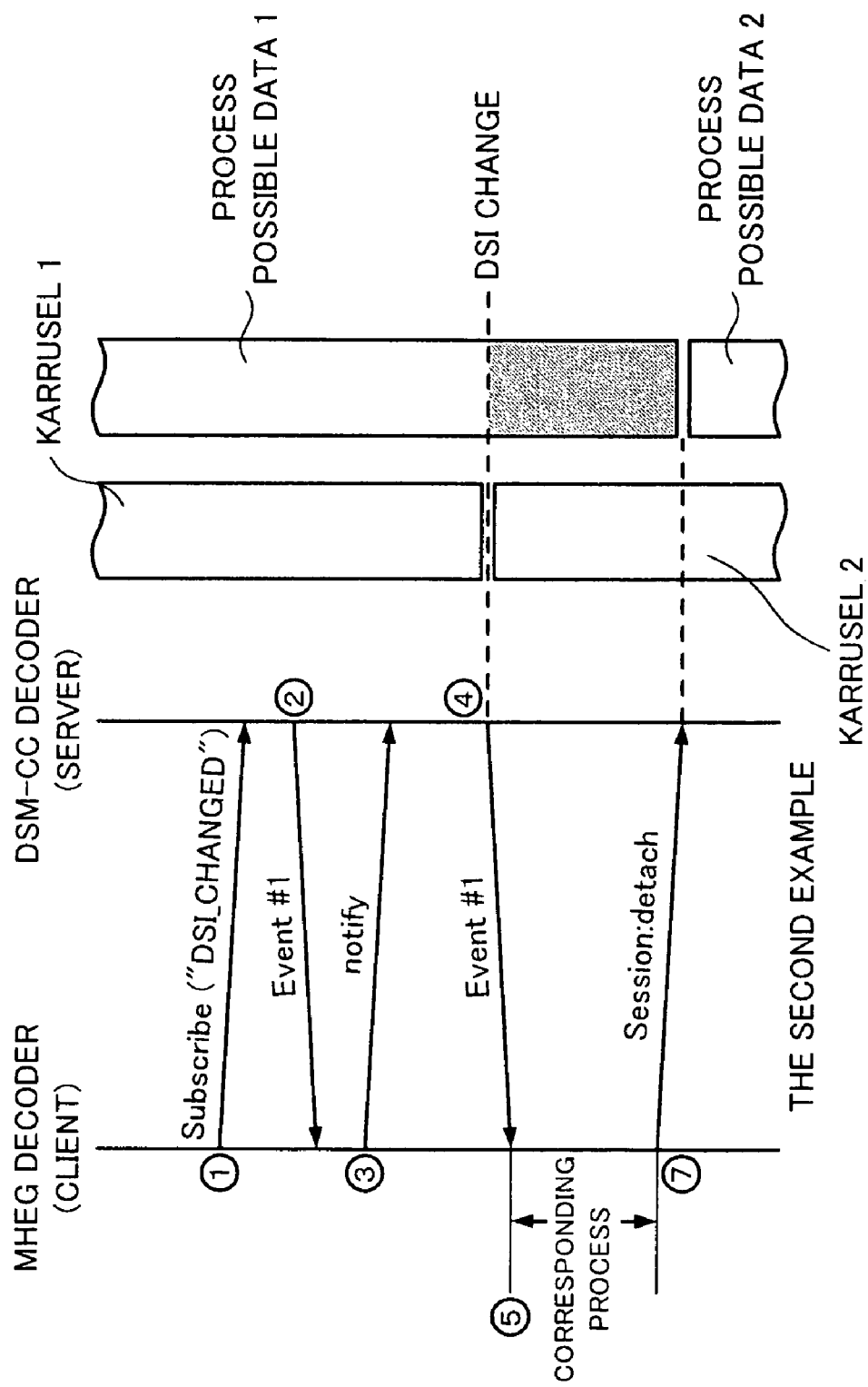
FIG. 15 is an explanatory diagram showing a karrusel switching notice control as a second example.

(Process 4) As a responding process for the notification of (Process 3), if the "stream on" event is generated in the reception data at a certain timing as shown in FIG. 15, the server transmits Event#10 as an event number set for the "stream on" event to the client.

(Process 5) The client knows the generation of the "stream on" event by the received Event#10. In this case, for example, the MHEG decoding process for stream reproduction is executed.

2. Processes Upon Karrusel Switching

Processes upon karrusel switching will now be described. When the digital data broadcasting by the object karrusel system is received, now assuming that the contents (broadcasting contents) of the karrusel are switched during the broadcasting, the data of the karrusel before the switching is invalidated at that time point and the system enters a state where it is possible to access to the karrusel of the new contents. As a data unit to form the karrusel, for example, data corresponding to one event shown in FIG. 6 is set.

Hitherto, the server side (DSM-CC decoder block 83) does not have an interface such that at a timing when the contents of the karrusel are switched, it is notified to the client side (MHEG decoder block 84). That is, in the IRD 12, even if the contents of the karrusel are switched in the reception data on the DSM-CC decoder block 83 side, it cannot be immediately notified to the MHEG decoder block 84 side. In the subsequent description, the MHEG decoder block 84 is referred to as a client and the DSM-CC decoder block 83 is referred to as a server.

In the case where, in spite of a state where the contents of the karrusel used for the scene display at present were switched is not notified, the client subsequently reads out this karrusel from the server, the data different from the previous karrusel is read out and displayed by this karrusel. For example, when the client wants to maintain the previous display state irrespective of the switching of the contents of the karrusel, an inconvenience is caused by such an operation on the client side. As such a situation, for example, there can be mentioned a case where in a state in which the user is monitoring a broadcasting which enables the user to purchase music pieces or the like, the contents of the karrusel are switched while the user is performing an inputting operation or the like regarding the purchase, or the like. In such a case, at a point when the contents of the karrusel are switched, the purchasing operation which has been being performed so far becomes invalid and the purchase fails.

On the contrary, in the case where it is necessary to change a part of the contents of the present scene display in correspondence to the switching of the contents of the karrusel, the display of the scene is not changed until the switched karrusel is read out from the server at a certain opportunity. That is, the timing to switch the display contents of the scene is delayed than the actual timing to switch the contents of the karrusel.

As mentioned above, since the fact that the contents of the karrusel were switched is not notified to the client, some inconvenience occurs.

2-1. FIRST EXAMPLE

In the embodiment, therefore, as will be explained hereinlater, the client (MHEG decoder block 84) side is enabled to know the switching of the contents of the karrusel, thereby making it possible to perform the proper MHEG decoding process in correspondence to it. As an interface to notify the client of the fact that the contents of the karrusel were switched, an interface according to U—U API is used.

As mentioned above, the conventional DSM-CC decoder block 83 does not have the interface to notify the client of the fact that the contents of the karrusel were switched at such a switching timing. The identification information indicative of the switching of the karrusel is not transmitted from the broadcasting station.

Figure 8:
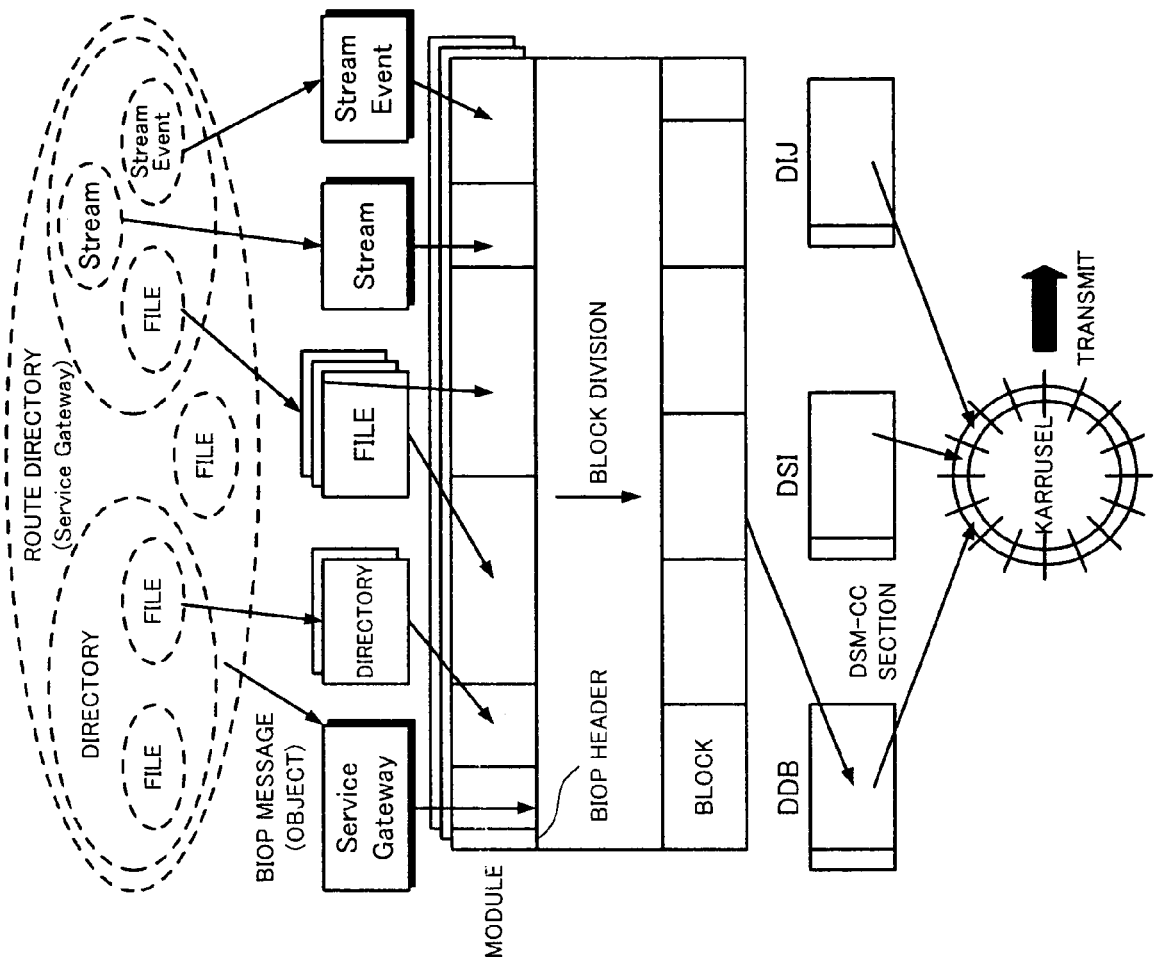
FIGS. 8A to 8F are explanatory diagrams showing a transmitting format by DSM-CC.

However, when the contents of the karrusel are switched, they are reflected to the contents of the DSI described in FIG. 8. That is, the information regarding the contents of the karrusel in the DSI is changed and it is used in the embodiment.

As a karrusel switching notice control of the embodiment, an event of "DSI_CHANGED" is added as an interface of the U—U API in the first example. The "DSI_CHANGED" event denotes that a new DSI message whose contents were changed is received on the server side. The karrusel switching notice control is executed as shown in (Process 1) to (Process 4) in FIG. 14.

(Process 1) The client transfers Event::Subscribe ("DSI_CHANGED") to the server.

(Process 2) When Event::Subscribe ("DSI_CHANGED") is received, the server returns the event number set for the "DSI_CHANGED" event to the client. In this case, Event#1 is set for the "DSI_CHANGED" event and returned.

(Process 3) After the event number is obtained, the client transmits Event::notify to the server and, if some event including "DSI_CHANGED" is generated, a request to notify the server of it is issued.

(Process 4) The server is allowed to hold the DSI included in the received karrusel data. It is assumed that the DSI included in the received karrusel data was changed at a certain timing after the reception of Event::notify. This means that the contents of the karrusel shown by the DSI were switched.

As mentioned above, when the DSI is changed, namely, the "DSI_CHANGED" event is generated, the server transmits the event number (Event#1) set for the "DSI_CHANGED" event to the client as a response to Event::notify of the (Process 3).

Thus, the client can know at least the fact that the karrusel was switched in the data service which is at present being broadcasted almost in a real-time manner.

In response to this notice, some proper MHEG decoding process (output control of the scene or the like) corresponding to the switching of the contents of the karrusel can be executed as a (Process 5). In the example shown in FIG. 14, the client can start the process using the data of the karrusel 2 after the switching at a point when the DSI is changed.

That is, in the invention, the client can detect the switching timing of the karrusel by the (Process 4). On the basis of this timing, the data of the karrusel 2 after the switching which was read in the DSM-CC buffer 91 can be requested and stored in the MHEG buffer 92. Thus, the GUI picture plane by the data of the karrusel 2 after the switching can be constructed and outputted at a timing that is almost the same as the switching timing of the karrusel.

Figure 14:
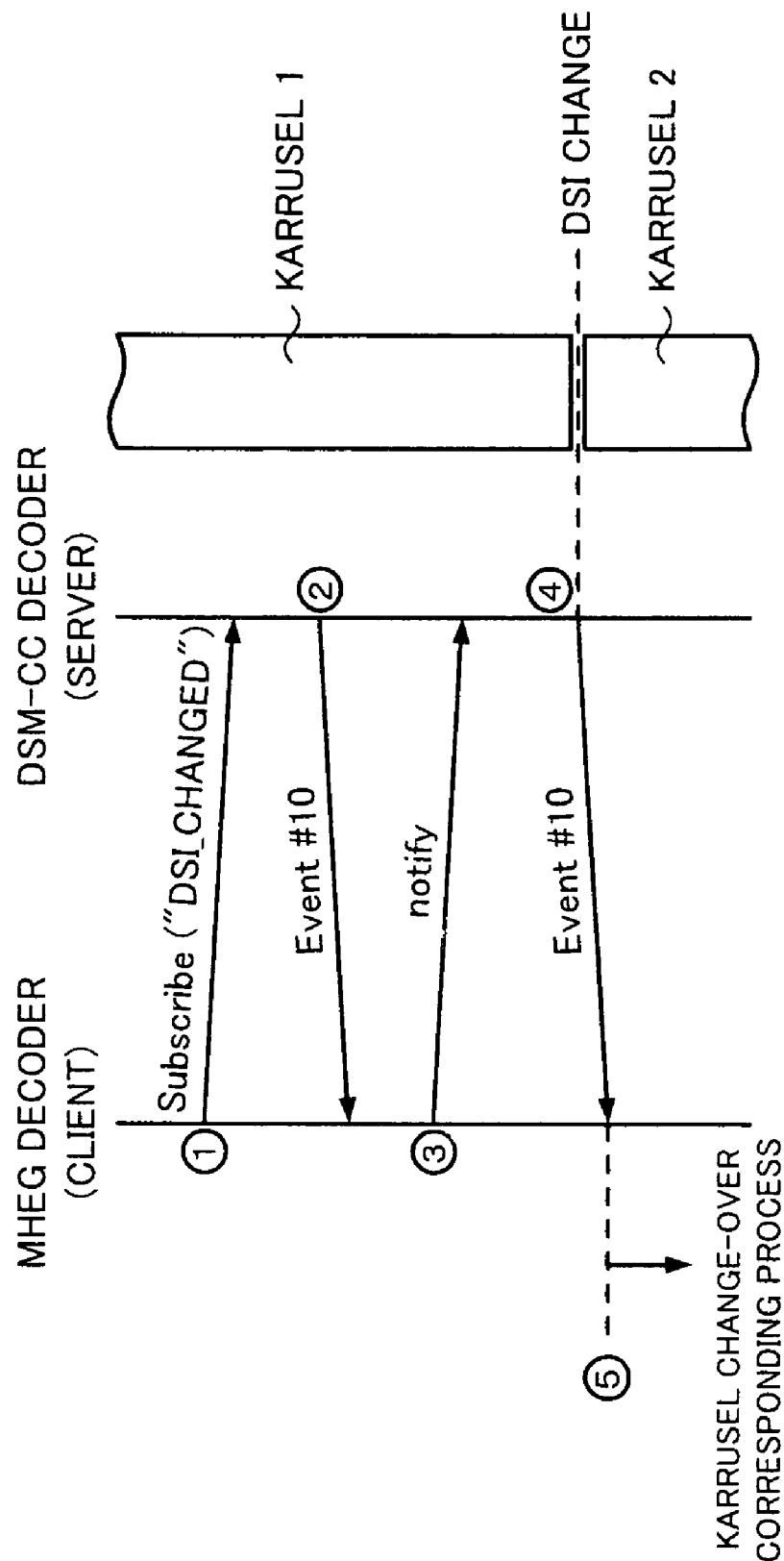
FIG. 14 is an explanatory diagram showing a karrusel switching notice control as a first example.

Although Event::notify shown as a (Process 3) in FIG. 14 requests the server from the client to notify the client of the fact that some event was generated as mentioned above, actually, if a notice which responds to Event::notify is performed on the server side due to the generation of some event, Event::notify is invalidated at this time point.

Therefore, in the actual process shown in FIG. 14, after Event::Subscribe ("DSI_CHANGED") is first issued as a (Process 1), if the event responsive to Event::notify which was once issued is notified in order to notify the client of the generation of the "DSI_CHANGED" event on the server side without missing it, next Event::notify is immediately issued after that. That is, on the server side, it is constructed such that the period of time during which Event::notify is invalid does not occur as much as possible.

By this method, during the data service broadcasting, each time the DSI is switched, the generation of the "DSI_CHANGED" event can be successively notified to the client almost in a real-time manner without missing it.

In consideration of a process for enabling the switching of the DSI to be successively notified without missing it during the data service broadcasting, the interface to transfer Event::Subscribe ("DSI_CHANGED") of the (Process 1) from the client to the server executes at a timing just after a program (MHEG engine) of the MHEG decoder block 84 was activated and a timing when the data contents of the karrusel are switched.

The case of activating the program of the MHEG decoder block 84 corresponds to the timing when, for example, from a state where the broadcasting which is not accompanied with the service data broadcasting was being received so far, for example, the channel is switched or the program is changed, so that a program accompanied with the data service broadcasting is newly received, or the like.

2-2. SECOND EXAMPLE

Subsequently, the karrusel switching notice control as a second example will be described with reference to FIG. 15. In the second example, after the event number (Event#1) is transmitted (Process 4) to the client (namely, after the karrusel was switched), the client can continuously use the karrusel 1 before switching for a predetermined time. Since a processing step starting from the (Process 1) and reaching the (Process 4) is similar to that in the first example, its description is omitted.

In the example, when the event number (Event#1) is transmitted (Process 4) in the client, the karrusel 2 after the switching is received by the IRD 12. However, the process possible data 1 of the karrusel 1 before switching is continuously used as a corresponding process (Process 6).

In this case, the server does not disclose the data of the karrusel 2 after the switching to the client, discloses the data (for example, a hatched portion) of the karrusel 1 fetched as process possible data 1 in the DSM-CC buffer 91, and sets so that the client accesses to them. That is, a control so as to delay the timing to read out the data of the karrusel 2 after the switching for the change of the DSI is performed.

After that, the client transmits Session::detach at a predetermined timing (Process 7). Session::detach is a release request event for allowing the client to request the release of the process possible data 2 corresponding to the karrusel 2 which is not disclosed by the server by the (Process 6), and is transmitted to the server at a predetermined timing.

Thus, the server enables the client to access to the process possible data 2 corresponding to the karrusel 2. Therefore, after Session::detach is transmitted, the client can perform a desired process on the basis of the process possible data 2 of the karrusel 2 newly disclosed by the server.

As a timing to transmit Session::detach, for example, an elapsed time from the start of the (Process 6) can be preset or it can be set to a timing when it is determined that the data that is being processed at present, namely, the process possible data 1 in the example becomes unnecessary. As a factor to discriminate that the process possible data 1 becomes unnecessary, for example, there is a case where a desired operation by the user is detected, or the like.

As mentioned above, according to the second example, even after the karrusel is switched, the process can be performed by continuously using the data before it is switched. Therefore, it is possible to construct the system such that the process that is at present being performed is not interrupted in association with the switching of the karrusel.

3. Processes Upon Object Updating

Processes upon updating of the object will now be described. For example, when the digital data broadcasting by the object karrusel system is being received, now assuming that the version of a certain object included in the karrusel is updated during the broadcasting, the data of the object before updating is invalidated at this time point and the system enters a state where it is possible to access to the object of the new version.

However, the conventional DSM-CC system does not have an interface to notify the client side of a fact that the version of the object in the karrusel was updated at such a timing. That is, in case of the IRD 12, even if there is a version-up of a certain object in the reception data on the DSM-CC decoder block 83 side, this fact cannot be immediately notified to the MHEG decoder block 84 side.

In the case where, in spite of a state where the version-up of the object used at present in the scene display is not notified, the client subsequently reads out the object from the server, the data different from the previous object is read out and displayed by this object. For example, in the case where the client wants to maintain the previous display state irrespective of the version-up of the object, an inconvenience is caused by such an operation on the client side.

On the contrary, if it is necessary to change a part of the contents of the present scene display in correspondence to the version-up of the object, the display of the scene is not changed until the updated object is read out from the server at a certain opportunity. That is, the timing to update the display contents of the scene is delayed than the actual timing for version-up of the object.

As mentioned above, since the version-up of the object is not notified to the client, some inconvenience occurs.

In the embodiment, therefore, as will be explained hereinlater, the client (MHEG decoder block 84) side is enabled to know the version-up of the object, thereby making it possible to obtain the proper MHEG decoding process corresponding to it. Further, by enabling the version-up object to be specified, the object can be again efficiently read out from the server side. As an interface for such a notification of the version-up of the object, an interface which conforms with U—U API is used.

3-1. FIRST EXAMPLE

As mentioned above, the DSM-CC does not have the interface to notify the client of the fact that the object in the karrusel was updated at such an updating timing. The identification information showing the updating of the object is not transmitted from the broadcasting station.

In the DSM-CC however, when some object is updated (version-up), the version-up of the module including this object is performed in response to it. The version-up of this module is reflected to the contents of the DII described in FIG. 8. That is, the version information of the module in the DII is changed and it is used in the embodiment.

As an object updating notice control in the embodiment, in the first example, a "DII_CHANGED" event is added as an interface of the U—U API. The "DII CHANGED" event denotes that a new DII message whose contents were updated has been received on the server side. The object updating notice control is executed as shown in (Process 1) to (Process 4) in FIG. 16.

(Process 1) The client transfers Event::Subscribe ("DII_CHANGED") to the server.

(Process 2) When Event::Subscribe ("DII_CHANGED") is received, the server returns the event number set for the "DII_CHANGED" event to the client. In this example, Event#2 is set for the "DII_CHANGED" event and returned.

(Process 3) After the event number is obtained, the client transmits Event::notify to the server and, when some event including "DII_CHANGED" is generated, the client requests the notification of it.

(Process 4) In the server, the version value of the DII is held every DII included in the data of the received karrusel. It is assumed that the version value of the DII included in the data of the received karrusel has been changed, namely, the contents of the DII have been changed at a certain timing after Event::notify was received. This means that in the module of the karrusel shown by the DII, there is a version-up of some object although it cannot be specified.

When there is the version-up (switching of the contents) of the DII as mentioned above, namely, when the "DII_CHANGED" event is generated, the server transmits the event number (Event#2) set for the "DII CHANGED" event to the client in response to Event::notify of the (Process 3).

Thus, the client can know the fact that there is at least the change of the object in the data service which is at present being broadcasted almost in a real-time manner.

In accordance with this notification, some proper MHEG decoding process (output control regarding the scene, or the like) corresponding to the version-up of the object can be executed.

It is specified in the specification of the U—U API that when the interface is executed, some information can be added and the resultant data can be transferred.

Therefore, when the event number (Event#2) is transmitted to the client by the (Process 4), as shown in the diagram, if identification information (moduleId) of the version-up module corresponding to the updating of the DII is added together with the event number, the client side can specify the module in which the contents of the object were changed.

In this case, since the updated object is not specified on the client side, it is impossible to discriminate whether the current interesting object (for example, object that is at present used for display of the GUI picture plane or the like on the client side, or the like) belongs to the version-up module or not. Therefore, for example, on the client side, all of the objects necessary for the scene (GUI picture plane, or the like) that is at present being outputted are again loaded from the DSM-CC buffer 91. By using this method, although there is a possibility that the actually updated object is not concerned with the change of the contents of the scene that is at present being outputted, so long as the updated object relates to the change of the contents of the scene that is at present being outputted, the contents of the scene can be certainly changed.

Although Event::notify shown as a (Process 3) allows the client to request the server to notify the client of the fact that some event was generated as mentioned above, actually, if the server side sends the notification responsive to Event::notify due to the generation of some event, Event::notify is invalidated at this time point.

Figure 16:
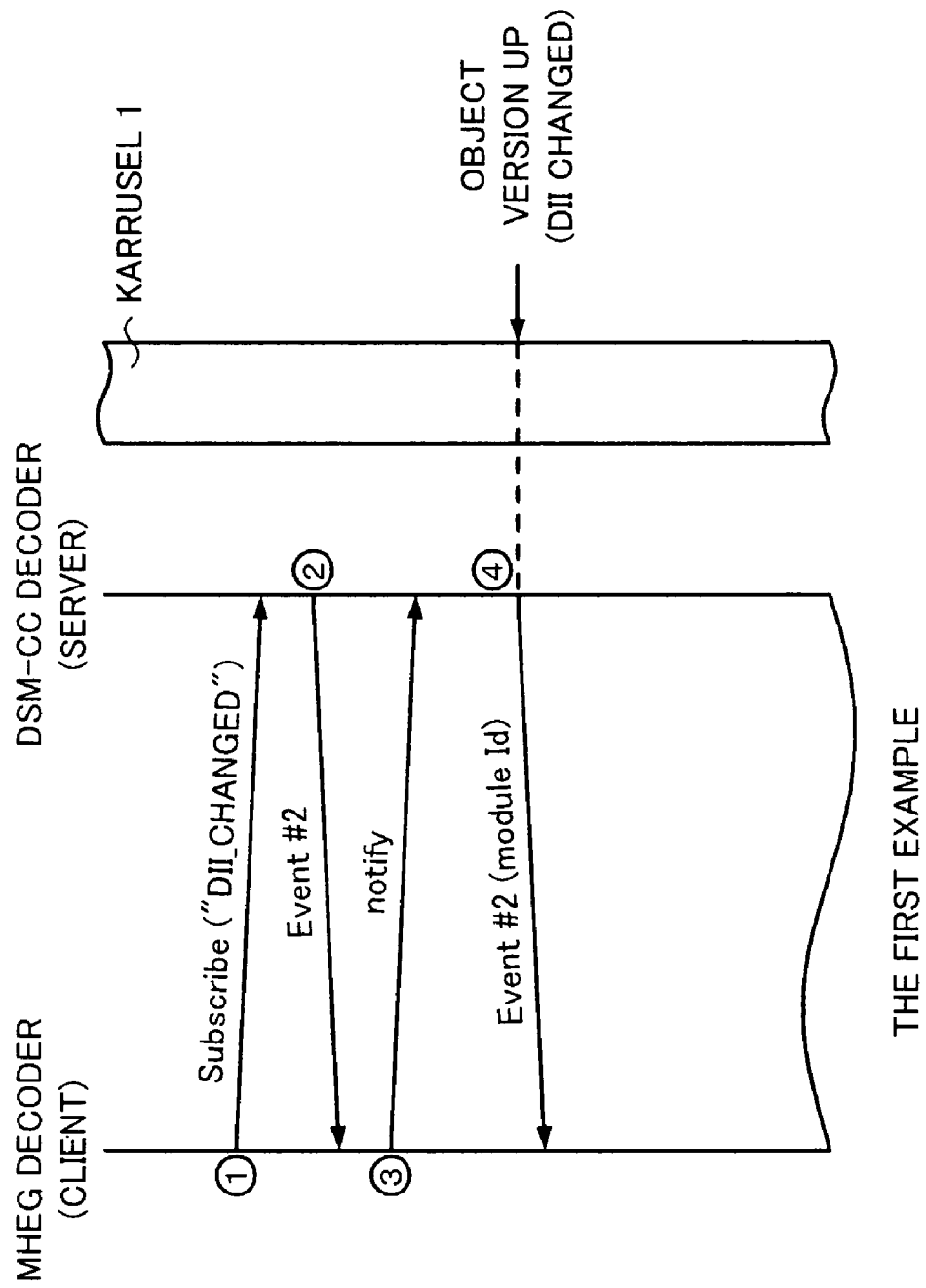
FIG. 16 is an explanatory diagram showing an object updating notice control as a first example.

In the actual process shown in FIG. 16, therefore, Event::Subscribe ("DII_CHANGED") is first issued as a (Process 1). After that, in order to notify the client of the generation of the "DII CHANGED" event on the server side without missing it, after the event notification responsive to Event::notify which was once issued is performed, next Event::notify is immediately issued. That is, on the server side, the period of time during which Event::notify is invalidated does not occur as much as possible.

By this method, each time the DII is switched during the data service broadcasting, the generation of the "DII_CHANGED" event can be successively notified to the client almost in a real-time manner without missing it.

In consideration of enabling the switching of the DII during the data service broadcasting to be successively notified without missing it, the interface to transfer Event::Subscribe ("DII_CHANGED") as a (Process 1) from the client to the server is executed at a timing just after the program (MHEG engine) of the MHEG decoder block 84 is activated and a timing when the data contents (broadcasting contents) themselves of the karrusel are changed.

The case where the program of the MHEG decoder block 84 is activated is set to a timing, for example, when the channel is switched or the program is changed from a state where the broadcasting which is not accompanied with the data service broadcasting has been received so far, so that the program accompanied with the data service broadcasting is newly received, or the like.

3-2. SECOND EXAMPLE

Subsequently, an object updating notice control as a second example will be described with reference to FIGS. 17 and 18. In the second example, the changed object can be specified on the client side.

Figure 17:
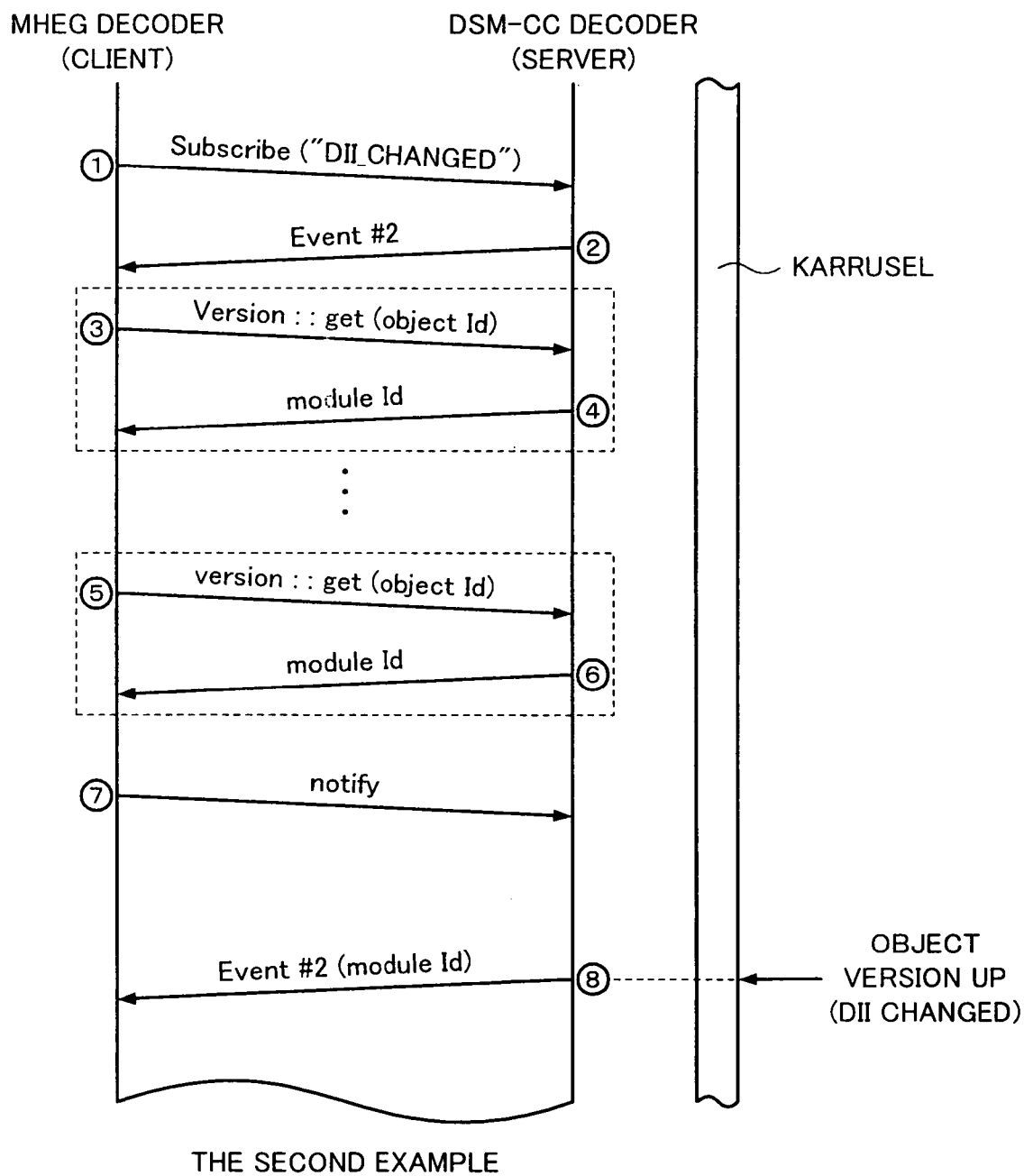
FIG. 17 is an explanatory diagram showing an object updating notice control as a second example.

A processing procedure of the second example by (Process 1) to (Process 8) shown in FIG. 17 is as follows.

(Process 1) The "DII_CHANGED" event is used even in the second example in a manner similar to the case of the first example and the client first transfers Event::Subscribe ("DII_CHANGED") to the server.

(Process 2) When Event::Subscribe ("DII_CHANGED") is received, the server returns the event number set for the "DII_CHANGED" event to the client. As an event number corresponding to the "DII_CHANGED" event, Event#2 is also set and returned.

(Process 3) After the event number is obtained, the client transmits the interface of Version::get (objectId) to the server.

Version::get (objectId) is an interface to transmit the interesting object on the client side to the server side. As an argument (objectId) of this interface, (objectId) regarding the interesting object is shown. In the specification, "interesting object" denotes, for example, an object or the like used in the scene (GUI picture plane display or the like) that is at present being outputted by the client (MHEG decoder block 84).

As actual Version::get ( ), there is the following API.

```
interface Version {
    void get (in ObjRef obj, out u_short moduleId);
};
```

(Process 4) In response to the reception of Version::get (objectId), moduleId as identification information of the module to which the object shown by (objectId) belongs is returned from the server.

In response to the returned moduleId, the client side makes transmitted (objectId) correspond to the returned moduleId and stores them.

The interface comprising the (Process 3)→(Process 4) is executed for all of the present interesting objects in the client. Now, assuming that the interface of (Process 5)→(Process 6) corresponding to, for example, the last interface of (Process 3)→(Process 4) is completed, table information as shown in FIG. 18 is obtained on the client side. That is, since [(Process 3)→(Process 4)] . . . [(Process 5)→(Process 6)] are executed, a table in which (objectId) and moduleId are made to correspond to each other is obtained for each of all interesting objects on the client side. The processing routine advances to (Process 7) after that.

(Process 7) The client transmits Event::notify to the server. When some event is generated, the client requests the notification of it.

(Process 8) Now, assuming that in response to Event::notify, in the server, the contents of the DII were switched and the "DII_CHANGED" event was generated, the event number (Event#2) which has been set for the "DII_CHANGED" event is transmitted from the server to the client. However, as mentioned above, it is specified in the U—U API that some information can be added upon transmission of some event. In this case, moduleId of the module to which the version-up DII corresponds (namely, module to which the version-up object belongs) is added to the event number (Event#2) and the resultant data is transmitted. It is set to the following API.

```
module DSM {
    interface Event {
        struct StreamEvent {
            u_short eventId; //id for DII_CHANGED
            AppNPT rAppTime; //not used
            sequence<u_short, 65535>moduleIdList;
//New
        }
    }
}
```

Figure 18:
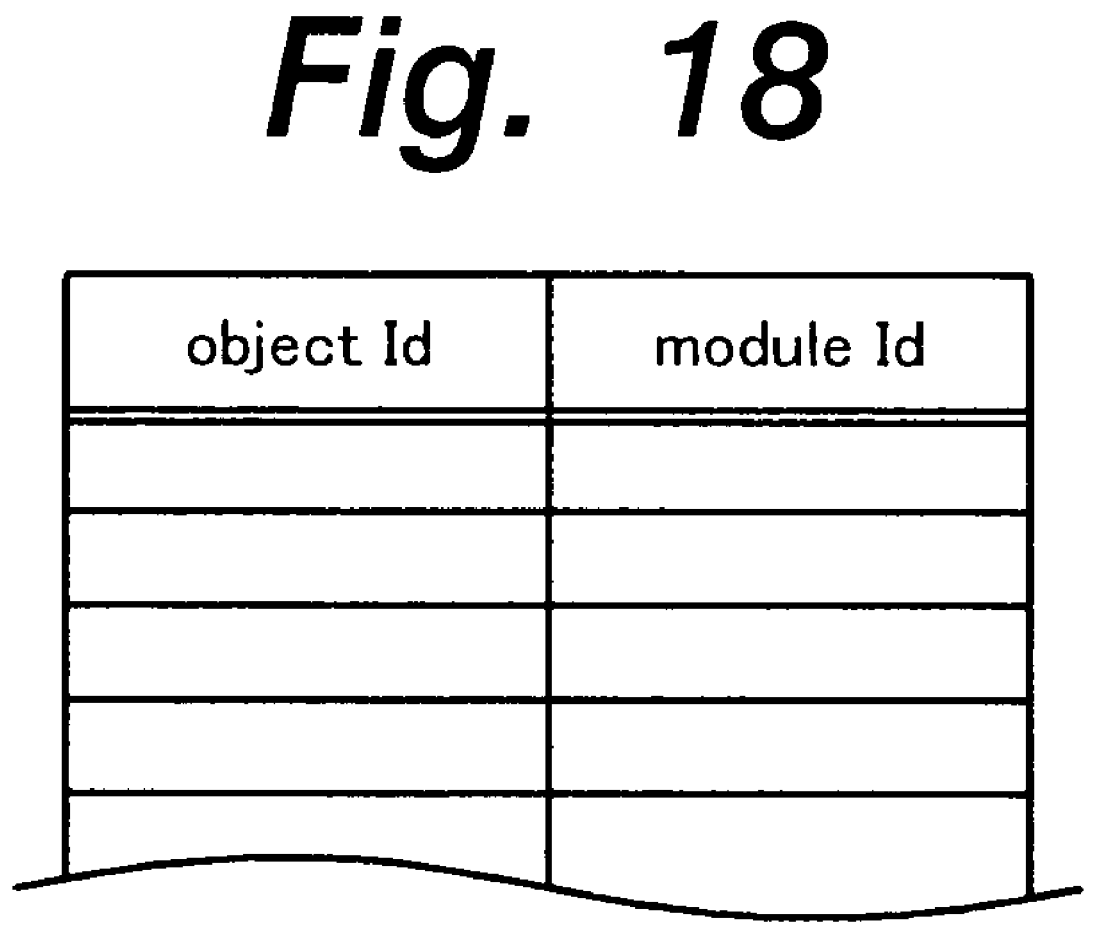

When the event number (Event#2) and the moduleId are obtained on the client side as mentioned above, the client side searches the table shown in FIG. 18 and searches moduleId which coincides with the moduleId transmitted by the (Process 8) from the table. Since there is a possibility that the object shown by (objectId) corresponding to the searched moduleId is the updated object, the client specifies this object as an updated object.

In this case, for example, there is also a possibility that a plurality of objectId corresponding to the moduleId which coincides with the moduleId transmitted by the (Process 8) exist in the table. In this case, although all of the objects shown by the plurality of (objectId) have not always actually been updated, it is regarded that the plurality of objects were updated. By this method, the objects which were actually updated are certainly included.

Also in the second example, to make it possible to notify the client of the event number+moduleId of the "DII_CHANGED" event without missing the switching of the DII, in a manner similar to the case of the first example, the transfer of Event::Subscribe ("DII-CHANGED") as a (Process 1) from the client to the server needs to be performed just after the program of the MHEG decoder block 84 is activated and at a timing when the karrusel is switched.

In the transfer of Event::notify as a (Process 7) to the server in the actual process as well, when some event responsive to it is notified and the return (Process 8) of the event number+moduleId is obtained, next Event::notify (#2) is immediately transferred.

Although the client can execute the proper MHEG decoding process corresponding to the version-up of the object by knowing the updated object as mentioned above, the following processes can be executed as an example.

As mentioned above, the MHEG decoder block 84 reads out the data of the necessary objects from the DSM-CC buffer 91 in accordance with the description contents of the MHEG, forms the data of the scene such as a GUI picture plane or the like by the MHEG buffer 92, and outputs it to the display processing unit 58.

It is now assumed that the version-up of one or a plurality of specific objects was specified by the process shown in FIG. 17. It is also assumed that these objects are used as objects to form the current GUI picture plane and, if the contents of the objects are changed (version-up), it is necessary to reflect it to the GUI picture plane as quickly as possible.

In such a case, the MHEG decoder block 84 again loads only the data of the objects whose version-up was specified from the data of the module units stored in the DSM-CC buffer 91. In the MHEG buffer 92, the data of a new scene is formed by exchanging only the contents in the objects and outputted to the display processing unit 58.

For instance, in the case where although the updated objects cannot be specified, only a possibility that there is some change with respect to the scene is notified (for example, the first example), even in the case corresponding to, for example, the change of a part of the scene contents, it is necessary to again read out the data from the DSM-CC buffer 91 with respect to all of the objects to form the scene and reconstruct the scene on the MHEG buffer 92.

On the other hand, in the case where the updated objects are specified as shown in the second example, it is sufficient that the MHEG decoder block 84 executes the processes with respect to only the objects necessary for the change of a part of the scene contents as shown in the foregoing processes. In other words, even when a part of the same scene contents is changed, a burden of the processes of the MHEG decoder block 84 can be reduced.

3-3. THIRD EXAMPLE

Subsequently, an object updating notice control as a third example will be described with reference to FIGS. 19 and 20.

In the third example as well, the changed objects can be specified on the client side. In the third example, however, the "DII_CHANGED" event used in the foregoing first and second examples is not used.

A processing procedure in the third example shown in FIG. 19 is as follows.

(Process 1) With respect to the present interesting object, the client transfers UpdateEvent::subscribe (objectId) to the server side.

UpdateEvent::subscribe (objectId) is the event to subscribe the reception of an event (UpdateEvent) in the case where the version-up of the module to which the object indicated by (objectId) shown in the argument belongs is performed. The following API is called.

```
interface UpdateEvent {
    void subscribe (in ObjRef obj, out u_short up eventId);
    void notify (in u_short up_eventId);
};
```

(Process 2) When UpdateEvent::subscribe (objectId) is received, the server returns UpdateEventId as identification information that is peculiar to the received UpdateEvent::subscribe (objectId). The UpdateEventId is an Id which is uniquely set on the server side.

The client repeats the transfer (Process 1) of UpdateEvent::subscribe (objectId) and the reception (Process 2) of UpdateEventId responsive thereto with respect to all of the current interesting objects. It is now assumed that the process of (Process 3)→(Process 4) corresponds to (Process 1)→(Process 2) with regard to the last object.

At the stage when (Process 1)→(Process 2) . . . (Process 3)→(Process 4) have been completed in correspondence to all of the interesting objects, the client (MHEG decoder block 84) can obtain table information shown in FIG. 20A. This table information shows the correspondence between (objectId) transmitted as a (Process 1) (or (Process 3)) to the server, namely, (objectId) with respect to the interesting object and UpdateEventId derived from the server in response thereto.

Table information shown in FIG. 20B is obtained on the server (DSM-CC decoder block 83) side. This table information shows the correspondence among UpdateEventId set in correspondence to (objectId) transmitted by the (Process 1) (or (Process 3)), further, moduleId to specify the module to which the object shown by the above (objectId) belongs, and the version number (shown by the DII) of this module.

(Process 5) When (Process 1)→(Process 2) . . . (Process 3)→(Process 4) are completed as mentioned above, the client transmits UpdateEvent::notify to the server. If UpdateEvent (updating of the module) is generated, the client requests the notification of it.

(Process 6) After UpdateEvent::notify is received, the server collates the version value of the module shown by the received DII with the table shown in FIG. 20B. When the version number corresponding to a certain moduleId in the table differs from the version value of the module shown by the DII, the presence of the version-up of this module is identified.

When the version-up is performed with respect to the module as mentioned above, namely, when UpdateEvent is generated, the server adds UpdateEventId corresponding to the moduleId of the version-up module with reference to the table, calls the following API, and returns UpdateEventId.

```
interface UpdateEvent {
    struct VersionUpEvent {
        u_short eventId; //id for DII_CHANGED
    }
}
```

When UpdateEventId is received and obtained by the (Process 6), the client side accesses to UpdateEventId in the table (FIG. 20A) which coincides with the received UpdateEventId. By seeing (objectId) corresponding to the accessed UpdateEventId on the table, the version-up object is specified.

In the third example as well, since the version-up object is specified as mentioned above, the processes on the MHEG decoder block 84 side can be more efficiently performed in a manner similar to the foregoing case of the second example.

In case of the third example, there are also the following advantages. As shown in FIG. 20A, in the table which the client (MHEG decoder block 84) has, the (objectId) is made to correspond to UpdateEventId which was uniquely set on the server side. Therefore, on the client side, (objectId) can be unconditionally specified by getting UpdateEventId responsive to Event::notify. That is, in the third example, there is no need to search the table in order to specify the version-up object on the client side, so that the burden of processes of the client is reduced.

In the case of the third example as well, in the transfer of UpdateEvent::notify as a (Process 5) to the server, after the reply (Process 6) of UpdateEventId responsive thereto is obtained, next UpdateEvent::notify is immediately transferred, thereby enabling the version-up module to be notified without missing it.

In the case where the client side is not interesting in the updating of the version (for example, when the display of the GUI picture plane is stopped), the following API is issued.

```
interface UpdateEvent {
    void unsubscribe (up_eventId);
};
```

Thus, the management information for notification of UpdateEvent is erased on the server side.

4. Allocation of Modules to Queue

As for the object to realize the scene display and the audio output or the like on the scene display, the mapping is properly performed to the directory structure of the data to form the scene to be broadcasted on the broadcasting station side, and the object is encoded in accordance with a predetermined transmitting system and transmitted. For example, if a plurality of scenes are necessary for one certain program, data of the objects which are necessary for the plurality of scenes is properly mapped and transmitted.

On the receiving apparatus side, by performing the decoding process in accordance with the transmitting system, for example, data as a set of each object that is necessary for the scene to be displayed is obtained and outputted as a scene.

For the user who owns the receiving apparatus, it is preferable from a viewpoint of a comfortable operation environment that the waiting time that is required until the scene is first displayed after a certain channel is selected or the waiting time that is required when the display of a certain scene is switched to the display of another scene is as short as possible.

In the digital satellite broadcasting system using the DSM-CC system as transmitting standards, the receiving apparatus, namely, the type of IRD can be divided into two kinds in terms of the construction of the reception buffer.

One is a construction such that the IRD has a reception buffer of a large capacity such as flash memory, hard disk driver, or the like corresponding to data services (display output of the GUI picture plane). In such a construction, the whole data services (MHEG contents) which are broadcasted are received in a lump and held in the reception buffer. Thus, after the data services are once received and fetched, any scene (GUI picture plane) by the MHEG can be immediately displayed and outputted merely by waiting only for the waiting time of the memory access. That is, even when the user performs the operation to switch the GUI picture plane (scene) or the like, the next scene is almost soon displayed.

In such a case, a slight overhead due to the switching of the filter conditions of the demultiplexer does not particularly cause a problem with regard to the display of the GUI picture plane.

The other relates to a construction which does not have the reception buffer of a large capacity as mentioned above because of the reason for reduction of the costs of the IRD or the like and corresponds to the IRD 12 of the embodiment described above. In this case, the data of the whole data broadcasting services cannot be buffered but the IRD has only a reception buffer such that several modules as receiving units to receive the data of the data broadcasting can buffer. In the IRD 12 shown in FIG. 12, this reception buffer corresponds to the queue 71 and 32 columns of the memory areas where the modules can buffer as mentioned above are merely provided.

In such an IRD, on the contrary, the size of module cannot exceed the size of buffer memory of the receiver. Therefore, the whole data services are constructed by a set of several modules and a procedure to receive only the modules necessary to display or the like at each time is necessary.

The foregoing procedures (Pr1) to (Pr6) to extract the objects correspond to the construction of such an IRD which does not have the reception buffer of a large capacity.

It is assumed that the directory structure of FIG. 9 is used as a prerequisite, for example, in a certain data service, an application to be first accessed in the data service is a file called Service Gateway/app0/startup and the first scene is constructed by a still image included in scenedir0 or a file of a text.

Now, assuming that the reception is started by the IRD with respect to the data service as mentioned above, the following procedure is executed.

(Pr11) The PID of a desired data service is obtained with reference to the PMT, the filtering is performed by the demultiplexer while the PID, table_id, and table id_extension are used as filter conditions, and the DSI is obtained. The IOR of the Service Gateway object has been written in the DSI.

(Pr12) The Service Gateway object is obtained from the IOR by the foregoing object extracting procedures (Pr1) to (Pr6).

In two kinds of BIOP messages of the Service Gateway object and the directory object, information of the name and location (IOR) of the object just under the directory and the kind of object is provided as attribute information called "binding". Therefore, when the name of object is given, it is possible to reach the object of the name while starting from Service Gateway and tracing the directory one by one downward (if the objects of the same name exist, the upper bus name is necessary up to the location where they differ). The following procedures are further executed.

(Pr13) The IOR of an app0 object is obtained from the binding information of the Service Gateway object and the app0 object is derived by the object extracting procedures (Pr1) to (Pr6).

(Pr14) The IOR of a startup object is obtained from the binding information of the app0 object and the startup object is derived by the object extracting procedures (Pr1) to (Pr6). In a manner similar to the above, a scenedir0 object as a first scene or the like is obtained.

Figure 21:
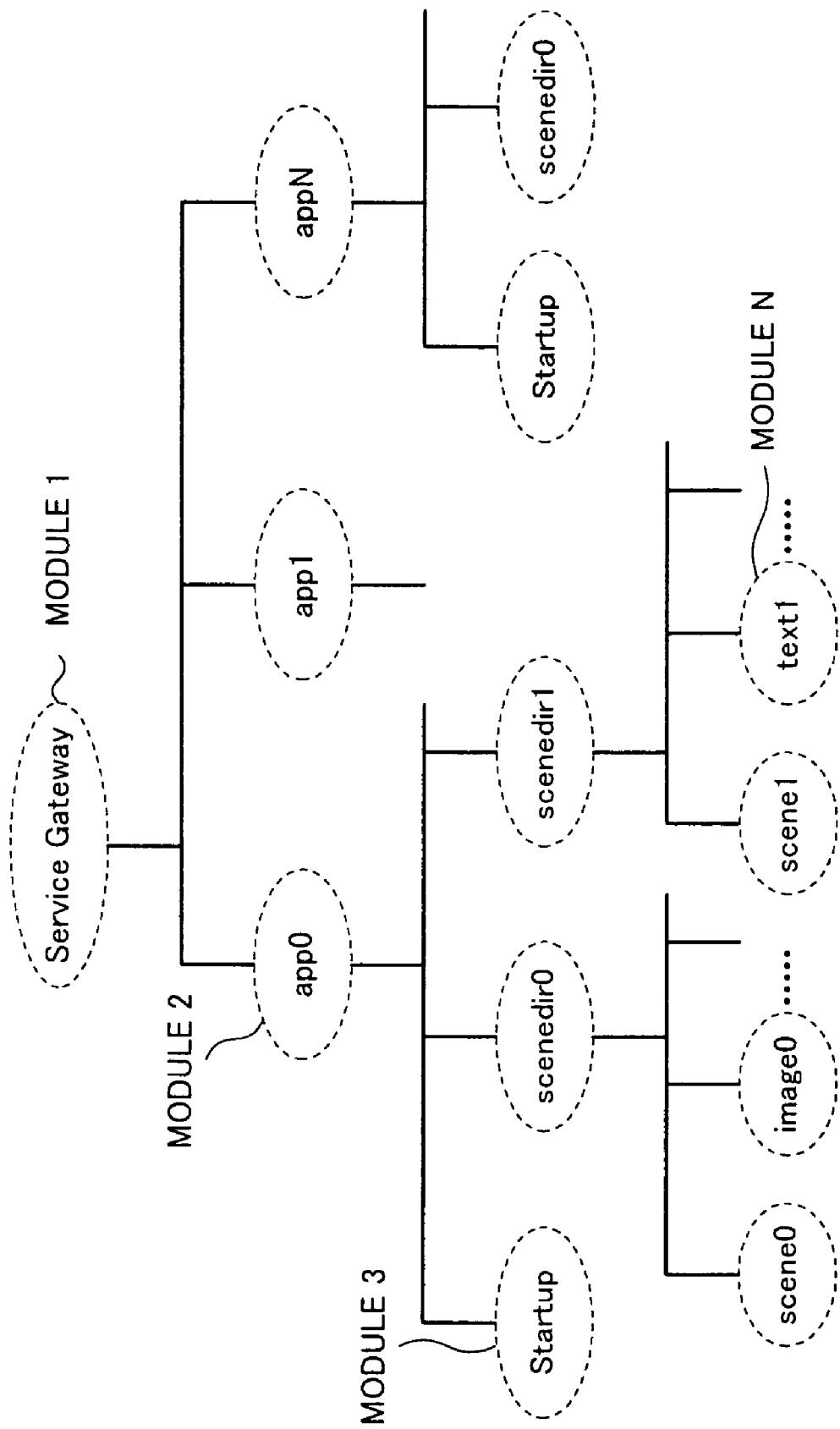
FIG. 21 is an explanatory diagram showing an example of mapping for the directory structure of the data services.

As mentioned above, the relation among the objects forming the modules is not particularly limited under the DSM-CC system but is arbitrary set. Therefore, as shown in FIG. 21, it is assumed that a mapping such that one object corresponds to one module is performed and the data is transmitted from the ground station 1. The mapping process for the directory structure of the data services is performed for the data of the MHEG contents at the time of the process to form the module by the DSM-CC encoder 44.

In this case, a new module is successively received to sequentially obtain the object by the procedures of (Pr11) to (Pr14) on the IRD side. Therefore, a procedure for changing the filter conditions many times each time the object is obtained and setting them to the demultiplexer 70 and filtering is necessary. The fetching of the scene is delayed due to the repetition of such a filtering operation, causing a deterioration of service performance such that the display is also delayed.

It is considered that a period of time for one rotation of the karrusel reaches a time within a range from a few seconds to ten seconds or longer although it depends on the size of whole data of the data services or a band that is allocated upon broadcasting. Since the waiting time for one rotational period (for ½ rotational period as an average) of the karrusel occurs in the one filtering operation in the worst case, by reducing the number of times of filtering as much as possible directly contributes to the improvement of service performance.

The switching of the scene will now be considered. According to the mapping shown in FIG. 21, a situation that when a file of the next scene is called from the scene that is being displayed, the file has to be traced from the upper directory occurs.

For example, in case of a mapping shown in FIG. 21, when shifting from app0/scenedir0 to app0/scenedir1, the binding information of scenedir1 has already been obtained from the BIOP message of the app0 object. However, when shifting from app0/scenedir0 to appN/scenedir0, appN/scenedir0 is traced from the binding information of an appN object existing in the BIOP message of the Service Gateway object. That is, to change the scene, the module of the Service Gateway object is first received, the binding information of appN is obtained from the BIOP message, the directory of appN/scenedir0 is identified, and thereafter, the module of appN/scenedir0 has to be received. (However, the above operation is performed only when appN is accessed at the first time. At the second and subsequent times, if the binding information of appN is held, this procedure is unnecessary.)

That is, even in this case, the waiting time for switching of the scene due to the filtering of the module becomes long.

In the embodiment, therefore, the following mapping method of the objects is used so that the waiting time due to the first scene display or the switching of the scene can be reduced even by the object extracting procedures by (Pr1) to (Pr6) mentioned above.

Figure 22:
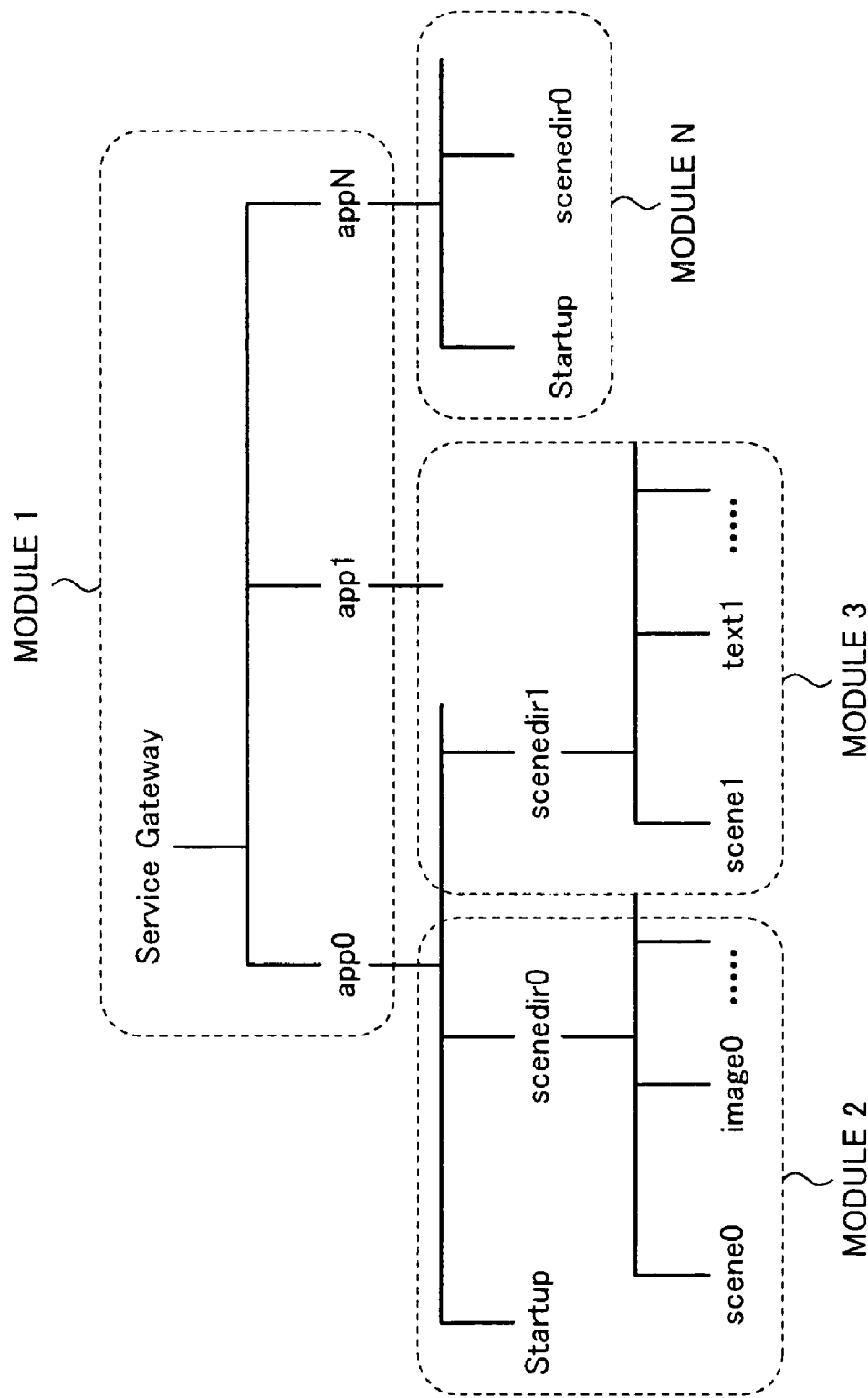
FIG. 22 is an explanatory diagram showing an example of mapping for the directory structure of the data services as an embodiment.

FIG. 22 shows an example of mapping for the directory structure of data services according to the embodiment.

In FIG. 22, all objects constructing one scene are combined as one module (modules 2, 3, . . . , N) and the other upper directories including Service Gateway are mapped to one module (module 1). However, the application file "Startup" to be first accessed is mapped to the same module (module 2) as that of the first scene.

By performing the mapping as mentioned above, if the module 1 of Service Gateway is first received, all of the constructions of the subdirectories exist in the same module, the IRD 12 side can obtain the whole directory construction by the reception of the module 1.

The module 2 is subsequently received and this module 2 is a module formed by mapping the file of the scene that is presented first. Therefore, after completion of the fetching of the data of the module 2, all of the information of the objects necessary to output the first scene is obtained. That is, when the procedure of (Pr5) shown above is completed, the procedure of (Pr6) is also completed almost at the same time. Actually, when the module 2 is obtained in the queue 71, the module 2 is used as data of one scene and transmitted to the DSM-CC buffer 91. Such a procedure is also similarly executed for the module 1 including a route directory.

In this case, therefore, so long as the reception (capture) of the modules of two times such as module 1 and module 2 is successively completed, the reproduction of the first scene can be started as it is. When the scene is further switched to another scene, the module of a desired scene directory can be directly received with reference to the binding information of the directory object which was fetched first.

Even in this case, although it is sure that the overhead of the scene switching is not large, it is necessary to receive the module twice before the first scene of the data services is presented.

According to the mapping shown in FIG. 22, although many objects enter the module 1 in which the upper directories are combined, since the two kinds of objects of Service Gateway and the directory are constructed by the combination of the information of small data amounts such as name and IOR of the object to be bound to the directory as mentioned above, even if the number of objects is large, the whole data capacity is not large.

FIG. 23 shows another mapping example as an embodiment. In this example, for the set of combined upper directories, the application file (startup) to be first accessed and the object of the first scene are further mapped to one module 1. The other modules 2 ◯ ◯ ◯ N are formed by combining the objects necessary for each scene in a manner similar to the modules 3 ◯ ◯ ◯ N or the like shown in FIG. 22.

In the case where the mapping is performed and the resultant data is transmitted, the IRD side receives only the module 1 and transmits it from the queue 71 to the DSM-CC buffer 91, so that the first scene can be soon displayed. Since the binding information of the directory objects can be referred to at this stage, it is possible to immediately access to the module comprising the objects of the necessary scene in correspondence to the switching of the subsequent scene.

Although the objects forming one scene are certainly stored in one module in the above mapping example, in the case where the capacity of all objects forming one scene is large and exceeds the maximum size specified as a module, for example, the objects forming one certain scene are stored as many as possible for the nth module, and the (n+1)th module is formed by the objects forming the same scene which cannot be stored in the nth module. The nth module and the (n+1)th module are made continuous and transmitted by the karrusel system. By using this method, although it is necessary to receive the nth module and the (n+1)th module twice, the scene can be relatively promptly reproduced.

In the subsequent description, the module formed by storing all of the objects which can form one scene as mentioned above is also referred to as a "scene module".

Subsequently, a module allocation to the queue 71 will be described as a receiving process on the IRD 12 side with reference to FIGS. 24 to 28. In the IRD 12 of the embodiment, a condition such that the data mapping on the broadcasting side (ground station side) is performed is used as a prerequisite and the module allocation to the queue 71 which will be explained hereinbelow is performed, thereby enabling the necessary scene to be further efficiently obtained.

Figure 24A:
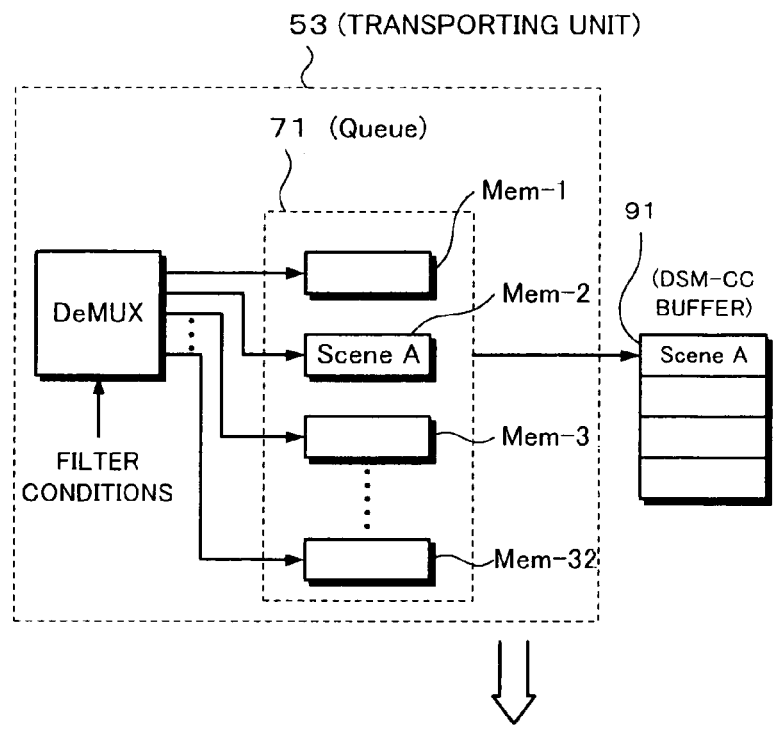
FIGS. 24A to 24C are explanatory diagrams showing the fetching operation of a module of scene data according to the embodiment.

In FIG. 24A, the construction of the demultiplexer 70 and queue 71 in the transporting unit 53 and memory areas in the DSM-CC buffer 91 are conceptually shown.

As a transporting unit 53 shown in the diagram, the demultiplexer 70 and memory areas Mem-1, Mem-2, Mem-3, . . . , and Mem-32 forming the queue 71 are shown. Each memory area can store the data of the module unit.

As mentioned above, the data (for example, section unit) adapted to the filter conditions given to the demultiplexer 70 is separated and extracted from the transport stream. The separated and extracted section is stored in any of the memory areas Mem-1 to Mem-32. By repeating this operation, a module comprising a set of sections collected so as to be adapted to the filter conditions is formed for a certain memory area and stored there.

For example, it is now assumed that the data of the module formed by the data constructing a scene A is separated and extracted by the demultiplexer 70 and stored in the memory area Mem-2. In case of using the module of the scene A in order to display the GUI picture plane, the data of the module of the scene A is read out from the memory area Mem-2 and written in the DSM-CC buffer.

That is, as a general transmitting format of the module of the received scene, after it is once stored in the memory area of the queue, it is stored in the DSM-CC buffer 91. The MHEG decoder block 84 accesses to the scene data stored in the DSM-CC buffer 91 as mentioned above and loads it and stores into the MHEG buffer, so that the scene of the GUI picture plane or the like can be outputted.

As also shown as memory areas Mem-1 to Mem-32 here, the memory areas forming the queue 71 are limited to 32 columns in the embodiment. So long as the operation to receive the transport stream is actually performed, those memory areas are in a state where most of them are occupied by various kinds of module data as well as, for example, the MPEG stream data and the like which were separated so as to be adapted to various different filter conditions.

Such a situation means that, for example, even if the MHEG decoder block 84 tries to fetch a number of scene modules which need to be accessed into the DSM-CC buffer 91, since the number of memory areas to temporarily hold the scene modules is limited, it is practically difficult to store, for example, many necessary scene modules in a lump into a plurality of memory areas in the queue and transfer them to the DSM-CC buffer 91.

In the DSM-CC system, the receiving order (fetching order) of the modules is not particularly specified. That is, the order at which the modules are extracted and stored in the memory areas by the transporting unit 53 is arbitrarily set.

In the embodiment, therefore, on the assumption that there is a limitation in the number of memory areas as mentioned above, the module allocation (receiving order) is specified as follows in a manner such that the modules which need to be stored in the DSM-CC buffer 91 are obtained by the transporting unit 53 as promptly as possible.

As described above, a directory structure of the data services and mapping of the modules for the directory structure are as shown in, for example, FIGS. 22 and 23. However, for example, as for the directory of app0, so long as the objects of app0/startup and app0/scenedir0/scene0 are obtained, information of the priorities of the scenes forming the application of app0 can be obtained. The same point is also similarly applied to the other applications of app1 to appN.

As for the priorities, for example, in the case where the display output is shifted from the display output of some scene to the display output of the other scene (this shift is referred to as a "transition"), there are usually a plurality of candidates as the other scenes. However, among those plurality of scene candidates, for instance, when it is necessary to switch the scenes by the operation of the user, the priorities are allocated in accordance with the degrees of possibilities of switching.

In the embodiment, the module allocation is specified on the basis of the information of the priorities of the scenes and will be again explained with reference to FIG. 24.

For convenience of explanation, it is now assumed that the memory area which can hold the scene modules in the transporting unit 53 is only Mem-2 and the other memory areas are occupied to store the other kinds of data (for example, MPEG video data, etc.). Explanation will now be made with respect to the case of outputting the scene by the application of app0.

In the transporting unit 53, it is assumed that the modules to which the objects of app0/startup and app0/scenedir0/scene0 belong have already been received and, for example, in the control processing unit 81 of the CPU 80, the priority information of the scenes in the application of app0 has been obtained.

It is now assumed that the priorities have been given like scene A→scene B→scene C→scene D ○ ○ ○ by the priority information with respect to a plurality of scenes existing under the directory structure of app0 and it is necessary to store the scenes into the DSM-CC buffer 91 as many as possible.

In such a case, the control processing unit 81 first executes a control so that the module of the scene A having the highest priority is stored in the memory area Mem-2 of the transporting unit 53. On the basis of this control, the demultiplexer driver 82 sets the filter conditions adapted to the module of the scene A to the demultiplexer 70. As shown in FIG. 24A, therefore, the module of the scene A is stored in the memory area Mem-2 and transferred to the DSM-CC buffer 91.

Figure 24B:
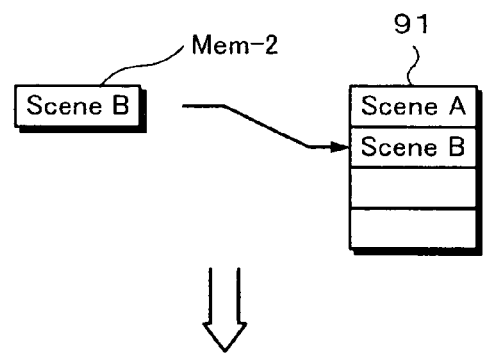

Subsequently, as a process to capture the scene B of the priority subsequent to that of the scene A, the control processing unit 81 instructs the demultiplexer driver 82 so as to set the filter conditions adapted to the module of the scene B into the demultiplexer 70. Thus, as shown in FIG. 24B, the module of the scene B is obtained in the memory area Mem-2 and transferred to the DSM-CC buffer 91. Among the circuit blocks shown in FIG. 24A, only the memory area Mem-2 and DSM-CC buffer 91 are extracted and shown in FIG. 24B. This point is also similarly applied to FIG. 24C.

Figure 24C:
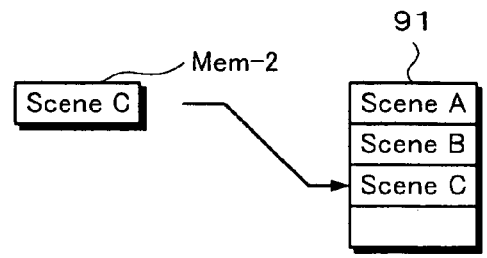

Further, to obtain the scene C of the priority subsequent to that of the scene B, the filter conditions adapted to the module of the scene C are set to the demultiplexer 70. As shown in FIG. 24C, the scene C is obtained and transferred to the DSM-CC buffer 91.

In a manner similar to the above, the filter conditions of the scene according to the priority are set to the demultiplexer 70 and the scene modules are obtained in the memory area Mem-2 and transferred to the DSM-CC buffer 91.

By performing the above operation, the data of the scene module necessary to output the scene or the data of the scene module in which a possibility that it is necessary next is high upon scene switching is stored in the DSM-CC buffer 91 in accordance with the priority.

The MHEG decoder block 84 accesses to the data of the scene module obtained by the DSM-CC buffer 91 and outputs the scene such as a GUI picture plane or the like as mentioned above. However, for example, if there is a request to call a desired scene by the operation of the user during the data broadcasting, a possibility such that the data of the call-requested scene has already been held in the DSM-CC buffer 91 is very high. The call-requested scene data can be almost certainly accessed and promptly outputted.

The capacity of the DSM-CC buffer 91 is obviously finite and a large capacity cannot be allocated actually. Therefore, for example, there is a case where all of the scene modules in which it is presumed that they are used by the MHEG decoder block 84 cannot be stored. It is, thus, presumed that, for example, the following inconvenience occurs.

Figure 25:
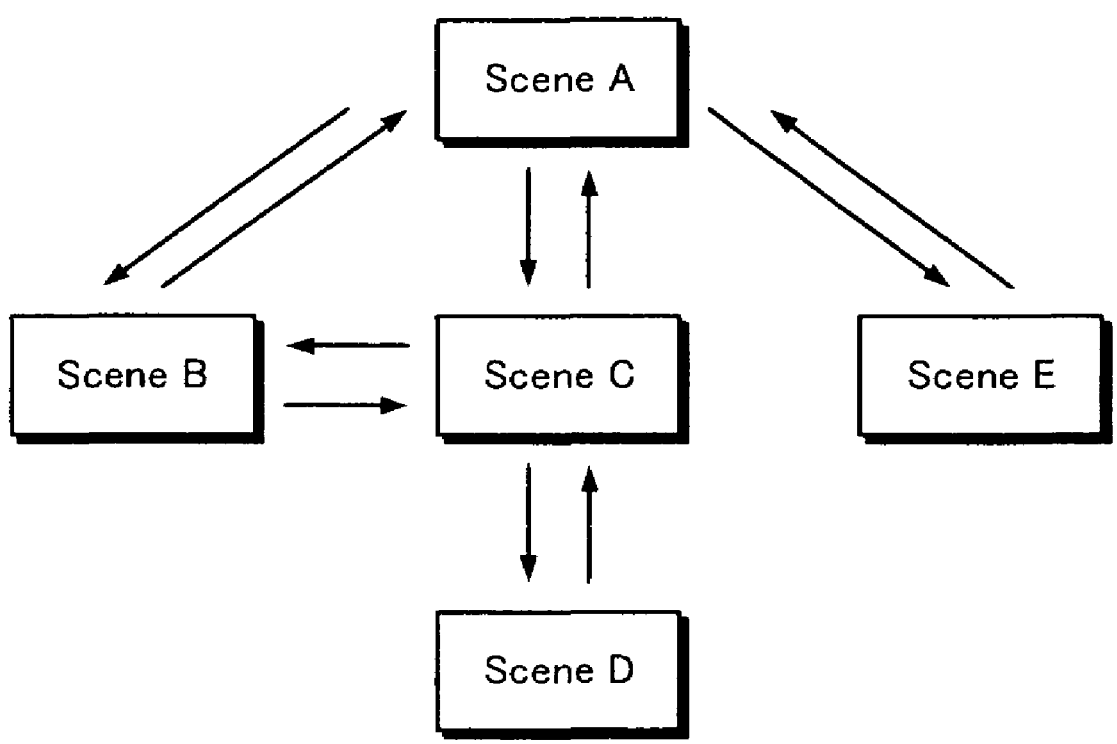
FIG. 25 is an explanatory diagram showing an example of transition of scenes.

For example, as shown in FIG. 25, it is assumed that five scenes A, B, C, D, and E are prepared under a certain application and a format of the transition between the scenes is set as shown in the diagram (the rule of such a transition is described in MHEG). For example, in case of the scene A, the transition to the scene B, C, or E can be performed. In case of the scene C, the transition to the scene A, B, or D can be performed.

It is assumed that the capacity of the DSM-CC buffer 91 is limited to a capacity such that up to four scene modules can be stored. Under this condition, if the MHEG decoder block 84 uses the application in which the five modules of the scenes A to E shown in FIG. 25 are prepared, one of the five modules of the scenes A to E cannot be stored in the DSM-CC buffer 91.

Under the above condition, for example, it is assumed that the scene A is displayed and outputted at a certain stage and the scene modules stored in the DSM-CC buffer 91 are the four scenes A, B, C, and D. For example, if there is a request to call the scene E by the operation of the user in this state, the transition from the scene A to the scene E is performed in response to it.

However, since the module of the scene E does not exist in the DSM-CC buffer 91 in this instance, to meet the calling request for the scene E, it is necessary to newly fetch the module of the scene E from the karrusel. For this period of time, a waiting time that is caused until the end of the transition from the display of the scene A to the display of the scene E occurs for the user.

Therefore, to solve such inconvenience as much as possible, the following module allocation is further performed in the embodiment.

In the actual data services by the MHEG system, there is a case where the priorities among a plurality of scenes in a certain application are changed depending on the scene that is at present being displayed and outputted. The priorities which are changed in accordance with the scene that is being outputted can be also obtained on the basis of the priority information mentioned above.

In the embodiment, therefore, as a program of the MHEG decoder block 84, a next scene manager such that when a certain scene is at present being outputted, the priorities of the other scenes are managed by using the scene that is being outputted as a reference is activated.

Figure 26:
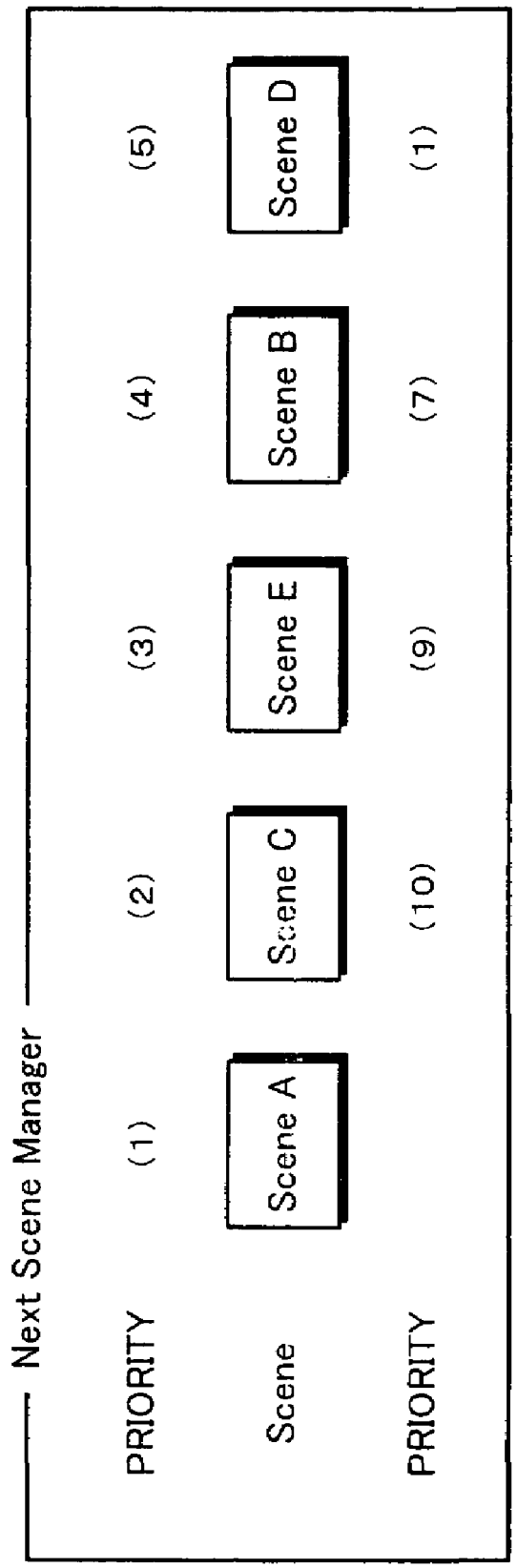
FIG. 26 is an explanatory diagram showing an example of scene priorities which are managed in a next scene manager according to the transition example of the scenes shown in FIG. 17.

As a management example of the next scene manager, it is assumed that in the case where the scene A among the scenes shown in FIG. 25 is at present being outputted, the priorities which are managed by the next scene manager are as shown in FIG. 26. That is, it is assumed that the priorities are managed in order of (1) scene A→(2) scene C→(3) scene E→(4) scene B→(5) scene D. Such priorities are actually determined by the priority values as shown in the diagram. The larger the priority value is, the higher the priority is. The priority values of the other scenes for the scene A are set to "10" for the scene C, "9" for the scene E, "7" for the scene B, and "1" for the scene D.

The scene modules stored in the DSM-CC buffer 91 in this instance are the scenes A, E, C, and B as shown in FIG. 28A.

When it is assumed that a request to perform the transition from the scene A to the scene C is issued in this state, for example, the MHEG decoder block 84 executes a process for accessing to the data of the scene C from the DSM-CC buffer 91 in the storage state shown in FIG. 28A and outputting it.

In the MHEG decoder block 84, in correspondence to the transition to the scene C, the priority of the scene is updated and managed by the next scene manager as shown in, for example, FIG. 27.

In the diagram, the priorities are managed in order of (1) scene C→(2) scene B→(3) scene A→(4) scene D→(5) scene E on the assumption that the scene C that is at present being outputted is set to the head. In this case, the priority values of the other scenes for the scene C are set to "7" for the scene B, "6" for the scene A, "4" for the scene D, and "2" for the scene E and the above priorities are determined in accordance with these priority values. As mentioned above, the priorities among the scenes are changed in accordance with the scene that is at present being outputted.

In the embodiment, the contents of the scene modules which are stored in the DSM-CC buffer 91 are updated as follows on the basis of the priorities among the scenes updated as shown in FIG. 27.

For example, the CPU 80 compares the priorities among the scenes which are at present managed by the next scene manager shown in FIG. 27 with the scene modules stored in the DSM-CC buffer 91 in FIG. 28A.

Thus, it will be understood that the scene C of the first priority, the scene B of the second priority, the scene A of the third priority, and the scene E of the fifth priority (lowest priority) are stored in the DSM-CC buffer 91 as priorities shown in FIG. 27 and the scene D of the fourth priority is not stored.

The CPU 80, therefore, executes a control in a manner such that the scene modules stored in the DSM-CC buffer 91 become the upper four scenes among the priorities managed at present. That is, in this case, as shown in FIG. 28B, the modules of the scene D are stored in the DSM-CC buffer 91 in place of the scene E, thereby enabling the upper four scene modules to be eventually stored.

For this purpose, first, the control processing unit 81 in the CPU 80 instructs in a manner such that, for example, the filter conditions to obtain the modules of the scene D are outputted from the demultiplexer driver 82 to the demultiplexer 70. Thus, the modules of the scene D are stored in the memory area allocated to the modules of the scene data in the queue 71. The writing control for the DSM-CC buffer 91 is executed in a manner such that the modules of the scene D obtained in the memory area in the queue 71 are replaced with the modules of the scene E. It is also sufficient that, for instance, the control processing unit 80 executes the writing control.

If it is necessary to exchange the two or more scene modules as a result of comparison between the priorities of the scenes changed in accordance with the scene switching and the scene module data stored in the DSM-CC buffer 91 so far, these scene modules are fetched in accordance with the above control operation.

For example, when the user performs the switching operation of the scenes under a state where some scene is outputted, actually, there is a high possibility that the scene to be switched is selected in accordance with the priorities managed by the next scene manager at that time point.

Therefore, if the module allocation in the transporting unit 53 is specified so as to preferentially store the modules into the DSM-CC buffer 91 from the scene of the higher priority among the scenes determined in accordance with the scene that is at present being outputted as mentioned above, for example, a possibility that a situation where when there is a request for transition of the scene, the modules of this scene are not stored in the DSM-CC buffer 91 as mentioned above occurs is avoided as much as possible. In most cases, therefore, the switching of the scenes is immediately performed in accordance with the scene switching operation.

Actually, it takes slightly long time until the storage state of the DSM-CC buffer 91 is shifted in accordance with the priorities of the scenes changed in accordance with the scene switching, for example, as shown in FIGS. 28A and 28B. However, for example, a certain period of time ordinarily exists until the first scene switching operation is performed after the start of the output of the scene C. That is, the user generally watches the image of the scene C for a little while after the start of the output of the scene C. Since the exchange of the scene data in the DSM-CC buffer 91 is usually almost finished for such a period of time, no problem occurs in the practical use.

Figure 29B:
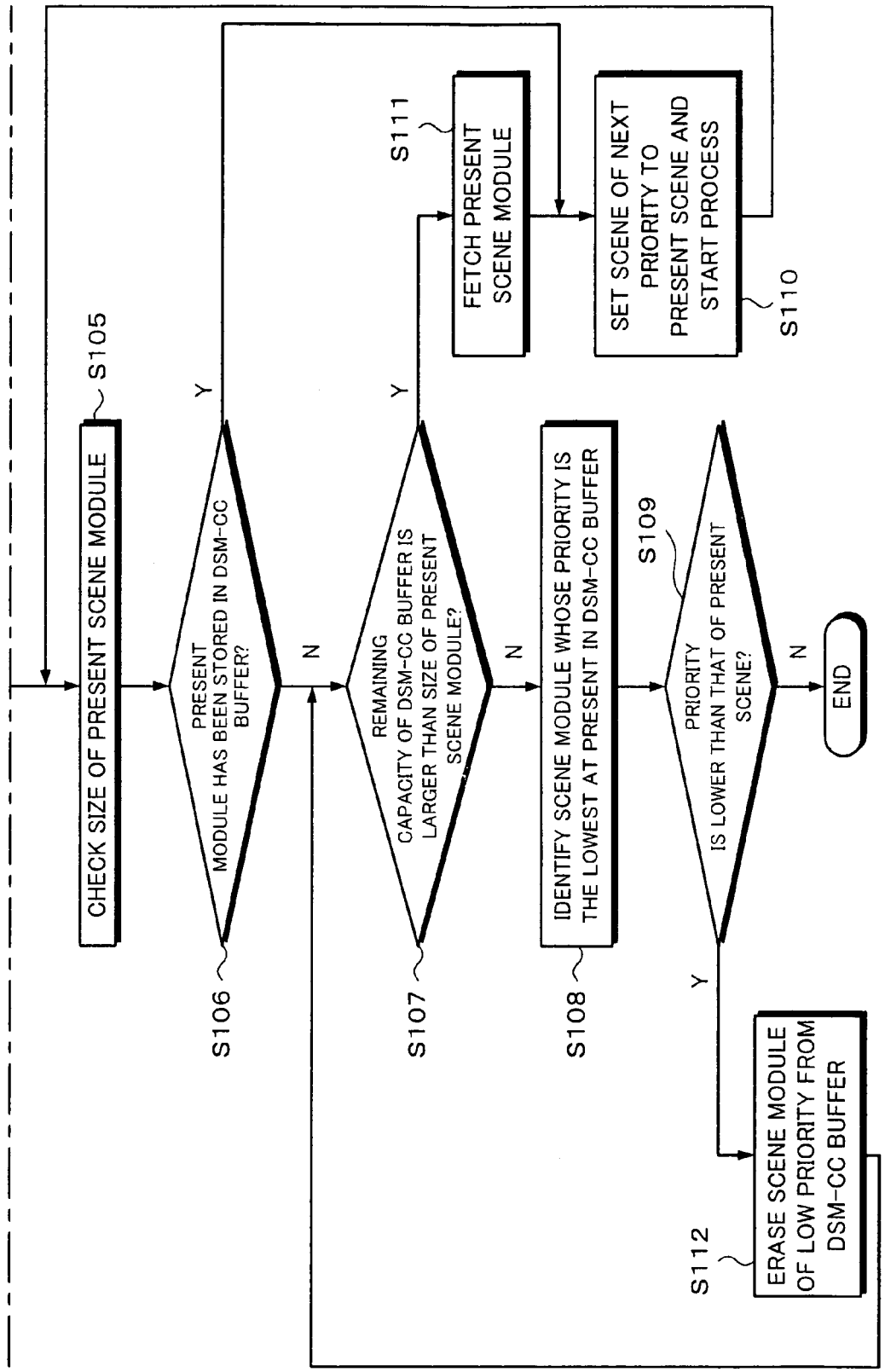

The processing operation to realize the module allocation described in FIGS. 26 to 28 will now be described with reference to a flowchart of FIGS. 29A and 29B. The processes shown in the diagram are executed by the CPU 80. That is, they are realized by a method whereby the demultiplexer driver 82, DSM-CC decoder block 83, and MHEG decoder block 84 properly execute a desired control process on the basis of the whole control of the control processing unit 81.

The diagram shows a corresponding process regarding the scene module allocation in the case where, for example, the scene switching is necessary because the operation to request the scene switching by the user or the like is performed.

First, in step S101, the scene candidates mentioned in accordance with the scene priorities of the next scene manager before the scene switching and the scene candidates mentioned in accordance with the scene priorities of the next scene manager after the scene switching are compared, and the dissident candidates among those scene candidates are extracted. The scenes which coincide in common among the scene candidates are registered into a "scene list" to be handled by the scene next manager in accordance with the scene switching.

This process is realized by, for example, activating the next scene manager by the MHEG decoder block 84.

In subsequent step S102, a process such that among the dissident scene candidates extracted in step S101, the scene candidates before scene switching are deleted and the scenes which become the candidates after the scene switching are added to the scene list is executed as a process of the MHEG decoder block 84.

By this process, a plurality of scenes which become the candidates are prepared as a scene list in accordance with the scene switching.

In step S103, with respect to the scenes registered as a scene list, the sorting is executed in accordance with the priority of the scene changed in accordance with the scene switching by using the function of the next scene manager.

Thus, the managing state is shifted from the managing state of the next scene manager shown in FIG. 26 to the managing state of the next scene manager shown in FIG. 27.

Among the processes shown in steps S101 to S103, the processes in steps S101 and S102 are not particularly mentioned in the above description regarding FIGS. 26 and 27. This is because, in the case shown in FIGS. 26 and 27, the scene candidates are not exchanged due to the scene switching from the scene A to the scene C. That is, upon scene switching from FIG. 26 to FIG. 27, the dissident scenes are not extracted in step S101 and it is regarded that all of the scenes coincide, so that they are registered in the scene list.

Subsequently to step S103, a process in step S104 is executed. In the scene list sorted in step S103, the process regarding the scene of the highest order as a priority is started. That is, this scene is handled as a "present scene" and the subsequent processes are executed.

As a "scene of the highest order as a priority" in step S104, the scene of the highest priority is selected except for the scene (scene C in FIG. 27) that is at present being outputted. That is, the scene B is selected in case of FIG. 27. For example, when the managing state of the priorities shown in FIG. 27 is obtained, if the scene C is not stored in the DSM-CC buffer 91, it is assumed that the process in step S104 is performed so as to exceptionally handle the scene C as a present scene.

In subsequent step S105, a data size of the module (scene module) which is formed by the data of the present scene selected in step S104 is checked. It can be identified by, for example, a method whereby the DII (refer to FIG. 8) as control information corresponding to the present scene module is fetched from the data of the karrusel and, for instance, the DSM-CC decoder block 83 refers to the information indicative of the data size of the module in the DII fetched. The information of the data size of the present scene module which was obtained here is temporarily held and used for a discriminating process in step S107, which will be explained hereinlater.

In step S106, whether the system is in a state where the present scene module has already been stored in the DSM-CC buffer 91 or not is discriminated. If YES, step S110 follows and there is executed a process such that for the present scene so far, the scene to which the next priority has been allocated is selected as a present scene on the scene list and the process as such a present scene is started.

On the other hand, if NO in step S106, the processing routine advances to the processing step S107.

In step S107, a check is made to see if the present remaining capacity (data fetch possible capacity) of the DSM-CC buffer 91 is larger than the size of present scene module checked in step S105. If YES, namely, it is determined that there is a surplus capacity which can fetch and store the present scene module as a present remaining capacity of the DSM-CC buffer 91, step S111 follows. A process for accumulating the data of the present scene module from the karrusel into the queue 71 and fetching and storing it into the DSM-CC buffer 91 is executed. The control operation of the CPU 80 to realize this process and the signal processing operation of each section in association with it are as mentioned in, for example, the description of FIG. 28.

After the process in step S111 was executed, the processing routine is returned to the process in step S105 via the process in step S110.

If NO in step S107 and when it is determined that the present remaining capacity of the DSM-CC buffer 91 is smaller than the size of the present scene module checked in step S105, the processing routine advances to step S108.

In step S108, the present priority management by the next scene manager is compared with the scene module stored in the DSM-CC buffer 91 at present, and among the scene modules stored in the DSM-CC buffer 91 at present, the scene module managed as a module having the lowest priority at present is specified. In next step S109, whether the priority of the specified scene module is lower than that of the present scene or not is discriminated.

In step S109, if the priority of the scene module specified in step S108 is lower than that of the present scene, step S112 follows. The specified scene module is deleted from the DSM-CC buffer and the processing routine is returned to step S107. By this process, until the remaining capacity of the DSM-CC buffer 91 in which the present scene module can be fetched is obtained, the scene module of the lowest priority (however, only the scene modules whose priorities are lower than that of the present scene are handled as targets) is deleted from the DSM-CC buffer 91.

If NO in step S109, namely, when it is determined that the priority of the scene module specified in step S108 is higher than that of the present scene, at this stage, the scene module stored in the DSM-CC buffer 91 eventually corresponds to the priority of the present scene managed by the next scene manager. That is, according to the foregoing specific example, the storing state of the scene module shown in FIG. 28B is obtained in correspondence to the management of the next scene manager shown in FIG. 27. In this case, the process for module allocation so far is finished as shown in the diagram.

5. Synchronization Between Reproduction of Main Video Image ○ Audio Data and Reproduction of Additional Data In case of a service which is multiplexing and broadcasting the music piece data for downloading in parallel with the TV broadcasting program, there is a case where the client wants to synchronize the reproduction of the video image and audio data of the main channel (for example, 21A in FIG. 4) with the reproduction of the additional data such as a still image or the like (for example, 21D in FIG. 4).

Figure 30A:
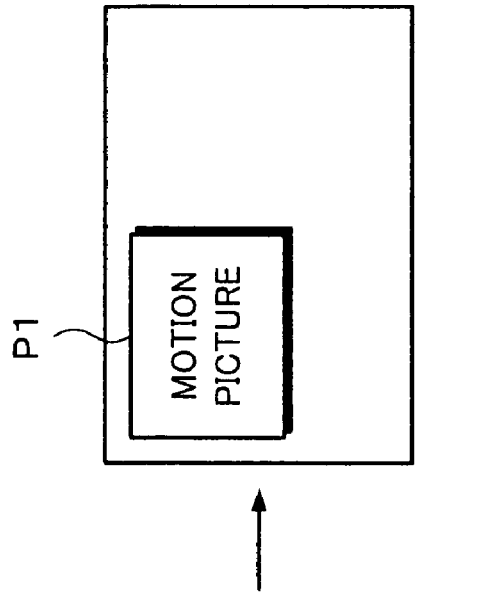
FIGS. 30A to 30C are schematic diagrams for use in explanation of an example of an event.
Figure 30B:
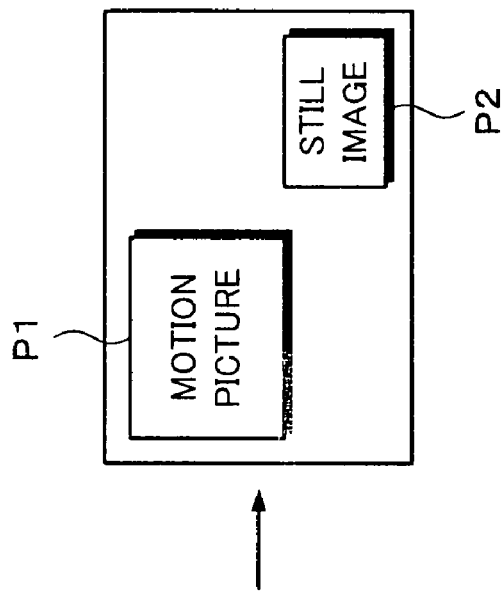
Figure 30C:
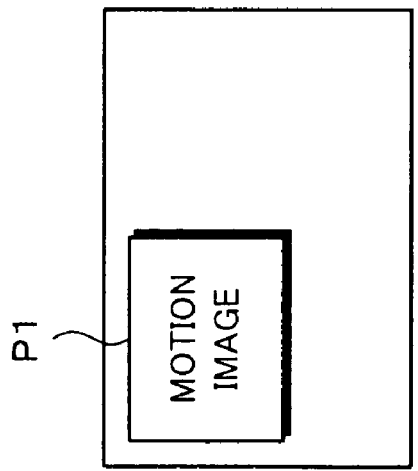

For example, the image is displayed in the following manner. That is, as shown in FIG. 30, while a picture plane P1 of a main program is displayed by a layout as shown in FIG. 30A for a period of time between time T0 and time T2, a still image P2 of the additional data is displayed in addition to the picture plane P1 of the main program at time T1 as shown in FIG. 30B. The still image P2 is continuously displayed until time T2. The still image P2 disappears at time T2 as shown in FIG. 30C.

In such a case, even if the additional data is simply transmitted simultaneously with the broadcasting of the video image and audio data, the reproduction of the video image and audio data is not always synchronized with the reproduction of the additional data on the receiving side.

A method whereby the time of generation of the event is described in the script and the reproduction of the data is started when the generating time of the event comes. By describing the event generating time in detail as mentioned above, the reproduction of the main video image and audio data can be synchronized with the reproduction of the still image data or the like to be added thereto.

In this case, if precision on the order of the second or higher precision is demanded for the time information to be transmitted, however, burdens on the transmitting side and receiving side increase. There is often a case where the prescribed time of the program is changed due to a sports program, a special newscast, or the like. In the case where the time information to display the additional data and make the system operative is described by the script, if there is a time change of the program as mentioned above, it is difficult to cope with it.

In the embodiment, therefore, an event notice is constructed by the time information and the event name and a code showing that the event is immediately generated is defined and arranged at the portion of the time information and sent. By using this method, there is no need to manage the time and the load of the CPU can be reduced on the receiving side.

A method of synchronizing the reproduction of the video image and audio data of the main channel with the reproduction of the additional data of the still image or the like will now be described in detail hereinbelow.

As objects included in the main service gateway, there are the directory, file, stream, and stream event as mentioned above. Among them, however, the authoring is performed by the GUI authoring system 42 so that the link information, event name, and time information are included in the stream event.

FIG. 31 shows an example of a script (MHEG) to generate such a scream event. As shown in FIG. 31, the event name when such display data is formed is defined in the script and a status change (on/off of the display data) occurring in correspondence to the event name is described.

In the DSM-CC encoder 44, a time code of the video source to be synchronized is read, the read-out time code is used as time information, and a stream event packet is formed by allowing the time code to correspond to the event name. The stream event packet is repetitively transmitted from the broadcasting station separately from the karrusel as will be explained hereinlater.

FIG. 32 shows a structure of such a stream event packet. As shown in FIG. 32, a header showing the stream event packet is provided in the head of the stream event packet. A pair of first event name and time information are described subsequently to the header. Further, a pair of next event name and time information are described subsequently to it. A plurality of pairs of the event name and the time information can be continuously coupled.

As time information of the event, there is a case where an impossible code, for example, ALL"1" in which all bits are equal to "1" is arranged at the portion of the time information. In this case, it is defined that it means "event is immediately generated".

Although the video image and audio data of the main program and the additional data are transmitted from the transmitting side, the stream event packet is repetitively transmitted a plurality of number of times at predetermined intervals from a timing that is predetermined processing time earlier than the timing for synchronization.

On the receiving side, when the stream event packet is received, the event is generated at time corresponding to the time information in the packet. If the portion of the time information indicates ALL"1", the event is soon generated after the reception. Thus, the reproduction of the video image and audio data of the main program can be synchronized with the display of the additional data.

Figures 33A, 33B, 33C, 33D:
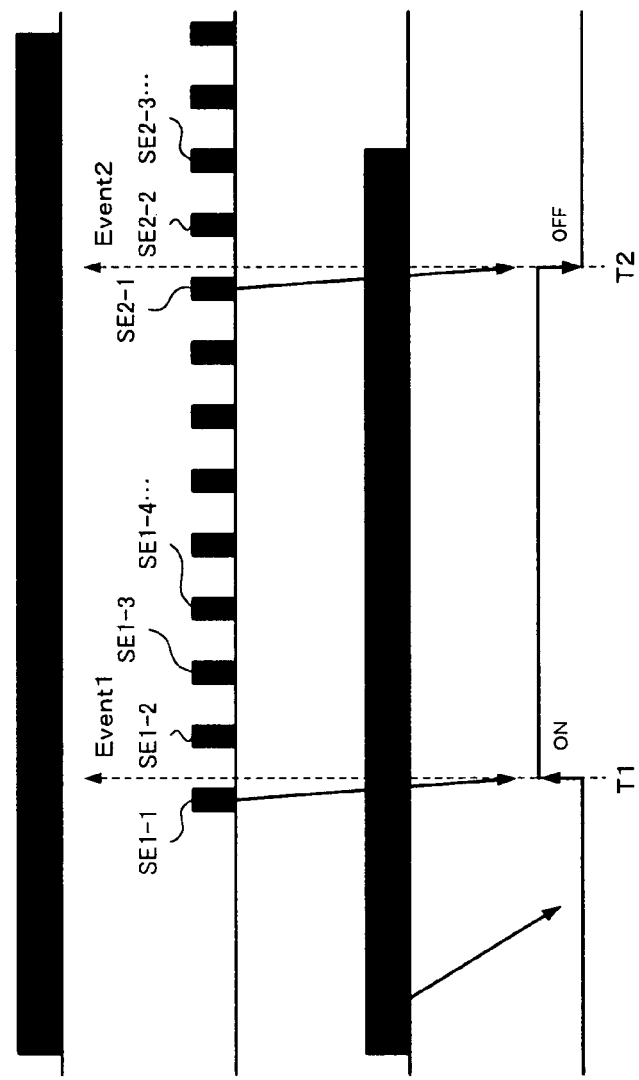
FIGS. 33A to 33D are timing charts for use in explanation of an example of a stream event sequence.

That is, as shown in FIG. 33A, the stream of the video image and audio data of the main program is continuously transmitted. The packet of the additional data is sent as shown in FIG. 33C and the packet of the additional data is previously fetched to the receiver. In this example, it is assumed that an event (Event 1) is generated at a time point T1 and an event (Event 2) is generated at a time point T2. The event (Event 1) turns on the display of the still image P2. The event (Event 2) turns off the display of the still image P2.

In this case, as shown in FIG. 33B, a stream event packet SE1-1 in which the event name is the event (Event 1) and the portion of the time information is set to ALL"1" is sent at a timing that is slightly before the time point T1 for generating the event (Event 1). Stream event packets SE1-2, SE1-3, ... in which the event name is the event (Event 1) and the portion of the time information is set to ALL"1" are periodically sent until a timing before the timing of starting the next event (Event 2). The stream packets SE1-1, SE1-2, SE1-3, ... are the same packet.

A stream event packet SE2-1 in which the event name is the event (Event 2) and the portion of the time information is set to ALL"1" is sent at a timing that is slightly before the time point T2 for generating the event (Event 2). Stream event packets SE2-2, SE2-3, ... in which the event name is the event (Event 2) and the portion of the time information is set to ALL"1" are periodically sent until a timing before the timing of starting the next event (or until the end of the program).

On the receiving side, the stream event packet SE1-1 is received at a timing that is slightly before the time point T1 of generating the event (Event 1). Since the portion of the time information is set to ALL"1" in the stream event packet SE1-1, the event (Event 1) is immediately generated at a point when the stream event packet SE1-1 is received. Since this event (Event 1) turns on the display of the still image P2, the event is immediately generated at a point when the stream event packet SE1-1 is received. The display of the still image P2 is turned on as shown in FIG. 33D.

The reason why the stream event packet SE1-1 is transmitted at a timing that is slightly before the time point T1 of generating the event (Event 1) is because it is necessary to consider the processing time. Since there is such a processing time, the still image is displayed just at the time point T1 by transmitting the stream event packet SE1-1 at a timing that is slightly before the time point T1 of generating the event (Event 1). Since the display data shown in FIG. 33C has been fetched before the generation of the event, it is considered that the processing time of the display data is based on only the time that is required for development of the image and can be regarded to be almost constant.

The stream event packet SE2-1 is subsequently received at a timing that is slightly before the time point T2 of generating the event (Event 2). Since the portion of the time information of the stream event packet SE2-1 is set to ALL"1", the event (Event 2) is immediately generated at the point when the stream event packet SE2-1 is received. Since this event (Event 2) turns off the display of the still image P2, the event is immediately generated at a point when the stream event packet SE2-1 is received and the display of the still image P2 is turned off. Since the processing time of the display time exists, the process of the data is finished just at the time point T2. The still image is erased as shown in FIG. 33D.

As mentioned above, the stream event packet for generating each event is sent at a timing that is earlier than the time of generating each event by the processing time of the event data. The additional data which is used for the event has previously been sent and fetched to the receiver. Therefore, each event can be generated at a prescribed time.

The stream event packet is repetitively transmitted until the time point of starting the next event or until the end of the program. The reason why the same stream event packet is repetitively transmitted as mentioned above is because in the case where a power source of the receiver is turned on after the time of each event which was defined or in the case where the status is changed from another channel to this channel, it is necessary to shift the display data to the correct state.

In the above example, both of the event (Event 1) and the event (Event 2) are transmitted as stream event packets in which the portion of the time information is set to ALL"1". However, a stream event packet in which the event name and the event time information are described and a stream event packet in which the event name and the portion of the time information is set to ALL"1" can be combined and transmitted.

FIG. 34 shows such an example in which the stream event packet in which the event name and the event time information are described and the stream event packet in which the event name and the portion of the time information is set to ALL"1" are combined and transmitted.

That is, in FIG. 34, stream event packets SE11-1, SE11-2, SE11-3, . . . of an event (Event 11) turn on the display of the still image P2 at a time point T11. "Time T1" is described in the time information of the stream event packets SE11-1, SE11-2, SE11-3, . . . . On the other hand, stream event packets SE12-1, SE12-2, SE12-3, . . . of an event (Event 12) turn off the display of the still image P2 at a time point T12. In the stream event packets SE12-1, SE12-2, SE12-3, . . . , the portion of the time information is set to ALL"1".

In this case, as shown in FIG. 34B, the stream event packets SE11-1, SE11-2, SE11-3, . . . are periodically repetitively sent from a timing before the time point T11 of generating the event (Event 11). The stream event packet SE12-1 of the event (Event 12) is transmitted at a timing that is slightly before the time point T12 of starting the next event (Event 12). Subsequently, the similar stream event packets SE12-2, SE12-3, . . . are periodically repetitively transmitted.

On the receiver side, the stream event packets SE11-1, SE11-2, SE11-3, . . . are received at a timing before the time point T11 of generating the event. All of the stream event packets SE11-1, SE11-2, SE11-3, . . . are the similar packets. The time information of the stream event packets SE11-1, SE11-2, SE11-3, . . . are set to "time T11". Therefore, the receiver side waits until the time point T11 comes.

When the time point T11 comes, the event (Event 11) is generated. Since the event (Event 11) turns on the display of the still image P2, the display of the still image P2 is turned on from the time point T11 as shown in FIG. 34D.

The stream event packet SE12-1 is received at a timing that is slightly before the time point T12 of generating the event (Event 12). Since the portion of the time information of the stream event packet SE12-1 is set to ALL"1", the event (Event 12) is immediately generated at the point when the stream event packet SE12-1 is received. Since the event (Event 12) turns off the display of the still image P2, the event (Event 12) is immediately generated at the point when the stream event packet SE12-1 is received. The display of the still image P2 is turned off. Since the processing time of the display data exists, as shown in FIG. 34D, the displaying process of the still image P2 is finished just at the time point T12 and the still image is erased.

In this case as well, the stream event packet is repetitively transmitted until the time point of starting the next event or until the end of the program. The reason why the same stream event packet is repetitively transmitted as mentioned above is because in a manner similar to the above, in the case where the power source of the receiver is turned on after the time of each event defined or in the case where the status is shifted from another channel to this channel, it is necessary to shift the display in the correct state.

In the case where the time is described in the time information of the stream event packet and the stream event packet is transmitted, an MHEG script such as "If the described time information indicates the passage of the present time, the event is immediately generated" is described. By using this method, the time information of the stream event packet has been described and even in the case where the present time has already passed the time shown by the time information, the event can be immediately generated.

Although the above example relates to the simple event process such as to turn on/off one additional data, a plurality of additional data can be also processed. In this case, by handling the events regarding the same additional data as a group, processes can be performed in a manner similar to the case of the simple sequence.

For example, as shown in FIG. 35, it is presumed to perform a displaying process in a manner such that while an image P21 of the main program is displayed by a layout as shown in FIG. 35A for a period of time between time T20 and time T24, a still image P22 is displayed at the time point T21 as shown in FIG. 35B, a still image P23 is further displayed at the time point T22 as shown in FIG. 35C, only the still image P22 is erased at the time point T23 as shown in FIG. 35D, the still image P23 is erased at the time point T24 as shown in FIG. 35E, and only the main motion image P21 is continuously displayed.

As mentioned above, when there are two events of the event regarding the still image P22 and the event regarding the still image P23, the events regarding each additional data are considered as a group.

First, as an event of the group regarding the still image P22, there is an event to turn on the display of the still image P22 at the time point T21 and turn off the display of the still image P22 at the time point T23. As an event of the group regarding the still image P23, there is an event to turn on the display of the still image P23 at the time point T22 and turn off the display of the still image P23 at the time point T24.

To realize the event regarding the still image P22 of the first group, the stream event packet of the event name to turn on the display of the still image P22 in which the portion of the time information is set to ALL"1" is transmitted at a timing that is slightly before the time point T21. After that, the stream event packet is periodically repetitively transmitted. The stream event packet of the event name to turn off the display of the still image P22 in which the portion of the time information is set to ALL"1" is transmitted at a timing that is slightly before the time point T23. After that, the stream event packet is periodically repetitively transmitted.

To realize the event regarding the still image P23 of the next group, the stream event packet of the event name to turn on the display of the still image P23 in which the portion of the time information is set to ALL"1" is transmitted at a timing that is slightly before the time point T22. After that, the stream event packet is periodically repetitively transmitted. The stream event packet of the event name to turn off the still image P23 in which the portion of the time information is set to ALL"1" is transmitted at a timing that is slightly before the time point T24. After that, the stream event packet is periodically repetitively transmitted.

As mentioned above, when there is an event regarding a plurality of additional data, by performing the grouping for every data, they can be considered in a manner similar to the case of one data. In case of generating a plurality of events at the same time, there is no need to transmit them by another packet and a plurality of stream event information can be transmitted by one stream event packet.

Figures 36A, 36B, 36C, 36D, 36E:
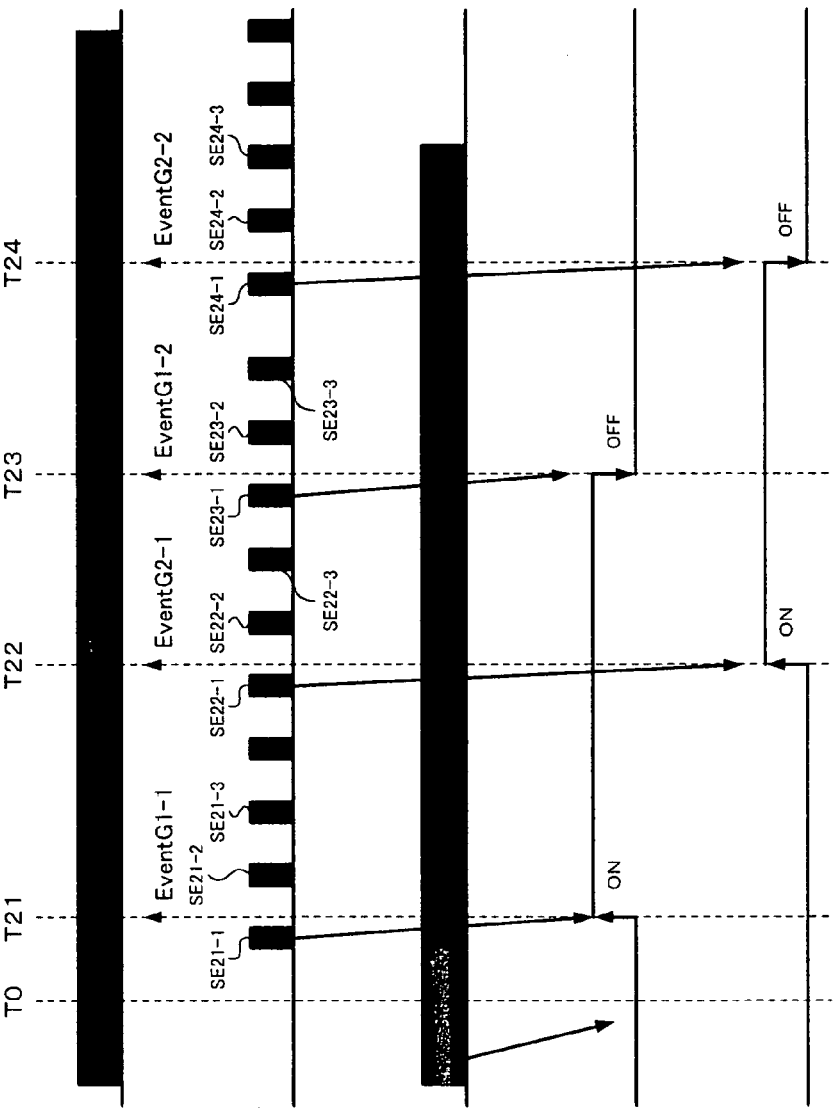
FIGS. 36A to 36E are timing charts for use in explanation of further another example of a stream event sequence.

FIG. 36 shows a stream event sequence to realize the stream corresponding to the event shown in FIG. 35. As shown in FIG. 36A, the stream of the video image and audio data of the main program is continuously transmitted. The packet of the additional data is sent as shown in FIG. 36C and the packet of this additional data has previously been fetched.

An event (Event G1-1) is an event to turn on the display of the still image P22. An event (Event G1-2) is an event to turn off the display of the still image P22. An event (Event G2-1) is an event to turn on the display of the still image P23. An event (Event G2-2) is an event to turn off the display of the still image P23.

In this case, as shown in FIG. 36B, a stream event packet SE21-1 in which the event name is event (Event G1-1) and the portion of the time information is set to ALL"1" is transmitted at a timing that is slightly before the time point T21 of generating the event (Event G1-1). After that, the same stream event packets SE21-2, SE21-3, . . . are periodically repetitively transmitted.

A stream event packet in which the event name is event (Event G2-1) and the portion of the time information is set to ALL"1" is transmitted at a timing that is slightly before the time point T22 of generating the event (Event G2-1). In this instance, it is necessary to also continuously transmit the stream event packet in which the event name is event (Event G1-1) and the portion of the time information is set to ALL"1". Therefore, stream event packets SE22-1, SE22-2, SE22-3, . . . in which those events have been merged are periodically continuously transmitted.

A stream event packet in which the event name is event (Event G1-2) and the portion of the time information is set to ALL"1" is transmitted at a timing that is slightly before the time point T23 of generating the event (Event G1-2). In this instance, it is necessary to also continuously transmit the stream event packet in which the event name is event (Event G2-1) and the portion of the time information is set to ALL"1". Therefore, stream event packets SE23-1, SE23-2, SE23-3, . . . in which those events have been merged are periodically continuously transmitted.

A stream event packet in which the event name is event (Event G2-2) and the portion of the time information is set to ALL"1" is transmitted at a timing that is slightly before the time point T24 of generating the event (Event G2-2). In this instance, it is necessary to also continuously transmit the stream event packet in which the event name is event (Event G1-2) and the portion of the time information is set to ALL"1". Therefore, stream event packets SE24-1, SE24-2, SE24-3, . . . in which those events have been merged are periodically continuously transmitted.

By grouping the stream events per target as mentioned above, for example, even when this channel is selected for a period of time between time T22 and time T23, as a result of that both of the event (Event G1-1) and the event (Event G2-1) were generated, both of the display of the still image P22 and the display of the still image P23 can be turned on. When this channel is selected for a period of time between time T23 and time T24, both of the event (Event G2-1) and the event (Event G1-2) are generated, so that the still image P23 can be eventually displayed.

Although the invention has been described with respect to the case of using the DSM-CC system as a data transmitting system and using the U—U API as an interface between the MHEG client servers, the invention is not limited to it. The invention can be applied to any transmitting system and interface which conform with the transmitting format described in the above embodiment. The system to which the invention is applied is not limited to the digital satellite broadcasting system but can be also applied to, for example, a broadcasting of a cable television or the like, the Internet, or the like.

As described above, according to the invention, for example, as a data transmission control method on the receiving side of the system for transmitting the data by the object karrusel in the DSM-CC system, a fact that the contents of the karrusel have been changed can be notified from the server side to receive the data from the karrusel and hold it to the client to realize a desired function by using the data of the karrusel. Therefore, the client side can promptly or efficiently execute in accordance with this notification in response to the switching of the contents of the karrusel.

According to the invention, as a karrusel contents switching notice process for notifying the client of the fact that the contents of the karrusel have been switched as mentioned above, for example, the control information change event (DSI_CHANGED) which denotes the change of the control information (DSI) regarding the switching of the contents of the karrusel is set under the existing interface such as U—U API or the like, and the fact that the control information has been changed is notified to the server side from the client side by using the control information change event. That is, the notification of the switching of the contents of the karrusel can be realized in accordance with the existing interface without using the standard of the specified interface, so that generality is given.

The transfer of a subscribe event (Event::subscribe) is executed when the program of the client is activated or when the karrusel itself is switched. By allowing an event notice request (Event::notify) to be immediately executed after a response message to the event notice request from the server was obtained, the contents switching notice of the karrusel can be obtained without almost missing it after the activation of the program of the client. For example, the contents of the GUI picture plane can be changed almost in quick response to the switching of the contents of the karrusel on the broadcasting side, or the like. The reliability is improved.

Further, the contents of the karrusel before the control information change event is generated are continuously used in a predetermined period of time until the client transfers a session detach (Session::detach ○ ○ ○ release request) to the server after the server notified the client of the generation of the control information change event. Therefore, it is possible to construct the system in a manner such that even if the contents of the karrusel are switched, the process that is being executed on the basis of the contents of the karrusel just before is not interrupted.

As a data transfer control method on the receiving side of the system for performing the data transmission by the object karrusel under, for example, the DSM-CC system, a fact that the objects in the karrusel (cyclic data unit) has been updated can be notified from the server side which receives and holds the data from the karrusel to the client to realize a desired function by using the data of this karrusel. Thus, the client side can promptly or efficiently execute the process to be executed in response to the updating of the object in accordance with this notice.

In the invention, as an object updating notifying process for notifying the client of the updating of the object as mentioned above, for example, control information change event (DII_CHANGED) which means the change of the control information (DII) regarding the module whose contents are updated in accordance with the updating of the object is set under the existing interface such as a U—U API or the like. By using this control information change event, the presence of the change of the control information is notified from the client side to the server side. That is, the notification of the updating of the object can be realized in accordance with the existing interface without using the standard of the specified interface, so that the generality is given.

When the generation of the control information change event is notified from the server side on the basis of the control information change event, if the ID of the module to which the control information corresponds is added, the client side can not only know that the object has merely been updated in the karrusel but also specify the module to which the updated object belongs. Thus, the process can be efficiently executed when the process for loading the data again or the like is executed.

As another object updating notifying process of the invention, the control information change event (DII_CHANGED) which means the change of DII is set under the existing interface such as U—U API or the like and the client side subscribes the reception of the control information change event (Event::subscribe) in a manner similar to that mentioned above. After that, the ID of the interesting object is sent to the server and the ID of the module to which this object belongs is sent from the server to the client. In response to the subsequent request to receive the control information change event of the client, the server side adds the ID of the module of the updated control information and notifies the client of the presence of the control information change event.

On the client side, consequently, by searching the table in which the object ID and the module ID are made to correspond, the object which was almost updated can be also specified. In this case, it is sufficient that the client side loads the data again, for example, on an object unit basis. The process burden is further reduced.

As further another object updating notifying process, the client side adds the ID of the interesting object and subscribes the reception of the updating event of the module to the server, and the server executes the interface such that the ID of the peculiar module updating event is set and returned to the client in response to this (subscribe).

In response to the subsequent request to receive the module updating event of the client, the server side adds the module updating event ID of the updated control information and transmits the module updating event.

Even by using this construction, on the client side, by searching the table in which the object ID and the module updating event ID are made to correspond, the object which was almost updated can be also specified. In this construction, since the obtained module updating event ID and the corresponding object ID are unconditionally obtained, there is no need to search the table in order to specify the updated object. The process burden on the client side is further reduced.

The transfer of the subscribe event (Event::subscribe) is executed when the program of the client is activated or when the karrusel itself is switched. By constructing in a manner such that the event notice request (Event::notify) is executed immediately after the response message to the event notice request from the server is obtained, the notice of updating of the object can be obtained after the activation of the program of the client without almost missing it. For example, the contents of the GUI picture plane can be changed almost in quick response to the updating of the object on the broadcasting side, or the like. The reliability is improved.

According to the invention, for the time information of the stream event comprising the event name and the time information, one code (for example, ALL"1") which cannot exist as time information is defined as a meaning of "Event is immediately generated". Therefore, when the stream event is sent by setting the portion of the time information to, for example, ALL"1", the event is immediately generated on the receiving side. Therefore, when the client wants to synchronize the display data with the video image and audio data, by transmitting the stream event in which the portion of the time information is set to, for example, ALL"1" at a timing that is slightly before the timing of generating the event, the display data can be synchronized with the video image and audio data. Therefore, the synchronization between the video image and audio data and the additional data can be easily accomplished and it is possible to easily cope with the change of the program. The time management is unnecessary on the receiving side.

Further, the invention is specified in a manner such that as a transmitting system, the scene data of one scene forms one module in principle, and as a receiving apparatus corresponding to the case where the transmission data comprising one or more modules is transmitted by the karrusel system, the modules as scene data to be extracted from the karrusel (transmission information) and fetched into the queue (memory means) are determined in accordance with the priorities of the scenes.

For example, in the case where the fetching order of the modules into the queue is not particularly specified, it takes long time until the scene data necessary for the display output is obtained and fetched in the scene data storing means (DSM-CC buffer). Many queues are necessary to enable the modules as target scene data to be obtained by the scene data storing means as promptly as possible in order to solve such a problem.

On the other hand, according to the invention, since the modules as scene data are fetched in accordance with the priorities by the above construction, even in the construction using the limited number of queues, the scene data that is necessary for display output or has a high possibility that it is necessary is relatively promptly obtained. That is, according to the invention, even if the number of queues is small, the invention can promptly cope with the scene output and the scene switching. On the contrary, the number of queues can be reduced as compared with the case of realizing the rapid scene output and scene switching without applying the invention, so that the circuit scale of the IRD (receiving apparatus) can be reduced and the low costs can be realized.

Since the modules as scene data to be fetched from the karrusel of the reception data are determined in accordance with the priorities to be changed in response to the scene that is at present being outputted, a state where the scene data has always been stored preferentially in the scene data storing means in accordance with the priorities from the scene data of the upper order in correspondence to the switching of the scene display is obtained.

In this case, a possibility that the scene data of the scene to be selected by the switching operation of the scene display has been stored in the scene data storing means is very high. Therefore, for example, even if the switching operation of the scene display is performed, in many cases, the scene switching operation is promptly performed. This construction is particularly effective under a condition such that there is a limitation in the capacity of the scene data storing means (DSM-CC buffer) and a number of scene data cannot be stored.

INDUSTRIAL APPLICABILITY

The invention can be used in case of transmitting music data in association with a main TV program broadcasting and distributing music in, for example, a digital satellite broadcasting or the like.

What is claimed is:

1. A data transmission control method, comprising:
   repetitively transferring a cyclic data unit for a desired period of time, the cyclic data unit including desired data that is also transferred,
   processing the cyclic data unit by enabling a client that receives the cyclic data unit from a server to determine that the cyclic data unit contents were switched, and switching control information included in the cyclic data unit, and
   wherein processing the cyclic data is realized by setting a control information change event which denotes that the control information has been received under a standard of a predetermined interface, and
   thereafter, executing at least—
   a first process for allowing the client to transmit a subscribe event to indicate reception of the control information change event to the server, a second process for allowing the client to transmit an event notice requesting notification of generation of an event to the server, and
   a third process for notifying the client that the control information change event has been generated when the changed control information is received by the server in response to the event notice request.

2. A data transmission control method according to claim 1, wherein transmission of the subscribe event as said first process is executed when the contents of the cyclic data unit are switched.

3. A data transmission control method according to claim 1, wherein transmission of the subscribe event as said first process is executed when a program of the client is activated.

4. A data transmission control method according to claim 1, wherein after the server notifies the client of generation of the control information change event by said third process, the client continuously uses the cyclic data unit before the control information change event in said third process is generated within a predetermined period of time until a release request of the cyclic data unit corresponding to said changed control information is transmitted to the server.

5. A data transmission control method, comprising:
   repetitively transferring a cyclic data unit, the cyclic data unit including one or more data transmission units that are to be transferred for a predetermined period of time, each data transmission unit including an object that is related by a scenario description of a predetermined system, and
   processing the cyclic data unit by enabling a client that receives the cyclic data unit from a server to be notified that the object has been updated, and
   wherein control information whose contents are updated in accordance with the updating of the object and relate to the data transmission unit is included in the cyclic data unit,
   said processing step including setting a control information updating event which denotes that the control information has been received under a standard of a predetermined interface, and
   thereafter, executing at least—
   a first process for allowing the client to transmit a subscribe event to indicate reception of the control information updating event to the server,
   a second process for allowing the client to transmit an event notice requesting notification of generation of an event to the server, and
   a third process for notifying the client that the control information updating event has been generated when the updated control information is received as a response by the server to said the event notice request.

6. A data transmission control method according to claim 5, wherein said third process adds identification information of the data transmission unit shown by the updated control information and notifies the client that a control information receiving event has been generated.

7. A data transmission control method according to claim 5, wherein the method further comprises transmitting the subscribe event as part of said first process when a program of the client is activated or when the cyclic data unit is switched.

8. A data transmission control method according to claim 5, the method comprising executing said second process immediately after a response message for said event notice request from said server is obtained.

9. A data transmission control method according to claim 5, wherein the method further comprises:
   including control information regarding the data transmission unit whose contents are updated in accordance with updating the object which belongs thereto in the cyclic data unit, and
   said processing step executes at least—
   a first process for allowing the client to transmit a subscribe event indicating reception of a control information updating event to the server,
   a second process for allowing the client to notify the server of an object ID of an object of interest and allowing the server to return a data transmission unit ID which corresponds to the notified object of interest to the client,
   a third process for allowing the client to form table information showing a correspondence between the object ID notified to the server side by said second process and the data transmission unit ID obtained from the server side by said second process,
   a fourth process for allowing the client to transmit an event notice requesting notification of an event generation to the server,
   a fifth process for adding the data transmission unit ID shown by the updated control information when the updated control information is received by the server in response to the event notice request in the server and notifying the client of generation of the control information updating event, and
   a sixth process for allowing the client to search the data transmission unit ID of the table information which coincides with the data transmission unit ID obtained by said fifth process and specifying that the object shown by the object ID corresponding to the searched data transmission unit ID has been updated.

10. A data transmission control method according to claim 9, wherein the transmission of the subscribe event as said first process is executed when a program of the client is activated or when the cyclic data unit is switched.

11. A data transmission control method according to claim 9, wherein after a response message to the event notice request from the server was obtained, said fourth process is immediately executed.

12. A data transmission control method according to claim 5, wherein control information regarding the data transmission unit whose contents are updated in accordance with an updating of the object which belongs thereto is included in the cyclic data unit, and said object updating notifying process executes— a first process for allowing the client to transmit a subscribe event to request reception of a data transmission unit updating event to the server together with an object ID of an object of interest and allowing the server to set a data transmission unit updating event ID in response to the request and transmitting the data transmission unit updating event ID to the client, a second process for allowing the client to form table information showing a correspondence between the object ID transmitted to the server by said first process and the data transmission unit updating event ID obtained from the server by said first process, a third process for allowing the client to transmit an event notice requesting notification of the data transmission unit updating event to the server, a fourth process for adding said data transmission unit updating event ID shown by the updated control information and set in correspondence to the object ID of the object included in the data transmission unit when the updated control information is received as a response to said event notice request in the server and notifying the client of a generation of the data transmission unit updating event, and a fifth process for allowing the client to identify the object ID of the data transmission unit updating event ID of the table information which coincides with the data transmission unit updating event ID obtained by said fourth process and specifying the object shown by said identified object ID as an updated object.

13. A data transmission control method according to claim 12, wherein the method further comprises executing the event notice request as said second process immediately after a response message for the event notice request from the server is obtained.

* * * * *

UNITED STATES PATENT AND TRADEMARK OFFICE
CERTIFICATE OF CORRECTION

PATENT NO. : 6,966,065 B1
DATED : November 15, 2005
INVENTOR(S) : Naohisa Kitazato et al.

It is certified that error appears in the above-identified patent and that said Letters Patent is hereby corrected as shown below:

Column 6,
Line 2, after "image", delete "o" and insert -- . --.

Column 12,
Lines 33 and 39, after "image", delete "O" and insert -- . --.

Column 33,
Line 41, after "2", delete "OOO" and insert -- ... --.
Line 43, after "3", delete "OOO" and insert -- ... --.

Column 35,
Line 34, after "D", delete "OOO" and insert -- ... --.

Column 40,
Line 39, after "image", delete "O" and insert -- . --.

Column 46,
Line 54, after "detach", delete "OOO" and insert -- ... --.

Column 50,
Line 19, delete "said".

Signed and Sealed this

Twenty-first Day of February, 2006

JON W. DUDAS
*Director of the United States Patent and Trademark Office*